[12] United States Patent
Tessarolo et al.

(10) Patent No.: US 6,567,910 B2
(45) Date of Patent: *May 20, 2003

(54) DIGITAL SIGNAL PROCESSING UNIT WITH EMULATION CIRCUITRY AND DEBUG INTERRUPT ENABLE REGISTER INDICATING SERVICEABLE TIME-CRITICAL INTERRUPTS DURING REAL-TIME EMULATION MODE

(75) Inventors: Alexander Tessarolo, Sydney (AU); Peter N. Ehlig, Sugarland, TX (US); Glenn Harland Hopkins, Missouri City, TX (US); Venkatesh Natarajan, Bangalore (IN)

(73) Assignee: Texas Instruments Incorporated, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/249,560

(22) Filed: Feb. 12, 1999

(65) Prior Publication Data

US 2002/0112144 A1 Aug. 15, 2002

Related U.S. Application Data

(60) Provisional application No. 60/074,705, filed on Feb. 13, 1998.

(51) Int. Cl.[7] ............................................. G06F 15/00
(52) U.S. Cl. ..................... 712/227; 712/32; 712/209; 712/220; 712/221; 712/223; 710/59
(58) Field of Search ........................... 712/1, 221, 223, 712/225, 12, 32, 209, 216, 220, 227; 711/5, 163; 710/59

(56) References Cited

U.S. PATENT DOCUMENTS

| 5,027,316 A | * | 6/1991 | Frantz et al. .................. 710/11 |
| 5,155,812 A | * | 10/1992 | Ehlig et al. ..................... 710/59 |
| 5,555,384 A | * | 9/1996 | Roberts et al. ............. 712/216 |
| 5,564,029 A | * | 10/1996 | Ueda et al. .................. 712/216 |
| 5,636,366 A | * | 6/1997 | Robinson et al. ........... 711/163 |
| 5,652,910 A | * | 7/1997 | Boutaud et al. ............... 712/12 |
| 5,710,914 A | * | 1/1998 | Verbauwhede et al. ...... 712/245 |
| 5,889,983 A | * | 3/1999 | Mittal et al. ................. 712/223 |
| 5,938,759 A | * | 8/1999 | Kamijo ....................... 712/209 |
| 6,038,655 A | * | 3/2000 | Little et al. .................... 712/32 |
| 6,041,387 A | * | 3/2000 | Fleck et al. ..................... 711/5 |
| 6,081,885 A | * | 6/2000 | Deao et al. .................. 712/227 |
| 6,112,298 A | * | 8/2000 | Deao et al. .................. 712/227 |
| 6,134,578 A | * | 10/2000 | Ehlig et al. .................. 709/100 |
| 6,249,881 B1 | * | 6/2001 | Porten et al. .................. 714/38 |

* cited by examiner

Primary Examiner—Nabil El-Hady
(74) Attorney, Agent, or Firm—William W. Holloway; Robert D. Marshall; W. J. Brady

(57) ABSTRACT

An improved microprocessor is provided having a program control unit for storing and then decoding instructions, a program address generation unit for generating addresses used to obtain instructions, an address register arithmetic unit for generating addresses for data, an arithmetic logic unit for performing operations on data, a shifter unit for shifting data in response to a predetermined instruction, a multiplier unit for performing multiplication of two input values; and a plurality of registers of which at least a portion are individually selectively associated with one or more of said units as a function of an instruction.

14 Claims, 19 Drawing Sheets

| 15 | 14 | 13 | 12 | 11 | 10 | 9 | 8 |
|---|---|---|---|---|---|---|---|
| RTOSINT | DLOGINT | INT14 | INT13 | INT12 | INT11 | INT10 | INT9 |
| R/W-0 | R/W-0 | R/W-0 | R/W-0 | R/W-0 | R/W-0 | R/W-0 | R/W-0 |
| 7 | 6 | 5 | 4 | 3 | 2 | 1 | 0 |
| INT8 | INT7 | INT6 | INT5 | INT4 | INT3 | INT2 | INT1 |
| R/W-0 | R/W-0 | R/W-0 | R/W-0 | R/W-0 | R/W-0 | R/W-0 | R/W-0 |

NOTE: R-READ ACCESS; W=WRITE ACCESS; VALUE FOLLOWING DASH (-) IS VALUE AFTER RESET.

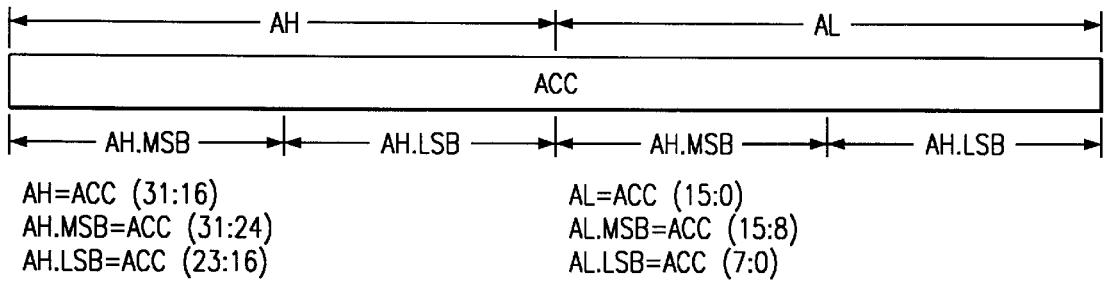
AH=ACC (31:16)
AH.MSB=ACC (31:24)
AH.LSB=ACC (23:16)
AL=ACC (15:0)
AL.MSB=ACC (15:8)
AL.LSB=ACC (7:0)
FIG. 6
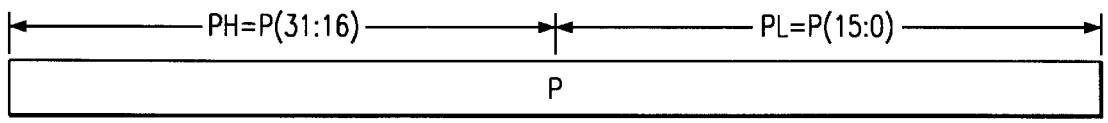
FIG. 7
| DATA PAGE | OFFSET | DATA MEMORY |
|---|---|---|
| 00 0000 0000 0000 00 ⋮ 00 0000 0000 0000 00 | 00 0000 ⋮ 11 1111 | PAGE 0: 00 0000–00 003F |
| 00 0000 0000 0000 01 ⋮ 00 0000 0000 0000 01 | 00 0000 ⋮ 11 1111 | PAGE 1: 00 0040–00 007F |
| 00 0000 0000 0000 10 ⋮ 00 0000 0000 0000 10 | 00 0000 ⋮ 11 1111 | PAGE 2: 00 0080–00 00BF |
| ⋮ | ⋮ | ⋮ |
| 11 1111 1111 1111 11 ⋮ 11 1111 1111 1111 11 | 00 0000 ⋮ 11 1111 | PAGE 65 535: 3F FFC0–3F FFFF |
FIG. 8

FIG. 12

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|----|-----|
| | | OVC | | | | | PM | | V | N | Z | C | TC | OVM | SXM |
| | | R/W-000000 | | | | | R/W-000 | | R/W-0 | R/W-0 | R/W-0 | R/W-0 | R/W-0 | R/W-0 | R/W-0 |

NOTE: R=READ ACCESS; W=WRITE ACCESS; VALUE FOLLOWING DASH (-) IS VALUE AFTER RESET.

FIG. 13

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|----|------|
| ARP | | | RESERVED | | | | | IDLESTAT | EALLOW | LOOP | SPA | VMAP | PAGE0 | DBGM | INTM |
| R/W-000 | | | | | | | | R-0 | R/W-0 | R-0 | R/W-0 | R/W-x | R/W-0 | R/W-1 | R/W-1 |

NOTE:
1) R=READ ACCESS; W=WRITE ACCESS; VALUE FOLLOWING DASH (-) IS VALUE AFTER RESET; RESERVED BITS ARE ALWAYS 0s AND ARE NOT AFFECTED BY WRITES.
2) THE VALUE OF THE VMAP BIT AFTER RESET DEPENDS ON THE LEVEL OF THE VMAP INPUT SIGNAL AT RESET. IF THE VMAP SIGNAL IS LOW, THE VMAP BIT IS 0 AFTER RESET; IF THE VMAP SIGNAL IS HIGH, THE VMAP BIT IS 1 AFTER RESET.

FIG. 14

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|----|-----|
| | | OVC | | | | | PM | | V | N | Z | C | TC | OVM | SXM |
| | | R/W-000000 | | | | | R/W-000 | | R/W-0 | R/W-0 | R/W-0 | R/W-0 | R/W-0 | R/W-0 | R/W-0 |

NOTE: R=READ ACCESS; W=WRITE ACCESS; VALUE FOLLOWING DASH (-) IS VALUE AFTER RESET.

FIG. 15

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|----|------|
| ARP | | | RESERVED | | | | | IDLESTAT | EALLOW | LOOP | SPA | VMAP | PAGE0 | DBGM | INTM |
| R/W-000 | | | | | | | | R-0 | R/W-0 | R-0 | R/W-0 | R/W-x | R/W-0 | R/W-1 | R/W-1 |

NOTE:
1) R=READ ACCESS; W=WRITE ACCESS; VALUE FOLLOWING DASH (-) IS VALUE AFTER RESET; RESERVED BITS ARE ALWAYS 0s AND ARE NOT AFFECTED BY WRITES.
2) THE VALUE OF THE VMAP BIT AFTER RESET DEPENDS ON THE LEVEL OF THE VMAP INPUT SIGNAL AT RESET. IF THE VMAP SIGNAL IS LOW, THE VMAP BIT IS 0 AFTER RESET; IF THE VMAP SIGNAL IS HIGH, THE VMAP BIT IS 1 AFTER RESET.

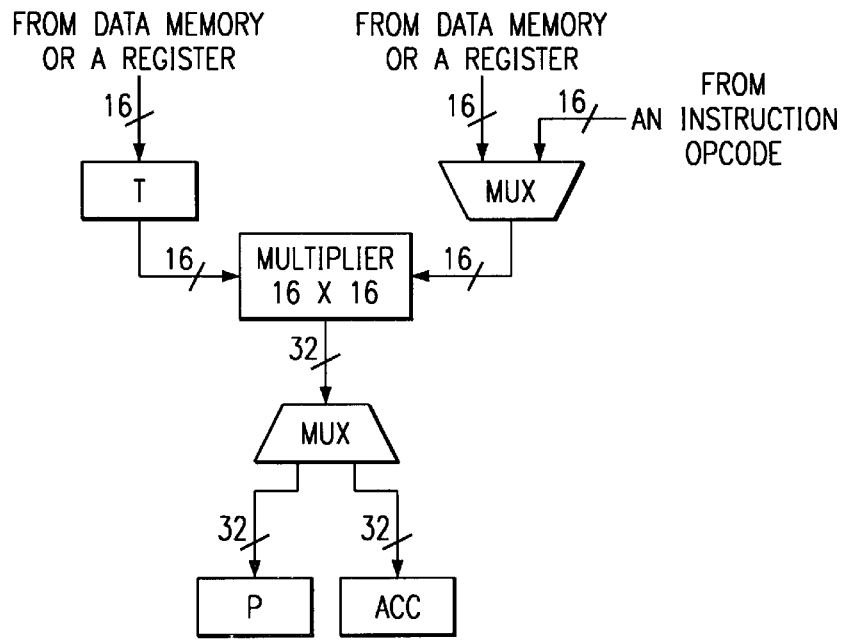

FIG. 16

| | |
|---|---|
| SHIFT LEFT | THIS TYPE OF BOX REPRESENTS THE 32-BIT SHIFTER. THE TEXT INSIDE THE BOX INDICATES THE DIRECTION OF THE SHIFT. |
| 0 | THIS SYMBOL INDICATES ZERO FILLING. |
| SIGN | THIS SYMBOL INDICATES SIGN EXTENDING. |
| SXM  0/SIGN | THIS SYMBOL INDICATES THAT THE MSBs OF THE SHIFTER DEPEND ON THE SIGN-EXTENSION MODE BIT (SXM). IF SXM=0, THE MSBs ARE ZERO FILLED AFTER THE SHIFT. IF SXM=1, THE MSBs ARE FILLED WITH THE SIGN OF THE SHIFTED VALUE. |
| C | THIS SYMBOL INDICATES THE CARRY BIT (C). |

FIG. 17

| OPERATION TYPE | ILLUSTRATION |
|---|---|
| LEFT SHIFT OF 16-BIT VALUE FOR ACC OPERATION. SYNTAXES:<br>ADD ACC, loc<<shift3<br>ADD ACC, #16BitSU << shift2<br>SUB ACC, loc<<shift3<br>SUB ACC, #16BitSU << shift2<br>MOV ACC, loc<<shift3<br>MOV ACC, #16BitSU << shift2 | |
| STORE 16 LSBs OF LEFT-SHIFTED ACC. SYNTAX:<br>MOV loc, ACC<<shift1 | |
| STORE 16 MSBs OF LEFT-SHIFTED ACC. SYNTAX:<br>MOVH loc, ACC<<shift1<br>NOTE: THIS INSTRUCTION PERFORMS A SINGLE RIGHT SHIFT BY (16-shift1), WHERE shift1 IS A VALUE FROM 0 TO 6. | |
| LOGICAL LEFT SHIFT OF ACC. THE LAST BIT TO BE SHIFTED OUT FILLS THE CARRY BIT (C). SYNTAXES:<br>LSL ACC, shift<br>LSL ACC, T<br>NOTE: IF T(3:0)=0, INDICATING A SHIFT OF 0, C IS CLEARED. | |
| LOGICAL LEFT SHIFT OF AH OR AL. THE LAST BIT TO BE SHIFTED OUT FILLS THE CARRY BIT (C). SYNTAXES:<br>LSL AX, shift<br>LSL AX, T<br>NOTE: IF T(3:0)=0, INDICATING A SHIFT OF 0, C IS CLEARED. | |
| RIGHT SHIFT OF ACC. IF SXM=0, A LOGICAL SHIFT IS PERFORMED. IF SXM=1, AN ARITHMETIC SHIFT IS PERFORMED. THE LAST BIT TO BE SHIFTED OUT FILLS THE CARRY BIT (C). SYNTAXES:<br>SFR ACC, shift<br>SFR ACC, T<br>NOTE: IF T(3:0)=0, INDICATING A SHIFT OF 0, C IS CLEARED. | |

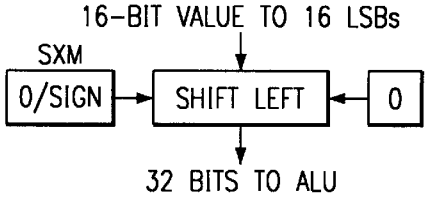

*FIG. 18A*

| OPERATION TYPE | ILLUSTRATION |
|---|---|
| LOGICAL RIGHT SHIFT OF AH OR AL. THE LAST BIT TO BE SHIFTED OUT FILLS THE CARRY BIT (C).<br>SYNTAXES:<br>LSR AX, shift<br>LSR AX, T<br>NOTE: IF T(3:0)=0, INDICATING A SHIFT OF 0, C IS CLEARED. | AH/AL TO 16 LSBs ↓<br>[0] → [SHIFT RIGHT] → [C] LAST BIT OUT<br>↓ → DISCARD OTHER BITS<br>16 LSBs TO AH/AL |
| ARITHMETIC RIGHT SHIFT OF AH OR AL. THE LAST BIT TO BE SHIFTED OUT FILLS THE CARRY BIT (C).<br>SYNTAXES:<br>ASR AX, shift<br>ASR AX, T<br>NOTE: IF T(3:0)=0, INDICATING A SHIFT OF 0, C IS CLEARED. | AH/AL TO 16 LSBs ↓<br>[SIGN] → [SHIFT RIGHT] → [C] LAST BIT OUT<br>↓ → DISCARD OTHER BITS<br>16 LSBs TO AH/AL |
| ROTATE ACC LEFT BY 1 BIT. BIT 31 OF ACC FILLS THE CARRY BIT (C).<br>C FILLS BIT 0 OF ACC.<br>SYNTAX:<br>ROL ACC | ACC ↓<br>[C] ← [ROTATE LEFT] ←<br>↓<br>32 BITS TO ACC |
| ROTATE ACC RIGHT BY 1 BIT. BIT 0 OF ACC FILLS THE CARRY BIT (C).<br>C FILLS BIT 31 OF ACC.<br>SYNTAX:<br>ROR ACC | ACC ↓<br>→ [ROTATE RIGHT] → [C]<br>↓<br>32 BITS TO ACC |
| CONDITIONAL SHIFT OF ACC BY 1 BIT.<br>SYNTAXES:<br>NORM ACC, aux++<br>NORM ACC, aux--<br>SUBCU ACC, loc | ACC ↓<br>DISCARD ← [SHIFT LEFT] ← [0]<br>↓<br>32 BITS TO ACC |
| SHIFT OF PAS PER PM BITS. SYNTAXES:<br>ADD ACC, P<br>SUB ACC, P<br>CMP ACC, P<br>MAC P, loc, 0:pmem<br>MOV ACC, P<br>MOVA T, loc<br>MOVP T, loc<br>MOVS T, loc<br>MPYA P, loc, #16BitSigned<br>MPYA P, T, loc<br>MPYS P, T, loc | FOR PM=0: P ↓<br>DISCARD ← [SHIFT LEFT] ← [0]<br>↓<br>32 BITS TO ALU<br><br>FOR PM FROM 2-7: P ↓<br>[SIGN] → [SHIFT RIGHT] → DISCARD<br>↓<br>32 BITS TO ALU |

FIG. 18B

| OPERATION TYPE | ILLUSTRATION |
| --- | --- |
| STORE 16 LSBs OF SHIFTED P. P IS SHIFTED AS PER THE PM BITS. THE 16 LSBs OF SHIFTER ARE STORED. SYNTAX: MOV loc, P | FOR PM=0: <br> P → DISCARD ← SHIFT LEFT ← 0 <br> 16 LSBs TO ALU <br><br> FOR PM FROM 2-7: <br> P → SIGN → SHIFT RIGHT → DISCARD <br> 16 LSBs TO ALU |
| STORE 16 MSBs OF SHIFTED P. P IS SHIFTED AS PER THE PM BITS. THE RESULT IS SHIFTED RIGHT BY 16 SO THAT ITS 16 MSBs ARE IN THE 16 LSBs OF THE SHIFTER. 16 LSBs OF SHIFTER ARE STORED. SYNTAX: MOVH loc, P | FOR PM=0: <br> 1) P → DISCARD ← SHIFT LEFT ← 0 <br> 2) SHIFT RIGHT BY 16 → DISCARD <br> 16 LSBs TO ALU <br><br> FOR PM FROM 2-7: <br> 1) P → SIGN → SHIFT RIGHT → DISCARD <br> 2) SHIFT RIGHT BY 16 → DISCARD <br> 16 LSBs TO ALU |

FIG. 18C

| 15 | 14 | 13 | 12 | 11 | 10 | 9 | 8 |
|---|---|---|---|---|---|---|---|
| RTOSINT | DLOGINT | INT14 | INT13 | INT12 | INT11 | INT10 | INT9 |
| R/W-0 | R/W-0 | R/W-0 | R/W-0 | R/W-0 | R/W-0 | R/W-0 | R/W-0 |

| 7 | 6 | 5 | 4 | 3 | 2 | 1 | 0 |
|---|---|---|---|---|---|---|---|
| INT8 | INT7 | INT6 | INT5 | INT4 | INT3 | INT2 | INT1 |
| R/W-0 | R/W-0 | R/W-0 | R/W-0 | R/W-0 | R/W-0 | R/W-0 | R/W-0 |

NOTE: R-READ ACCESS; W=WRITE ACCESS; VALUE FOLLOWING DASH (-) IS VALUE AFTER RESET.

*FIG. 19*

| 15 | 14 | 13 | 12 | 11 | 10 | 9 | 8 |
|---|---|---|---|---|---|---|---|
| RTOSINT | DLOGINT | INT14 | INT13 | INT12 | INT11 | INT10 | INT9 |
| R/W-0 | R/W-0 | R/W-0 | R/W-0 | R/W-0 | R/W-0 | R/W-0 | R/W-0 |

| 7 | 6 | 5 | 4 | 3 | 2 | 1 | 0 |
|---|---|---|---|---|---|---|---|
| INT8 | INT7 | INT6 | INT5 | INT4 | INT3 | INT2 | INT1 |
| R/W-0 | R/W-0 | R/W-0 | R/W-0 | R/W-0 | R/W-0 | R/W-0 | R/W-0 |

NOTE: R-READ ACCESS; W=WRITE ACCESS; VALUE FOLLOWING DASH (-) IS VALUE AFTER RESET.

*FIG. 20*

| 15 | 14 | 13 | 12 | 11 | 10 | 9 | 8 |
|---|---|---|---|---|---|---|---|
| RTOSINT | DLOGINT | INT14 | INT13 | INT12 | INT11 | INT10 | INT9 |
| R/W-0 | R/W-0 | R/W-0 | R/W-0 | R/W-0 | R/W-0 | R/W-0 | R/W-0 |

| 7 | 6 | 5 | 4 | 3 | 2 | 1 | 0 |
|---|---|---|---|---|---|---|---|
| INT8 | INT7 | INT6 | INT5 | INT4 | INT3 | INT2 | INT1 |
| R/W-0 | R/W-0 | R/W-0 | R/W-0 | R/W-0 | R/W-0 | R/W-0 | R/W-0 |

NOTE: R-READ ACCESS; W=WRITE ACCESS; VALUE FOLLOWING DASH (-) IS VALUE AFTER RESET.

*FIG. 21*

|  | 16-BIT CONSTANT | DATA OR PROGRAM MEMORY |
|---|---|---|
| 00 0000 | 0000 0000 0000 0000 | 00 0000-00 FFFF |
| ⋮ | ⋮ | |
| 00 0000 | 1111 1111 1111 1111 | |
| | | 01 0000-3F FFFF NOT ACCESSIBLE BY THIS MODE |

FIG. 26

| DATA PAGE | OFFSET | DATA MEMORY |
|---|---|---|
| 00 0000 0000 0000 00 | 00 0000 | PAGE 0:   00 0000-00 003F |
| ⋮ | ⋮ | |
| 00 0000 0000 0000 00 | 11 1111 | |
| 00 0000 0000 0000 01 | 00 0000 | PAGE 1:   00 0040-00 007F |
| ⋮ | ⋮ | |
| 00 0000 0000 0000 01 | 11 1111 | |
| 00 0000 0000 0000 10 | 00 0000 | PAGE 2:   00 0080-00 00BF |
| ⋮ | ⋮ | |
| 00 0000 0000 0000 10 | 11 1111 | |
| ⋮ | ⋮ | ⋮ |
| 11 1111 1111 1111 11 | 00 0000 | PAGE 65 535: 3F FFC0-3F FFFF |
| ⋮ | ⋮ | |
| 11 1111 1111 1111 11 | 11 1111 | |

FIG. 27

|  | SP | DATA MEMORY |
| --- | --- | --- |
| 00 0000 | 0000 0000 0000 0000 | 00 0000-00 FFFF |
| 00 0000 | 1111 1111 1111 1111 | |
| | | 01 0000-3F FFFF NOT ACCESSIBLE BY THIS MODE |

|  | (SP-OFFSET) | DATA MEMORY |
| --- | --- | --- |
| 00 0000 | 0000 0000 0000 0000 | 00 0000-00 FFFF |
| 00 0000 | 1111 1111 1111 1111 | |
| | | 01 0000-3F FFFF NOT ACCESSIBLE BY THIS MODE |

SYNTAX: MOVW DP, #16bit
INSTRUCTION: MOVW DP, #6    ; LOAD ALL 16 BITS OF DP WITH 6.
OPCODE:

1ST WORD

| 15-0 |
|---|
| 0 1 1 1 0 1 1 0 0 0 0 1 1 1 1 1 |

CODE FOR MOVW

2ND WORD

| 15-0 |
|---|
| 0 0 0 0 0 0 0 0 0 0 0 0 0 1 1 0 |

16-BIT CONSTANT=6

*FIG. 35*

SYNTAX: MOV XARn, #22bit
INSTRUCTION: MOV XAR6, #0FFFFFh    ; LOAD ALL 22 BITS OF XAR6
                                    ; WITH HEXADECIMAL 0FFFFF.
OPCODE:

1ST WORD

| 15-6 | 5-0 |
|---|---|
| 0 1 1 1 0 1 1 0 1 0 | 0 0 1 1 1 1 |

CODE FOR THIS MOV SYNTAX, USING XAR6   BITS 21-16 OF CONSTANT

2ND WORD

| 15-0 |
|---|
| 1 1 1 1 1 1 1 1 1 1 1 1 1 1 1 1 |

BITS 15-0 OF CONSTANT

*FIG. 36*

SYNTAX: INC loc
INSTRUCTION: INC @T    ; INCREMENT CONTENT OF
                       ; T REGISTER BY 1.
OPCODE:

| 15-8 | 7-0 |
|---|---|
| 0 0 0 0 1 0 1 0 | 1 0 1 0 1 1 0 0 |

CODE FOR INC    CODE FOR ACCESSING T BY WAY
                OF REGISTER ADDRESSING MODE

*FIG. 37*

SYNTAX: ADD ACC. loc {<<shift3}
INSTRUCTION: ADD ACC, @5 << 4        ; DATA PAGE IS 2 (DP=2).
                                     ; COPY CONTENT OF HEXADECIMAL
                                     ; ADDRESS 000085, SHIFT IT
                                     ; LEFT BY 4, AND ADD RESULT
                                     ; TO ACC.

OPCODE:
| 15-12 | 11-8 | 7-0 |
|---|---|---|
| 1 0 1 0 | 0 1 0 0 | 0 0 0 0 0 1 0 1 |
| CODE FOR THIS ADD SYNTAX | SHIFT OF 4 | CODE FOR DP DIRECT ADDRESSING MODE, OFFSET OF 5 |

FIG. 38

SYNTAX: MAC P, loc, 0:pmem
INSTRUCTION: MAC P, *XAR6++, 0:5     ; XAR6=0F0000
                                     ; ADD CONTENT OF P REGISTER
                                     ; TO ACCUMULATOR. MULTIPLY
                                     ; CONTENT OF DATA-MEMORY
                                     ; ADDRESS 0F0000 BY CONTENT
                                     ; OF PROGRAM-MEMORY ADDRESS
                                     ; 000005. PLACE RESULT IN
                                     ; P REGISTER. INCREMENT XAR6
                                     ; BY 1. SET ARP=6.

OPCODE:
| | 15-8 | 7-0 |
|---|---|---|
| 1ST WORD | 0 0 0 1 0 1 0 0 | 1 0 0 0 0 1 1 0 |
| | CODE FOR MAC | CODE FOR OPERAND *XAR6++ |

| | 15-0 |
|---|---|
| 2ND WORD | 0 0 0 0 0 0 0 0 0 0 0 0 0 1 0 1 |
| | 16 LSBs OF PROGRAM-MEMORY ADDRESS=0005₁₆ |

FIG. 39

SYNTAX: ADD loc, #16BitSigned
INSTRUCTION: ADD *--SP, #-2          ; SP=0801
                                     ; DECREMENT SP BY 1. ADD -2
                                     ; TO CONTENT OF DATA-MEMORY
                                     ; ADDRESS 0800.

OPCODE:
| | 15-8 | 7-0 |
|---|---|---|
| 1ST WORD | 0 0 0 0 1 0 0 0 | 1 0 1 1 1 1 1 0 |
| | CODE FOR THIS ADD SYNTAX | CODE FOR OPERAND *--SP |

| | 15-0 |
|---|---|
| 2ND WORD | 1 1 1 1 1 1 1 1 1 1 1 1 1 1 1 0 |
| | 16 BIT CONSTANT=-2 (FFFE₁₆) |

FIG. 40

DIGITAL SIGNAL PROCESSING UNIT WITH EMULATION CIRCUITRY AND DEBUG INTERRUPT ENABLE REGISTER INDICATING SERVICEABLE TIME-CRITICAL INTERRUPTS DURING REAL-TIME EMULATION MODE

This application claims priority under 35 USC §119(e)(1) of Provisional Application Number 60/074,705, filed Feb. 13, 1998.

TECHNICAL FIELD OF THE INVENTION

This invention relates to microprocessors, and particularly relates to improved microprocessors.

BACKGROUND OF THE INVENTION

A microprocessor is a central processing unit (CPU) for a digital processor which is usually contained in a single semiconductor integrated circuit or "chip" fabricated by "MOS/LSI" technology, as shown in U.S. Pat. No. 3,757,306 issued to Gary W. Boone and assigned to Texas Instruments. The Boone patent shows a single-chip 8-bit CPU including a parallel ALU, registers for data and addresses, and instruction register and a control decoder, all interconnected using the Von Neumann architecture and employing a bidirectional parallel bus for data, address and instructions. U.S. Pat. No. 4,074,351, issued to Gary W. Boone and Michael J. Cochran, assigned to Texas Instruments, shows a single-chip "microcomputer" type device which contains a 4-bit parallel ALU and its control circuitry, with on-chip ROM for program storage and on-chip RAM for data storage, constructed in the Harvard architecture. The term microprocessor usually refers to a device employing external memory for program and data storage, while the term microcomputer refers to a device with on-chip ROM and RAM for program and data storage; the terms are also used interchangeably, however, and are not intended as restrictive as to some features of this invention.

Subsequent to 1971 when U.S. Pat. Nos. 3,757,306 and 4,074,351 were originally filed, many improvements have been made in microprocessors and microcomputers to increase the speed and capability of these devices and reduce the cost of manufacture, providing more circuitry and functions in less space, i.e., smaller chip size. Improved VLSI semiconductor processing and photolithographic techniques allow narrower line widths and higher resolution, providing added circuit density and higher speed, but circuit and system improvements also contribute to the goals of increased performance with smaller chip size. Some of these improvements in microcomputers are disclosed in the following U.S. Patents, all assigned to Texas Instruments; U.S. Pat. No. 3,991,305 issued to Edward R. Caudel and Joseph H. Raymond, Jr.; U.S. Pat. No. 4,156,927 issued to David J. McElroy and Graham S. Tubbs; U.S. Pat. No. 3,934,233 issued to R. J. Fisher and G. D. Rogers; U.S. Pat. No. 3,921,142 issued to J. D. Bryant and G. A. Hartsell; U.S. Pat. No. 3,900,722 issued to M. J. Cochran and C. P. Grant; U.S. Pat. No. 3,932,846 issued to C. W. Brixey et al; U.S. Pat. No. 3,939,335 issued to G. L. Brantingham, L. H. Phillips and L. T. Novak; U.S. Pat. No. 4,125,901 issued to S. P. Hamilton, L. L. Miles, et al; U.S. Pat No. 4,158,432 issued to M. G. VanBavel; U.S. Pat. Nos. 3,757,308 and 3,984,816. The devices described in these patents have been of the Harvard architecture and of the 4-bit type, particularly adapted for calculator or controller applications.

Additional examples of microprocessor and microcomputer devices in the evolution of this technology are described in publications. In Electronics, Sep. 25, 1972, pp. 31–32, a 4-bit P-channel MOS microcomputer with on-chip ROM and RAM is shown which is similar to U.S. Pat. No. 3,991,305. Two of the most widely used 8-bit microprocessors like that of U.S. Pat. No. 3,757,306 are described in Electronics, Apr. 18, 1974 at pp. 85–95 (the Motorola 6800) and pp. 95–100 (the Intel 8080). A microcomputer version of the 6800 is described in Electronics, Feb. 2, 1978 at pp 99–105. Likewise, a single-chip microcomputer version of the 8080 is shown in Electronics, Nov. 25, 1976 at pp. 99–105. Another single-chip microcomputer, the Mostek 3872, is shown in Electronics, May 11, 1978, at p. 105–110, and an improved version of the 6800 is disclosed in Electronics, Sep. 17, 1979 at pp. 122–125. Sixteen-bit microprocessors based on minicomputer instruction sets evolved such as the part number TMS9900 described in a book entitled "9900 Family Systems Design", published in 1978 by Texas Instruments Incorporated, P.O. Box 1443, M/S 6404, Houston, Tex. 77001, Library of Congress Catalog No. 78–058005. The 8086, a 16-bit microprocessor evolving from the 8080, is described in Electronics, Feb. 16, 1978, pp. 99–104, while a 16-bit microprocessor identified as the 68000 (based on the 6800) is described in Electronic Design, Sep. 1, 1978 at pp. 100–107, and in IEEE Computer, Vol. 12. No. 2, pp. 43–52 (1979).

These prior 8-bit and 16-bit microprocessors and microcomputers have been general-purpose processors of the Von Neumann architecture with multiplexed address/data busses; some have been microcoded as described in U.S. patent application Ser. No. 209,915, filed Nov. 24, 1980 by Guttag, McDonough and Laws, now U.S. Pat. No. 4,402,043, issued Aug. 30, 1983, or Ser. No. 253,624, filed Apr. 13, 1981 by Hayn, McDonough and Bellay, now U.S. Pat. No. 4,432,052, issued Feb. 14, 1984, both assigned to Texas Instruments, and at pp. 28–34, IEEE Spectrum, March 1979, by McKevitt and Bayliss, or Proceedings 11$^{th}$ Annual Microprogramming Workshop, December, 1979 by Stintter and Tredenick. Microcoding, originally described by Wilkes in 1951, employs a control ROM to store microinstruction sequences entered by instruction words; the programmer works in a higher level machine code, so the number of assembly language code statements is supposedly reduced, and thus programming cost is reduced.

Some additional improvements in microcomputers are disclosed in the following U.S. Patents, all assigned to Texas Instruments; U.S. Pat. Nos. 4,577,282, 4,831,570 and 5,072,418. The devices described in these patents have been 16-bit modified Harvard architecture devices, particularly adapted for varying applications because of their programmability.

Microprocessor designers have increasingly endeavored to improve performance in various microprocessors by increasing clock speeds and adding parallelism. Large blocks of random access memory (RAM) are included within the microprocessor for data storage and for program storage in order to reduce memory access times. Various types of input/output devices are included within a microprocessor integrated circuit in order to reduce total system chip count and cost.

In contrast, features of the invention may be preferably employed in a special-purpose high-speed microcomputer device according to the embodiment described herein which departs from these contemporary microprocessor devices in several major respects in order to achieve substantial speed and performance advantages. This device is generally a non-microcoded processor of modified Harvard architecture.

An object of the present invention is to provide an improved microprocessor.

SUMMARY OF THE INVENTION

In one embodiment of the present invention an improved microprocessor is provided having a program control unit for storing and then decoding instructions, a program address generation unit for generating addresses used to obtain instructions, an address register arithmetic unit for generating addresses for data, an arithmetic logic unit for performing operations on data, a shifter unit for shifting data in response to a predetermined instruction, a multiplier unit for performing multiplication of two input values; and a plurality of registers of which at least a portion are individually selectively associated with one or more of said units as a function of an instruction.

These and other features of the invention that will be apparent to those skilled in the art from the following detailed description of the invention, taken together with the accompanying drawings.

DESCRIPTION OF THE DRAWINGS

FIG. 6 illustrates individually accessible portions of the accumulator of the CPU of FIG. 5;

FIG. 7 illustrates individually accessible halves of the P Register of the CPU of FIG. 5;

FIG. 8 illustrates pages of Data Memory;

FIG. 12 shows the bit positions of Status Register ST0;

FIG. 13 shows the bit positions of Status Register ST1;

FIG. 14 shows Status Register ST0;

FIG. 15 shows Status Register ST1;

FIG. 16 illustrates a block Diagram of Components Involved in the multiplier of the CPU of FIG. 5;

FIG. 17 illustrates the symbols and their meanings for the Shift Operations depicted in FIGS. 18;

FIGS. 18A, 18B and 18C show Shift Operations;

FIG. 19 illustrates the bit positions for an Interrupt Flag Register (IFR);

FIG. 20 illustrates the bit positions for an Interrupt Enable Register (IER);

FIG. 21 illustrates the bit positions for a Debug Interrupt Enable Register (DBGIER);

FIG. 25 illustrates pipeline Phases During Which Address Registers Are Read From or Written To;

FIG. 26 shows an Accessing Memory in Immediate-Pointer Addressing Mode;

FIG. 27 illustrates Pages of Data Memory;

FIG. 35 shows an Opcode Format for Immediate Addressing With a 16-Bit Constant;

FIG. 36 shows an Opcode Format for Immediate Addressing With a 22-Bit Constant;

FIG. 37 shows an Opcode Format for an Instruction Using Register Addressing Mode;

FIG. 38 shows an Opcode Format for an Instruction Using DP Direct Addressing Mode;

FIG. 39 shows an Opcode Format for an Instruction Using Auxiliary-Register Indirect Addressing Mode;

FIG. 40 shows an Opcode Format for an Instruction Using Stack-Pointer Indirect Addressing Mode;

DETAILED DESCRIPTION OF THE INVENTION

Architectural Overview

A digital signal processor (DSP) chip contains a DSP core. The DSP core is responsible for the central control activities of a DSP, activities such as address generation, arithmetic operations, data transfers, and system monitoring. The following briefly describes the components of a DSP core of the present invention, its presently preferred associated memory map, and a presently preferred memory interface.

Figure 1:
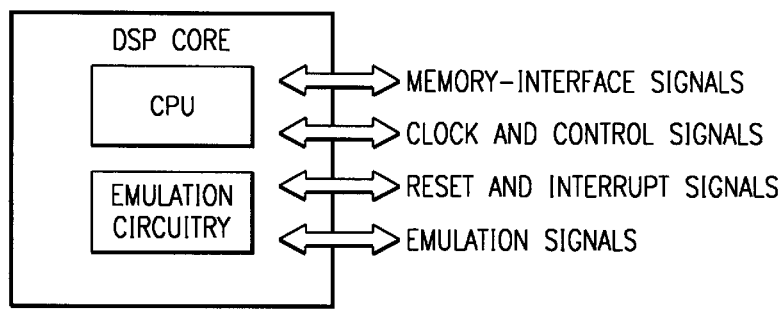
FIG. 1 illustrates a high-level block diagram of a DSP core of the present invention.

Preferably, the DSP core of the present invention is a 16-bit, fixed-point processor. As shown in FIG. 1, this DSP core contains:

a) a CPU for: generating data- and program-memory addresses, decoding and executing instructions, performing arithmetic, logical, and shift operations, and controlling data transfers among CPU registers, data memory, and program memory;

b) emulation logic for: monitoring and controlling various parts and functionalities of the DSP and for testing device operation; and c) signals for: interfacing with memory and peripherals, clocking and controlling the CPU and the emulation circuitry, showing the status of the CPU and the emulation circuitry, and using interrupts.

The DSP core does not contain memory, a clock generator, or peripheral devices.

The CPU is discussed in more detail later herein, but the following is a list of its major features:

a) a protected pipeline—The CPU implements an 8-phase pipeline that prevents a read from and a write to the same location from occurring out of order;

b) independent register space—The CPU contains registers that are not mapped to data space. These registers function as system-control registers, math registers, and data pointers. The system-control registers are accessed by special instructions. The other registers are accessed by special instructions or by a special addressing mode (register addressing mode);

c) arithmetic logic unit (ALU)—The 32-bit ALU performs 2s-complement arithmetic and Boolean logic operations;

d) address register arithmetic unit (ARAU)—The ARAU generates data-memory addresses and increments or decrements pointers in parallel with ALU operations;

e) barrel shifter—This shifter performs all left and right shifts of data. It can shift data to the left by up to 16 bits and to the right by up to 16 bits; and f) multiplier—The multiplier performs 16-bit×16-bit 2s-complement multiplication with a 32-bit result. The multiplication can be performed with two signed numbers, two unsigned numbers, or one signed number and one unsigned number.

The emulation logic includes the following features:

a) debug and test direct memory access (DT-DMA)—The debug host can gain direct access to the content of registers and memory by taking control of the memory interface during unused cycles of the instruction pipeline;

b) data logging—The emulation logic enables application-initiated transfer of memory contents between the DSP and a debug host device;

c) 32-bit counter for performance benchmarking;

d) multiple debug events—Any of the following debug events can cause a break in program execution:
  i) A breakpoint initiated by the ESTOP0 or ESTOP1 instruction;
  ii) An access to a specified program or data location; and
  iii) A request from the debug host or other hardware.

When a debug event causes the DSP to enter the debug state, the event is called a break event.

e) real-time mode of operation—When the DSP is in this mode and a break event occurs, the main body of program code comes to a halt, but time-critical interrupts can still be serviced; and f) interrupt generation capabilities.

As shown in FIG. 1, the DSP core has four main types of signals:

a) memory-interface signals—These signals transfer data among the core, memory, and peripherals; indicate program-memory accesses and data-memory accesses; and differentiate between accesses of different sizes (16-bit or 32-bit).

b) clock and control signals—These signals provide clocking for the CPU and the emulation logic, and they are used to control and monitor the CPU.

c) reset and interrupt signals—These signals are used for generating a hardware re-set and interrupts, and for monitoring the status of interrupts.

d) emulation signals—These signals are used for testing and debugging.

Figure 2:
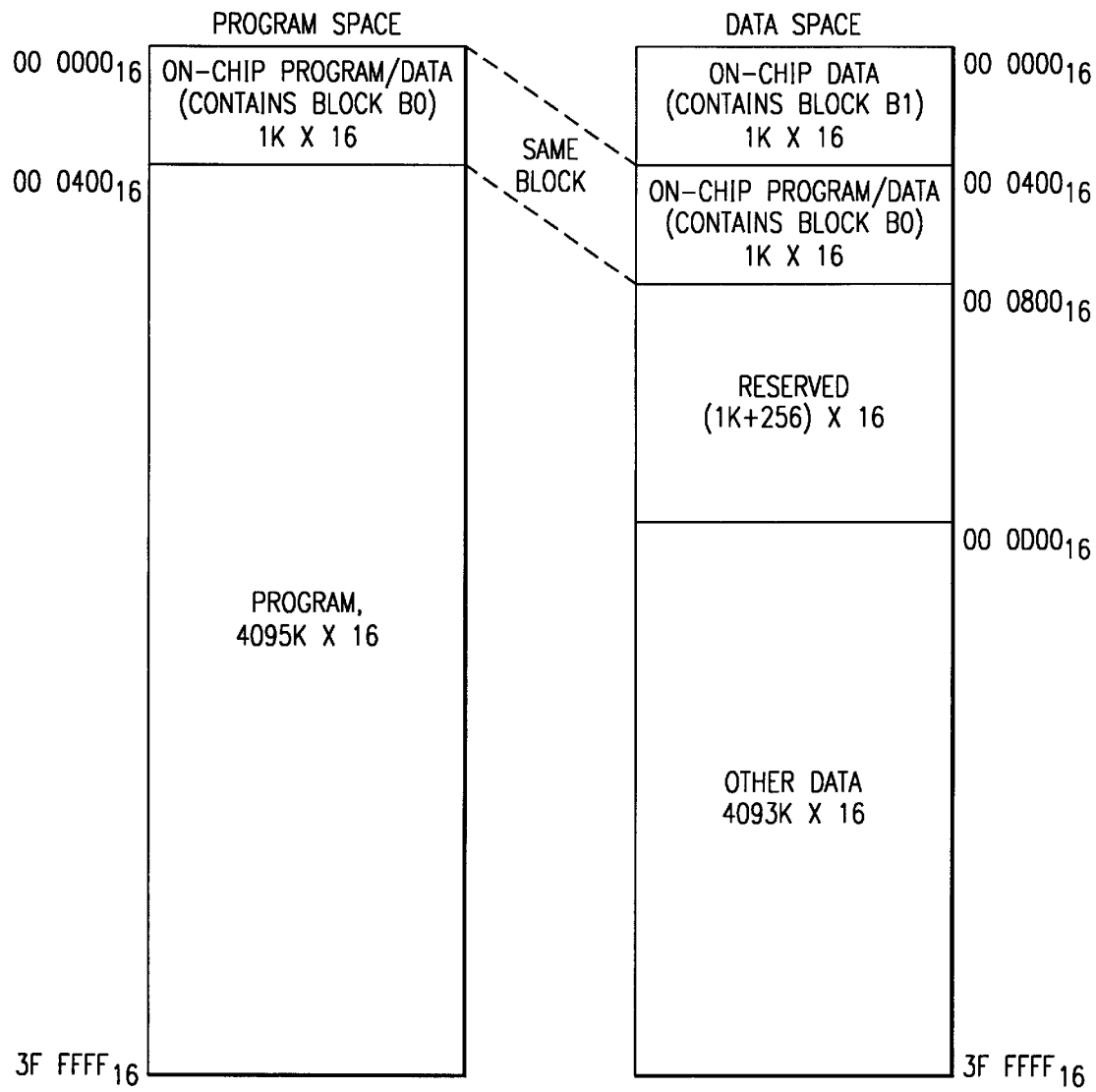
FIG. 2 shows a high-level memory map for the DSP core of FIG. 1.

The DSP core contains no memory, but can access memory elsewhere on-chip with the DSP or off chip. The DSP uses 22-bit addresses, supporting a total address reach of 4M words (1 word=16 bits) in both program space and data space. FIG. 2 shows a high-level memory map view of how addresses may be allocated between program space and data space. In most cases, hexadecimal numbers are shown with a subscript of 16. For example, the hexadecimal number 40 would be shown as $40_{16}$. The exception to this rule is a hexadecimal number in a code example; these hexadecimal numbers have the suffix h. For example, the number 40 in the following code is a hexadecimal 40.
MOVB AR0,#40h The memory map in FIG. 2 has been divided into the following segments:

a) on-chip program/data—Addresses 00 $0000_{16}$–00 $03FF_{16}$ in program space and 00 $0400_{16}$–00 $07FF_{16}$ in data space are for use with a single on-chip block of program/data memory. For example, the same location may be accessed with address 00 $0041_{16}$ in program space or address 00 $0441_{16}$ in data space. Within these addresses resides a block B0, which is 256, 512, or 1K words.

b) program—Addresses $000400_{16}$–$3FFFFF_{16}$ in program space are avail-able for program memory. This additional memory may be on-chip and/or off-chip.

c) on-chip data—Addresses $000000_{16}$–$0003FF_{16}$ in data space are for a block of data-memory on board the DSP. This block, called B1, may be 256, 512, or 1K words.

d) reserved—Addresses $000800_{16}$–$000CFF_{16}$ in data space are reserved for special registers. Some of the addresses in the range $000800_{16}$–$0009FF_{16}$ are used for accessing memory-mapped emulation registers.

e) other data—Addresses $000D00_{6}$–$3FFFFF_{16}$ in data space are available for additional data memory. This additional memory may be on-chip and/or off-chip.

Figure 3A:
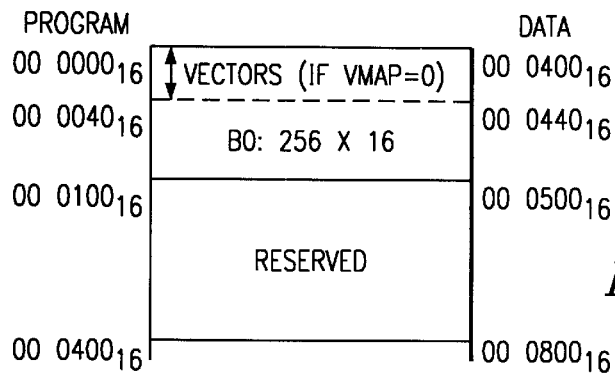
FIGS. 3A, 3B and 3C show possible maps for a portion of FIG. 2.
Figure 3B:
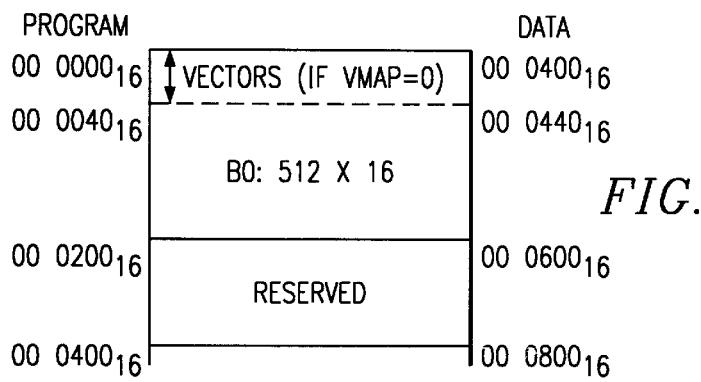
Figure 3C:
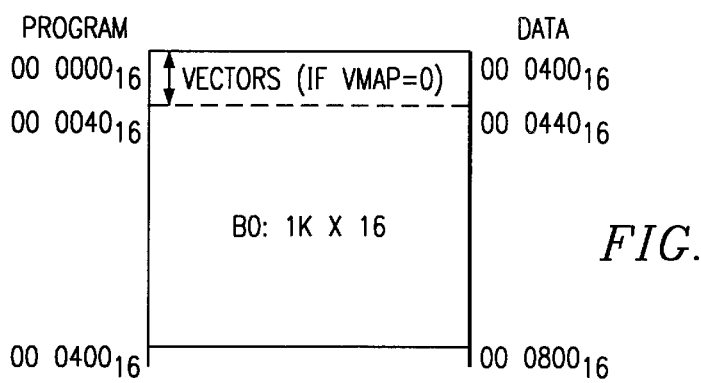

Sixty-four addresses in program space are set aside for a table of 32 interrupt vectors. The vectors can be mapped to the top or bottom of program space by using a VMAP bit. As shown in FIGS. 3A–C, if VMAP=0, the vectors are mapped to addresses 00 $0000_{16}$–00 $003F_{16}$; they are also mapped to addresses 00 $0400_{16}$–00 $043F_{16}$ in data space. When VMAP=1, the vectors are only mapped to program space at addresses 3F $FFC0_{16}$ -3F $FFFF_{16}$.

The possible maps for block B0 are also shown in FIGS. 3A–C. B0 may be selected as 256, 512, or 1K words, as depicted in FIGS. 3A, 3B, and 3C, respectively. If B0 has fewer than 1024 (1K) words, some of the program/data addresses are reserved (not available for use).

The 1K block of memory shown in FIGS. 3A–C, whether all used for B0 or partially reserved, can be addresses in program space or data space. For example, the location with address 00 $0041_{16}$ may be in program space or in data space.

Figure 4A:
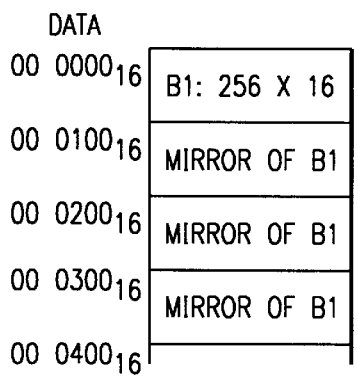
FIGS. 4A, 4B and 4C show possible maps for a portion of FIG. 2.
Figure 4B:
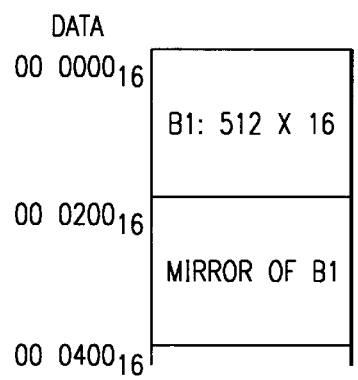
Figure 4C:
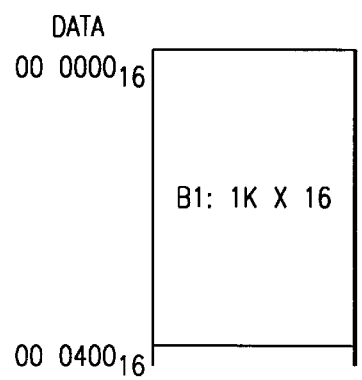

FIGS. 4A–C show the possible maps for block B1, which reside only in data space. B1 may be selected to be 256, 512, or 1K words, as depicted in FIGS. 4A, 4B, and 4C, respectively. If B1 has 256 words, mirrors of B1 are in the address ranges 00 $01000_{16}$–00 $01FF_{16}$, 00 $0200_{16}$–00 $02FF_{16}$, and 00 $0300_{16}$–00 $03FF_{16}$ As an example of what this means, the first word of B1, may be accessed at any one of the following addresses: 00 $0000_{16}$, 00 $0100_{16}$, 00 $0200_{16}$, or 00 $0300_{16}$.

If B1 has 512 words, there is one mirror of B1 at addresses 00 $0200_{16}$–00 $0400_{16}$. If B1 has 1K words, it uses all the available addresses.

The DSP CPU supports long call and branch operations, and a 22-bit program counter (PC) enables access of program space as one linear memory space. The DSP also supports relative offset branching, which enables code to be relocated at run time.

The DSP CPU supports a 16-bit stack pointer (SP) that points to data memory. Using this register, a stack may be created within the first 64K of data space (addresses 00 $0000_{16}$–00 $FFFF_{16}$). SP is incremented such that the stack grows from low memory to high memory and SP always points to the next empty location. After a hardware reset, SP points to address 00 0000$_{16}$.

Data space is supported by a rich set of addressing modes. Indirect addressing modes use 16-bit pointers (the SP and the auxiliary registers AR0–AR5) to access the low 64K of data space and 22-bit pointers (auxiliary registers XAR6 and XAR7) to access the full range of data space. Direct addressing modes access all of data space by concatenating a 16-bit data page number with a 6-bit offset that is embedded in an instruction. The addressing modes are described later herein.

Instructions are included to move data between program space and data space. The PREAD instruction can be used to transfer a program-memory value to data memory. The PWRITE instruction can transfer a data-memory value to program memory.

The DSP memory map is accessible outside the core by the memory interface, which connects the DSP core to memories, peripherals, or other interfaces. The memory interface includes separate buses for program space and data space. This means an instruction can be fetched from program memory while data memory is being accessed.

The interface also includes signals that indicate the type of read or write being requested by the CPU. These signals can select a specified memory block or peripheral for a given bus transaction. In addition to 16-bit and 32-bit accesses, the DSP supports special byte-access instructions which can access the least significant byte (LSByte) or most significant byte (MSByte) of an addressed 16-bit word. Strobe signals indicate when such an access is occurring on a data bus.

The memory interface has three 22-bit address buses:

1) the program address bus (PAB) carries addresses for reads and writes from program space;
2) the data-read address bus (DRAB) carries addresses for reads from data space; and
3) the data-write address bus (DWAB) carries addresses for writes to data space.

The memory interface also has three 32-bit data buses:

1) the program-read data bus (PRDB) carries instructions or data during reads from program space;
2) the data-read data bus (DRDB) carries data during reads from data space;
3) the data-/program-write data bus (DWDB) carries data during writes to data space or program space.

Table 1 below summarizes how these buses are used during accesses.

TABLE 1

Summary of Bus Use During
Data-Space and Program-Space Accesses

| Access Type | Address Bus | Data Bus |
|---|---|---|
| Read from program space | PAB | PRDB |
| Read from data space | DRAB | DRDB |
| Write to program space | PAB | DWDB |
| Write to data space | DWAB | DWDB |

A program-space read and a program-space write cannot happen simultaneously because both use the PAB. Similarly, a program-space write and a data-space write cannot happen simultaneously because both use the DWDB.

Transactions that use different buses can happen simultaneously. For example, the CPU can read from program space (using PAB and PRDB), read from data space (using DRAB and DRDB), and write to data space (using DWAB and DWDB) at the same time.

Typically, PAB and PRDB are used only for reading instructions from program space, and DWDB is used only for writing data to data space. However, the instructions in Table 2 below are exceptions to this behavior.

TABLE 2

Special Bus Operations

| Instruction | Special Bus Operation |
|---|---|
| PREAD | This instruction reads a data value rather than an instruction from program space. It then transfers that value to data memory or a register. For the read from program space, the core places the source address on the program address bus (PAB), sets the appropriate program-space select signals, and reads the data value from the program-read data bus (PRDB). |
| WRITE | This instruction writes a data value to program space. The value is read from data space or a register. For the write to program space, the core places the destination address on the program address bus (PAB), sets the appropriate program-space select signals, and writes the data value to the data-/program-write data bus (DWDB). |
| MAC | As part of its operation, this instruction multiplies two data values, one of which is read from program space. For the read from program space, the core places the program-space source address on the program address bus (PAB), sets the appropriate program-space select signals, and reads the program data value from the program read data bus (PRDB). |

The DSP core expects memory wrappers or peripheral-interface logic to align any 32-bit read or write to an even address. If the address-generation logic generates an odd address, the CPU must begin reading or writing at the previous even address. This alignment does not affect the address values generated by the address-generation logic.

Most instruction fetches from program space are performed as 32-bit read operations and are aligned accordingly. However, alignment of instruction fetches are effectively invisible to a programmer. When instructions are stored to program space, they do not have to be aligned to even addresses. Instruction boundaries are decoded within the core.

When using instructions that perform 32-bit reads from or writes to data space, alignment should be considered. Examples of alignment of data-memory accesses and the instructions that are subject to this alignment are provided later herein.

Figure 5:
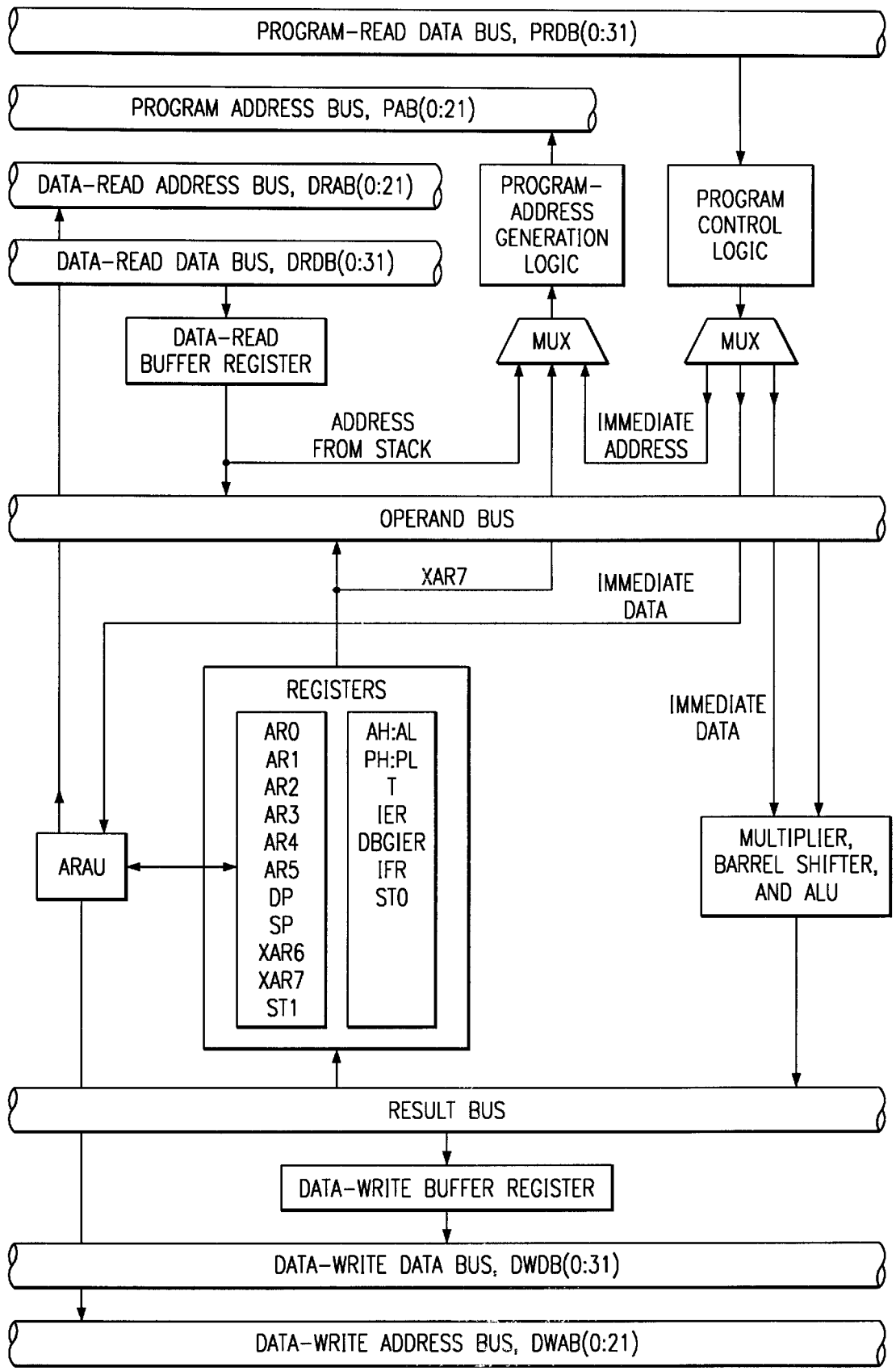
FIG. 5 is a block diagram of a CPU of FIG. 1.

The central processing unit (CPU) is responsible for controlling the flow of a program and the processing of instructions. It performs arithmetic, Boolean-logic, multiply, and shift operations. FIG. 5 shows the major blocks and data paths of the CPU of the DSP core of the present invention. The shaded buses are memory-interface buses that are external to the CPU. The main blocks of the CPU are:

a) program control logic—This logic stores a queue of instructions that have been fetched from program memory by way of the program-read bus (PRDB). It also decodes these instructions and passes commands and constant data to other parts of the CPU.

b) program address generation logic—This logic generates the addresses used to fetch instructions or data from program memory and places each address on the program address bus, (PAB). As part of its operation, the program-address generation logic uses several counters, addresses supplied by the program control logic, and addresses from the extended auxiliary register XAR7.

c) address register arithmetic unit (ARAU)—The ARAU generates addresses for values that must be fetched from data memory. For a data read, it places the address on the data-read address bus (DRAB); for a data write, it loads the data-write address bus (DWAB). The ARAU also increments or decrements the stack pointer (SP) and the auxiliary registers (AR0, AR1, AR2, AR3, AR4, AR5, XAR6, and XAR7).

d) arithmetic logic unit (ALU)—The 32-bit ALU performs 2s-complement arithmetic and Boolean logic operations. Before doing its calculations, the ALU accepts data from registers, from data memory, or from the program control logic. Inputs come from the registers, the program control logic, and the data-read data bus (DRDB). Results that go to data memory are sent to the data-/program-write data bus (DWDB).

e) multiplier—The multiplier performs 16-bit×16-bit 2s-complement multiplication with a 32-bit result. In conjunction with the multiplier, the DSP uses the 16-bit multiplicand register (T), the 32-bit product register (P), and the 32-bit accumulator (ACC). The T register supplies one of the values to be multiplied. The result of the multiplication can be sent to the P register or to ACC.

f) barrel shifter—The shifter performs all the shifts for the DSP. It can shift data to the left by up to 16 bits and to the right by up to 16 bits. The amount and direction of the shift is determined by the particular instruction that causes the shift.

Table 3 lists the main CPU registers and their values after reset. The registers are described in more detail later herein.

TABLE 3

CPU Register Summary

| Register | Size | Description | Value After Reset |
|---|---|---|---|
| ACC | 32 bits | Accumulator | $0000\_0000_{16}$ |
| AH | 16 bits | High half of ACC | $0000_{16}$ |
| AL | 16 bits | Low half of ACC | $0000_{16}$ |
| AR0 | 16 bits | Auxiliary register | $0\ 0000_{16}$ |
| AR1 | 16 bits | Auxiliary register 1 | $0000_{16}$ |
| AR2 | 16 bits | Auxiliary register 2 | $0000_{16}$ |
| AR3 | 16 bits | Auxiliary register 3 | $0000_{16}$ |
| AR4 | 16 bits | Auxiliary register 4 | $0000_{16}$ |
| AR5 | 16 bits | Auxiliary register 5 | $0000_{16}$ |
| XAR6 | 22 bits | Extended auxiliary register 6 | $00\ 0000_{16}$ |
| AR6 | 16 bits | 16 LSBs of XAR6 | $0000_{16}$ |
| XAR7 | 22 bits | Extended auxiliary register 7 | 00 000016 |
| AR7 | 16 bits | 16 LSBs of XAR7 | $0000_{16}$ |
| DP | 16 bits | Data page pointer | $0000_{16}$ |
| IFR | 16 bits | Interrupt flag register | $0000_{16}$ |
| IER | 16 bits | Interrupt enable register | $0000_{16}$ |
| DBGIER | 16 bits | Debug interrupt enable register | $0000_{16}$ |
| P | 32 bits | Product register | $0000\ 0000_{16}$ |
| PH | 16 bits | High half of P | $0000_{16}$ |
| PL | 16 bits | Low half of P | $0000_{16}$ |
| PC† | 22 bits | Program counter | If VMAP bit = 0<br>PC = [$00\_0000_{16}$]<br>If VMAP bit = 1<br>PC = [$3F\_FFC0_{16}$] |
| SP | 16 bits | Stack pointer | $0000_{16}$ |
| ST0 | 16 bits | Status register | $0\ 0000_{16}$ |

TABLE 3-continued

CPU Register Summary

| Register | Size | Description | Value After Reset |
|---|---|---|---|
| ST1‡ | 16 bits | Status register 1 | If VMAP input signal low ST1 = $0003_{16}$<br>If VMAP input signal high ST1 = $000B_{16}$ |
| T | 16 bits | Multiplicand register | $0000_{16}$ |

†The value in the PC after reset depends on the value in the VMAP bit at the time reset is initiated. The VMAP bit is bit 3 of ST1. The PC will be loaded with the reset vector at either address $00\_0000_{16}$ or address $3F\_FFC0_{16}$.
‡The value in ST1 after reset depends, in part, on the level on the VMAP input signal at the time reset is initiated. If the VMAP signal is low, bit 3 (VMAP) is cleared. If the VMAP signal is high bit 3 is set.

The accumulator (ACC) is the main working register for the CPU. It is the destination for all ALU operations except those which operate directly on memory and registers. ACC supports single-cycle move, add, subtract, and compare operations from 32-bit-wide data memory. It can also accept the 32-bit result of a multiplication operation. As depicted in FIG. 6, the halves and quarters of the ACC can also be individually accessed. ACC can be treated as two independent 16-bit registers: AH (high 16 bits) and AL (low 16 bits). The bytes within AH and AL can also be accessed independently. Special byte-move instructions load and store the most significant byte or least significant byte of AH or AL. This enables efficient byte packing and unpacking.

The following abbreviations are used in FIG. 6 and include the associated accumulator bit positions:
AH=ACC (31:16); AH.MSB=ACC (31:24); AH.LSB=ACC (23:16); AL=ACC (15:0); AL.MSB=ACC (15:8); and AL.LSB=ACC (7:0).

The accumulator has the following associated status bits. The details on these bits are described later herein with reference to a status register, ST0.

Overflow mode bit (OVM), Sign-extension mode bit (SXM), Test/control flag bit (TC), Carry bit (C), Zero flag bit (Z), Negative flag bit (N), Latched overflow flag bit (V), Overflow counter bits (OVC).

Table 4 below shows the ways to shift the content of AH, AL, or ACC.

TABLE 4

Available Operations for Shifting Values in the Accumulator

| Register | Shift Direction | Shift Type | Instruction |
|---|---|---|---|
| ACC | Left | Logical | LSL |
|  |  | Rotation | ROL |
|  | Right | Arithmetic | SFR with SXM = 1 |
|  |  | Logical | SFR with SXM = 0 |
|  |  | Rotation | ROR |
| AH or AL | Left | Logical | LSL |
|  | Right | Arithmetic | ASR |
|  |  | Logical | LSR |

The multiplicand register (T register) is primarily used to store a 16-bit signed integer value prior to a multiply operation. During every multiplication, one of the multiplicands is taken from the T register. For some left and right barrel-shift operations, the shift amount (0 to 15) is determined by the four least significant bits of the T register. In these shift operations, the 12 most significant bits of T are ignored. The contents of T can be stored back to memory.

The product register (P register) (P/PH, PL) is typically used to hold the 32-bit result of a 16×16 multiplication. It can also be loaded directly from a 16- or 32-bit data-memory location, a 16-bit constant, the 32-bit ACC, or a 16-bit addressable CPU register. As shown in FIG. 7, the P register may be treated as a 32-bit register or as two independent 16-bit registers: PH (high 16 bits) and PL (low 16 bits).

When an instruction accesses P, PH, or PL, all 32-bits are copied to the ALU-shifter block, where the barrel shifter may perform a left shift, a right shift, or no shift. Then the entire 32 bits (P) or the upper or lower 16 bits (PH or PL) are used in an ALU calculation or stored. The action of the shifter is determined by the product shift mode (PM) bits in status register ST0. Table 5 below shows the possible PM values and the corresponding product shift modes. When the barrel shifter performs a left shift, the low order bits are filled with zeros. When the shifter performs a right shift, the P register value is sign extended. Instructions that use PH or PL as operands ignore the product shift mode.

TABLE 5

Product Shift Modes

| PM Value | Product Shift Mode |
|---|---|
| $000_2$ | Left shift by 1 |
| $001_2$ | No shift |
| $010_2$ | Right shift by 1 |
| $011_2$ | Right shift by 2 |
| $100_2$ | Right shift by 3 |
| $101_2$ | Right shift by 4 |
| $110_2$ | Right shift by 5 |
| $111_2$ | Right shift by 6 |

In the direct addressing modes, data memory is addressed in blocks of 64 words called data pages. The entire 4M words of data memory consists of 65 536 data pages labeled 0 through 65 535, as shown in FIG. 8. In DP direct addressing mode, the 16-bit data page pointer (DP) holds the current data page number. The data page is changed by loading the DP with a new number.

Figure 9:
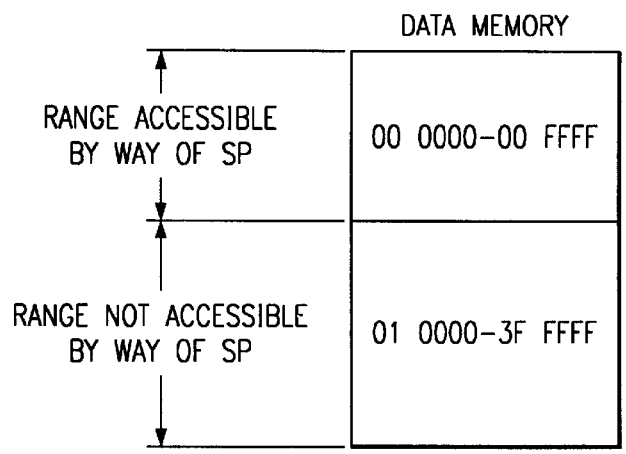
FIG. 9 shows Address Reach of the Stack Pointer.

The stack pointer (SP) enables the use of a software stack in data memory. As depicted in FIG. 9, the stack pointer has only 16 bits and can only address the low 64K of data space. When the SP is used, the upper six bits of the 22-bit address are forced to 0. (For information about addressing modes that use the SP). After reset, SP points to address 00 $0000_{16}$.

The operation of the stack is as follows: the stack grows from low memory to high memory; the SP always points to the next empty location in the stack; at reset, the SP is cleared, so that it points to address $000000_{16}$.

When 32-bit values are saved to the stack, the least significant 16 bits are saved first, and the most significant 16 bits are saved to the next higher address (little endian format).

When 32-bit operations read or write a 32-bit value, the DSP core expects the memory wrapper or peripheral-interface logic to align that read or write to an even address. For example, if the SP contains the odd address $000083_{16}$, a 32-bit read operation reads from addresses $000082_{16}$ and $000083_{16}$.

The SP will overflow if its value is increased beyond $FFFF_{16}$ or decreased below $0000_{16}$. When the SP increases past $FFFF_{16}$, it counts forward from $0000_{16}$. For example, if SP=$FFFE_{16}$ and an instruction adds 3 to the SP, the result is $0001_{16}$. When the SP decreases past $0000_{16}$, it counts backward from $FFFF_{16}$. For example, if SP=$0002_{16}$ and an instruction subtracts 4 from SP, the result is $FFFE_{16}$.

When values are being saved to the stack, the SP is not forced to align with even or odd addresses. Alignment is forced by the memory wrapper or peripheral-interface logic.

The CPU provides eight auxiliary registers that can be used as pointers to memory. There are six 16-bit auxiliary registers (AR0, AR1, AR2, AR3, AR4, and AR5), and two 22-bit extended auxiliary registers (XAR6 and XAR7).

Figure 10:
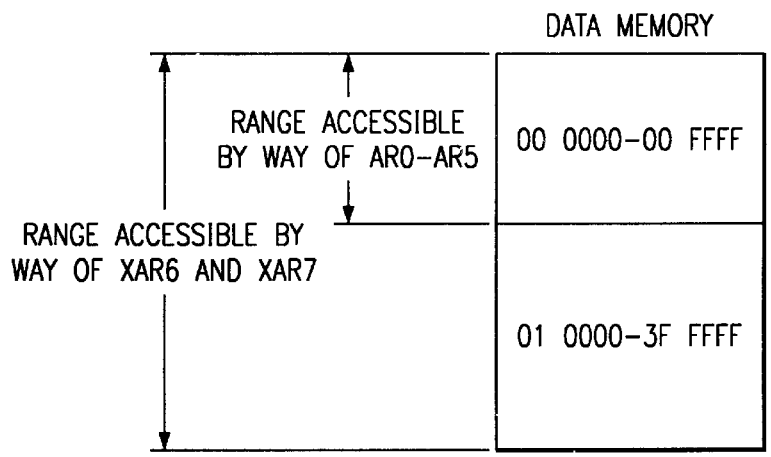
FIG. 10 shows Address Reach of the Auxiliary Registers.

FIG. 10 shows the ranges of data memory accessible to the 16-bit and 22-bit auxiliary registers. Because AR0–AR5 are 16-bits wide, their range is limited to addresses 00 $0000_{16}$–00 $FFFF_{16}$. When one of these six auxiliary registers is used, the content of the auxiliary register (or the content plus an offset) is concatenated with six leading zeros to form the full 22-bit address. XAR6 and XAR7, being 22 bits wide, can be used to access the full range of data memory. XAR7 can also be used by some instructions to point to any value in program memory.

Figure 11:
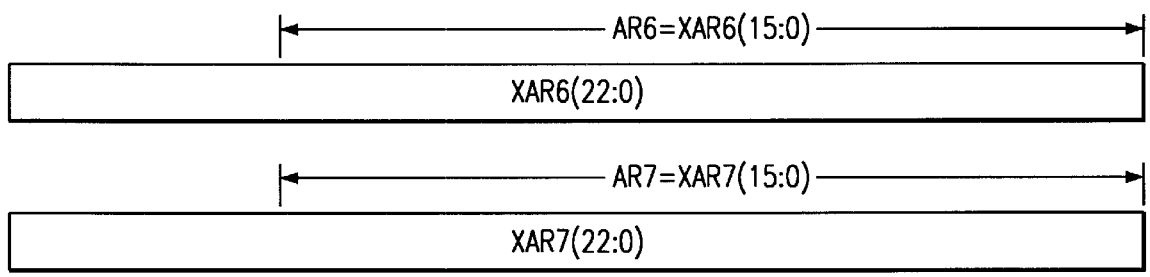
FIG. 11 AR6 and AR7.

Although the addressing modes use the full extended auxiliary registers, many instructions allow you to access the 16 least significant bits (LSBs) of XAR6 and XAR7. As shown in FIG. 11, the 16 LSBs of XAR6 are known as auxiliary register AR6, and the 16 LSBs of XAR7 are known as auxiliary register AR7.

When the pipeline is full, the 22-bit program counter (PC) always points to the instruction that is currently being processed—the instruction that has just reached the decode 2 phase of the pipeline. Once an instruction reaches this phase of the pipeline, it cannot be flushed from the pipeline by an interrupt. It is executed before the interrupt is taken.

The DSP has two status registers, ST0 and ST1, which contain various flag bits and control bits. These registers can be stored into and loaded from data memory, enabling the status of the machine to be saved and restored for subroutines. FIG. 12 and FIG. 13 show the organization of status registers ST0 and ST1, respectively. The status bits have been organized according to when the bit value is modified in the pipeline. Bits in ST0 are modified in the execute phase of the pipeline; bits in ST1 are modified in the decode 2 phase. The status bits are described in detail later herein.

In FIGS. 12 and 13, R means a Read access and W means a Write access; the value following dash (–) is value after reset. Reserved bits are always 0s and are not affected by writes. In FIG. 13, the value of the VMAP bit after reset depends on the level of the VMAP input signal at reset. If the VMAP signal is low, the VMAP bit is 0 after reset; if the VMAP signal is high, the VMAP bit is 1 after reset.

The DSP has three registers dedicated to the control of interrupts: interrupt flag register (IFR); interrupt enable register (IER); and debug interrupt enable register (DBGIER).

The IFR contains flag bits for maskable interrupts (those that can be enabled and disabled with software). When one of these flags is set, by hardware or software, the corresponding interrupt will be serviced if it is enabled. A maskable interrupt is enabled or disabled by its corresponding bit in the IER. The DBGIER indicates the time-critical interrupts that will be serviced (if enabled) while the DSP is in real-time emulation mode and the CPU is halted. The DSP interrupts and the interrupt-control registers are described later herein.

FIG. 14 shows the bit fields of status register ST0. All of these bit fields are modified in the execute phase of the pipeline. Detailed descriptions of these bits follow the figure.

In FIG. 14, R means a Read access and W means a Write access; the value following dash (–) is value after reset.

In FIG. 14, bits 15–10 are the overflow counter (OVC). The overflow counter is a 6-bit signed counter with a range of –32 to 31. When overflow mode is on (OVM=1) and an overflow occurs in ACC, the CPU automatically fills ACC with a positive or negative saturation. When overflow mode is off (OVM=0 ), ACC overflows normally, and OVC can be used to in-crease the effective dynamic range of ACC to 38 bits.

When ACC overflows in the positive direction (from 7FFFF FFFF$_{16}$ to 8000 0000$_{16}$) the OVC is incremented by 1. When ACC overflows in the negative direction (from 8000 0000$_{16}$ to 7FFF FFFF$_{16}$) the OVC is decremented by 1. The increment or decrement is performed as the overflow affects the V flag.

If OVC increments past its most positive value, 31, the counter wraps around to −32. If OVC decrements past its most negative value, −32, the counter wraps around to 31. At reset, OVC is cleared. OVC is not affected by overflows in registers other than ACC and is not affected by compare instructions (CMP and CMPL). Table 6 below, explains how OVC may be affected by the saturate accumulator (SAT ACC) instruction.

TABLE 6

Operation Performed by SAT ACC Instruction

| Condition | Operation Performed by SAT ACC Instruction |
|---|---|
| OVC = 0 | Leave ACC and OVC unchanged. |
| OVC > 0 | Saturate ACC in the positive direction (fill ACC with 7FFF FFFF$_{16}$), and clear OVC. |
| OVC < 0 | Saturate ACC in the negative direction (fill ACC with 8000 0000$_{16}$), and clear OVC. |

In FIG. 14, bits 9–7 are product shift mode bits (PM). This 3-bit value determines the shift mode for any output operation from the product (P) register. The shift modes are shown in Table 7. The output can be to the ALU or to memory. All instructions that are affected by the product shift mode will sign extend the P register value during a right shift operation. At reset, PM is cleared.

TABLE 7

Product Shift Mode

| PM | Product Shift Mode |
|---|---|
| 000 | Left shift by 1. During the shift, the low-order bit is zero filled. At reset, this mode is selected. |
| 001 | No shift |
| 010 | Right shift by 1. During the shift, the lower bits are lost, and the shifted value is sign extended. |
| 011 | Right shift by 2. During the shift, the lower bits are lost, and the shifted value is sign extended. |
| 100 | Right shift by 3. During the shift, the lower bits are lost, and the shifted value is sign extended. |
| 101 | Right shift by 4. During the shift, the lower bits are lost, and the shifted value is sign extended. |
| 110 | Right shift by 5. During the shift, the lower bits are lost, and the shifted value is sign extended. |
| 111 | Right shift by 6. During the shift, the lower bits are lost, and the shifted value is sign extended. |

Note:
If performing unsigned arithmetic use a product shift of 0 (PM = 001) to avoid sign extension and generation of incorrect results.

In FIG. 14, bit 6 is the overflow flag (V). If the result of an operation causes an overflow in the register holding the result, V is set and latched. If no overflow occurs, V is not modified. Once V is latched, it remains set until it is cleared by reset or by a conditional branch instruction that tests V. Such a conditional branch clears V regardless of whether the tested condition (V=0 or V=1) is true.

An overflow occurs in ACC (and V is set) if the result of an addition or subtraction does not fit within the signed numerical range −2$_{31}$ to (+2$_{31}$−1), or 800 000$_{16}$ to 7FFF FFFF$_{16}$. An overflow occurs in AH, AL, or another 16-bit register or data-memory location if the result of an addition or subtraction does not fit within the signed numerical range −2$_{15}$ to (+2$_{15}$−1), or 8000$_{16}$ to 7FFF$_{16}$.

Compare instructions (CMP, CMPB and CMPL) do not affect the state of the flag. V can be summarized in Table 8 as follows:

TABLE 8

V Condition

| V | Condition |
|---|---|
| 0 | V has been cleared. |
| 1 | An overflow has been detected, or V has been set. |

In FIG. 14, bit 5 is the negative flag (N). During certain operations, N is set if the result of the operation is a negative number or cleared if the result is a positive number. At reset, N is cleared. Results in ACC are tested for the negative condition. Bit 31 of ACC is the sign bit. If bit 31 is a 0, ACC is positive; if bit 31 is a 1, ACC is negative. N is set if a result in ACC is negative or cleared if a result is positive.

Results in AH, AL, and other 16-bit registers or data-memory locations are also tested for the negative condition. In these cases bit 15 of the value is the sign bit (1 indicates negative, 0 indicates positive). N is set if the value is negative or cleared if the value is positive.

The TEST ACC instruction sets N if the value in ACC is negative. Otherwise the instruction clears N. As shown in Table 9, for compare operations, the N flag is set differently under overflow conditions than for addition or subtraction operations. For addition or subtraction operations, the N flag is set to match the most significant bit of the truncated result. For compare operations, the N flag assumes infinite precision. This applies to operations whose result is loaded to ACC, AH, AL, another register, or a data-memory location.

TABLE 9

| | | | Overflow | |
|---|---|---|---|---|
| A† | B† | (A - B) | Subtraction | Compare‡ |
| Pos | Neg | Neg (due to overflow in positive direction) | N = 1 | N = 0 |
| Neg | Pos | Pos (due to overflow in negative direction) | N = 0 | N = 1 |

†For 32-bit data:
Pos = Positive number from 0000 0000$_{16}$ to 7FFF FFFF$_{16}$
Neg = Negative number from 8000 0000$_{16}$ to FFFF FFFF$_{16}$
For 16-bit data:
Pos = Positive number from 0000$_{16}$ to 7FFF$_{16}$
Neg = Negative number from 8000$_{16}$ to FFFF$_{16}$
‡The compare instructions are CMP, CMPB, and CMPL.

N can be summarized as follows:

TABLE 10

N Condition

| N | Condition |
|---|---|
| 0 | The tested number is positive, or N has been cleared. |
| 1 | The tested number is negative, or N has been cleared |

In FIG. 14, bit 4 is the zero flag (Z). Z is set if the result of certain operations is 0 or is cleared if the result is nonzero. This applies to results that are loaded into ACC, AH, AL, another register, or a data-memory location. At reset, Z is cleared. The TEST ACC instruction sets Z if the value in ACC is 0. Otherwise, it clears Z. Z can be summarized as follows:

TABLE 11

Z Condition

| Z | Condition |
|---|---|
| 0 | The tested number is nonzero, or Z has been cleared. |
| 1 | The tested number is zero, or Z has been cleared |

In FIG. 14, bit 3 is the carry bit (C). This bit indicates when an addition or increment generates a carry or when a subtraction, compare, or decrement generates a borrow. It is also affected by rotate operations on ACC and barrel shifts on ACC, AH, and AL. During additions/increments, C is set if the addition generates a carry; otherwise C is cleared. There is one exception: when using the ADD instruction with a shift of 16, the ADD instruction can set C but cannot clear C.

During subtractions/decrements/compares, C is cleared if the subtraction generates a carry; otherwise C is set. There is one exception: when using the SUB instruction with a shift of 16, the SUB instruction can clear C but can-not set C. This bit can be individually set and cleared by the SETC C instruction and CLRC C instruction, respectively. At reset, C is cleared. C can be summarized as follows:

TABLE 12

C Condition

| C | Condition |
|---|---|
| 0 | A subtraction generated a borrow, an addition did not generate a carry, or C has been cleared. Exception: An ADD instruction with a shift of 16 cannot clear C. |
| 1 | An addition generated a carry, a subtraction did not generate a borrow, or C has been set. Exception: A SUB instruction with a shift of 16 cannot set C. |

In FIG. 14, bit 2 is the test/control flag (TC). This bit shows the result of a test performed by either the TBIT (test bit) instruction or the NORM (normalize) instruction. The TBIT instruction tests a specified bit. When TBIT is executed, the TC bit is set if the tested bit is 1 or cleared if the tested bit is 0. When a NORM instruction is executed, TC is modified as follows: If ACC holds 0, TC is set. If ACC does not hold 0, the CPU calculates the exclusive- OR of ACC bits 31 and 30, and then loads TC with the result. This bit can be individually set and cleared by the SETC TC instruction and CLRC TC instruction, respectively. At reset, TC is cleared.

In FIG. 14, bit 1 is the overflow mode bit (OVM). When ACC accepts the result of an addition or subtraction and the result causes an overflow, OVM determines how the CPU handles the overflow:

TABLE 13

How ACC Overflow is Handled

| OVM | How ACC Overflow is Handled |
|---|---|
| 0 | Results overflow normally in ACC. |
| 1 | ACC is filled with either its most positive or most negative value as follows: If ACC overflows in the positive direction (from 7FFF FFFF$_{16}$ to |

TABLE 13-continued

How ACC Overflow is Handled

| OVM | How ACC Overflow is Handled |
|---|---|
| | 8000 0000$_{16}$), ACC is then filled with 7FFF FFFF$_{16}$. If ACC overflows in the negative direction (from 8000 0000$_{16}$ to 7FFF FFFF$_{16}$), ACC is then filled with 8000 0000$_{16}$. |

This bit can be individually set and cleared by the SETC OVM instruction and CLRC OVM instruction, respectively. At reset, OVM is cleared.

In FIG. 14, bit 0 is the sign-extension mode bit (SXM). When data is shifted before it is loaded into, added to, or subtracted from the accumulator, SXM determines whether the data is sign extended during the shift:

TABLE 14

Sign Extension Mode

| SXM | Sign Extension Mode |
|---|---|
| 0 | Sign extension is suppressed. |
| 1 | Sign extension is enabled. |

SXM affects the ADD, SUB, and MOV instructions that shift a 16-bit value before using it in an operation on the 32-bit ACC. SXM also determines whether ACC is sign extended when it is shifted right by the SFR instruction. SXM does not affect instructions that shift the product register value; all right shifts of the product register value use sign extension. This bit can be individually set and cleared by the SETC SXM instruction and CLRC SXM instruction, respectively. At reset, SXM is cleared.

FIG. 15 shows the bit fields of status register ST1. All of these bit fields are modified in the decode 2 phase of the pipeline. Detailed descriptions of these bits are provided later herein.

In FIG. 15, R means a Read access and W=Write access; the value following dash (–) is value after reset; reserved bits are always 0s and are not affected by writes. In FIG. 15, the value of the VMAP bit after reset depends on the level of the VMAP input signal at reset. If the VMAP signal is low, the VMAP bit is 0 after reset; if the VMAP signal is high, the VMAP bit is 1 after reset.

In FIG. 15, bits 15–13 are the auxiliary register pointer (ARP). This 3-bit field points to the current auxiliary register. This could be one of the 16-bit auxiliary registers (AR0 to AR5) or one of the 22-bit extended auxiliary registers (XAR6 or XAR7). The mapping of ARP values to auxiliary registers is as follows:

TABLE 15

Selected Auxiliary Register

| ARP | Selected Auxiliary Register |
|---|---|
| 000 | AR0 (selected at reset) |
| 001 | AR1 |
| 010 | AR2 |
| 011 | AR3 |
| 100 | AR4 |
| 101 | AR5 |
| 110 | XAR6 |
| 111 | XAR7 |

In FIG. 15, bits 12–8 are reserved and writes to these bits have no effect.

In FIG. 15, bit 7 is the IDLE status bit (IDLESTAT). This read-only bit is set when the IDLE instruction is executed. It is cleared by any one of the following events: an interrupt is serviced; an interrupt is not serviced but takes the core out of the IDLE state; a valid instruction enters the instruction register (the register that holds the instruction currently being decoded); and a device reset occurs.

When the CPU services an interrupt, the current value of IDLESTAT is saved on the stack (when ST1 is saved on the stack), and then IDLESTAT is cleared. Upon return from the interrupt, IDLESTAT is not restored from the stack.

In FIG. 15, bit 6 is the emulation access enable bit (EALLOW). This bit, when set, enables access to emulation registers. EALLOW is set by the EALLOW instruction and cleared by the EDIS instruction. EALLOW is written to by using the POP ST1 instruction or the POP DP:ST1 instruction. When the CPU services an interrupt, the current value of EALLOW is saved on the stack (when ST1 is saved on the stack), and then EALLOW is cleared. Therefore, at the start of an interrupt service routine (ISR), access to emulation registers is disabled. If the ISR must access emulation registers, it must include an EALLOW instruction. At the end of the ISR, EALLOW can be restored by the IRET instruction.

In FIG. 15, bit 5 is the Loop instruction status bit (LOOP). LOOP is set when a loop instruction (LOOPNZ or LOOPZ) reaches the decode 2 phase of the pipeline. The loop instruction does not end until a specified condition is met. When the condition is met, LOOP is cleared. LOOP is a read-only bit; it is not affected by any instruction except a loop instruction. When the CPU services an interrupt, the current value of LOOP is saved on the stack (when ST1 is saved on the stack), and then LOOP is cleared. Upon return from the interrupt, LOOP is not restored from the stack.

In FIG. 15, bit 4 is the Stack pointer alignment bit (SPA). SPA indicates whether the CPU has previously aligned the stack pointer to an even address:

TABLE 16

| SPA | Condition |
|---|---|
| | SPA Condition |
| 0 | The stack pointer has not been aligned to an even address. |
| 1 | The stack pointer has been aligned to an even address. |

When the align stack pointer (ASP) instruction is executed, if the stack pointer (SP) points to an odd address, SP is incremented by 1 so that it points to an even address, and SPA is set. If SP already points to an even address, SP is not changed, but SPA is cleared. When the unalign stack pointer (NASP) instruction is executed, if SPA is 1, SP is decremented by 1, and SPA is cleared. At reset, SPA is cleared.

In FIG. 15, bit 3 is the Vector map bit (VMAP). VMAP determines whether the interrupt vectors (including the reset vector) are mapped to the lowest or highest addresses in program memory:

TABLE 17

| VMAP | Condition |
|---|---|
| | VMAP Condition |
| 0 | Interrupt vectors are mapped to the bottom of program memory, addresses $000000_{16}$ - $00003F_{16}$. |

TABLE 17-continued

| VMAP | Condition |
|---|---|
| | VMAP Condition |
| 1 | Interrupt vectors are mapped to the top of program memory, addresses $3FFFC0_{16}$ - $3FFFFF_{16}$. |

The core input signal VMAP, is sampled on reset. If the signal is high, the VMAP bit is set. If the signal is low, the VMAP bit is cleared. The output core signal VMAPS reflects the status of the VMAP bit. This bit can be individually set and cleared by the SETC VMAP instruction and CLRC VMAP instruction, respectively.

In FIG. 15, bit 2 is the PAGE0 addressing modes configuration bit (PAGE0). PAGE0 selects between two mutually-exclusive addressing modes: PAGE0 direct addressing mode and PAGE0 stack addressing mode. Selection of the modes is as follows:

TABLE 18

| PAGE0 | Addressing Mode Enabled |
|---|---|
| | Addressing Mode Enabled |
| 0 | PAGE0 stack addressing mode |
| 1 | PAGE0 direct addressing mode |

This bit can be individually set and cleared by the SETC PAGE0 instruction and CLRC PAGE0 instruction, respectively. At reset, the PAGE0 bit is cleared (PAGE0 stack addressing mode is selected).

In FIG. 15, bit 1 is the Debug enable mask bit (DBGM). DBGM is primarily used in emulation to block debug events in time-critical portions of program code. DBGM enables or disables debug events as follows:

TABLE 19

| DBGM | Condition |
|---|---|
| | DBGM Condition |
| 0 | Debug events are enabled. |
| 1 | Debug events are disabled. |

When the CPU services an interrupt, the current value of DBGM is saved on the stack (when ST1 is saved on the stack), and then DBGM is set. Upon return from the interrupt, DBGM is restored from the stack. This bit can be individually set and cleared by the SETC DBGM instruction and CLRC DBGM instruction, respectively. DBGM is also set automatically during interrupt operations. At reset, DBGM is set. Executing the ABORTI (abort interrupt) instruction also sets DBGM.

In FIG. 15, bit 0 is the Interrupt global mask bit (NTM). This bit globally enables or disables all maskable interrupts (those that can be blocked by software):

TABLE 20

| INTM | Condition |
|---|---|
| | INTM Condition |
| 0 | Maskable interrupts are globally enabled. In order to be acknowledged by the CPU, a maskable interrupt must also be |

TABLE 20-continued

INTM Condition

| INTM | Condition |
|---|---|
|  | locally enabled by the interrupt enable register (IER). |
| 1 | Maskable interrupts are globally disabled. Even if a maskable interrupt is locally enabled by the interrupt enable register (IER), it is not acknowledged by the CPU. |

INTM has no effect on the nonmaskable interrupts, including a hardware re-set or the hardware interrupt NMI. The state of INTM is saved/restored whenever status register ST1 is pushed to/popped from the stack. When the CPU services an interrupt, the current value of INTM is saved on the stack (when ST1 is saved on the stack), and then INTM is set. Upon return from the interrupt, INTM is restored from the stack. This bit can be individually set and cleared by the SETC INTM instruction and CLRC INTM instruction, respectively. At reset, INTM is set. The value in INTM does not cause modification to the interrupt flag register (IFR), the interrupt enable register (IER), or the debug interrupt enable register (DBGIER). When the CPU is halted in real-time emulation mode, an interrupt enabled by the IER and the DBGIER will be serviced even if INTM is set to disable maskable interrupts.

The program control logic and program-address generation logic work together to provide proper program flow. Normally, the flow of a program is sequential: the CPU executes instructions at consecutive program-memory addresses. At times, a discontinuity is required; that is, a program must branch to a non-sequential address and then execute instructions sequentially at that new location. For this purpose, the DSP supports interrupts, branches, calls, returns, and repeats. Proper program flow also requires smooth flow at the instruction level. To meet this need, the DSP supports a fully protected pipeline and an instruction-fetch mechanism that attempts to keep the pipeline full.

Interrupts are hardware- or software-driven events that cause the CPU to suspend its current program sequence and execute a subroutine called an interrupt service routine. Interrupts are described in detail later herein.

Branches, calls, and returns break the sequential flow of instructions by transferring control to another location in program memory. A branch only transfers control to the new location. A call also saves the return address (the address of the instruction following the call). Every called subroutine or interrupt service routine is concluded with a return instruction, which pops the return address off the stack and back into the program counter (PC). The branch instructions B, SB, and BANZ are conditional. They are executed only if a certain specified or predefined condition is met.

The repeat (RPT) instruction allows the execution of a single instruction (N +1) times, where N is specified as an operand of the RPT instruction. The instruction is executed once and then repeated N times. When RPT is executed, the repeat counter (RPTC) is loaded with N. RPTC is then decremented every time the repeated instruction is executed, until RPTC equals 0.

Each instruction passes through eight independent phases that form an instruction pipeline. At any given time, up to eight instructions may be active, each in a different phase of completion. Not all reads and writes happen in the same phases, but a pipeline-protection mechanism stalls instructions as needed to ensure that reads and writes to the same location happen in the order in which they are programmed. To maximize pipeline efficiency, an instruction-fetch mechanism attempts to keep the pipeline full. Its role is to fill an instruction-fetch queue, which holds instructions in preparation for decoding and execution. The instruction-fetch mechanism fetches 32-bits at a time from program memory; it fetches one 32-bit instruction or two 16-bit instructions.

The instruction-fetch mechanism uses three program-address counters: the program counter (PC), the instruction counter (IC), and the fetch counter (FC). When the pipeline is full the PC will always point to the instruction in its decode 2 pipeline phase. The IC points to the next instruction to be processed. When the PC points to a 1-word instruction, IC=(PC+1); when the PC points to a 2-word instruction, IC=(PC+2). The value in the FC is the address from which the next fetch is to be made.

The DSP has a 16-bit×16-bit hardware multiplier that can produce a 32-bit signed or unsigned 32-bit product. FIG. 16 shows the CPU components involved in multiplication. The multiplier accepts two 16-bit inputs:

a) One input is always from the 16-bit multiplicand register (T). Most DSP multiply instructions require loading T from a data-memory location or a register before executing the instruction. However, the MAC instruction, one syntax of the MPY instruction, and one syntax of the MPYA instruction also load T before the multiplication.

b) The other input is from one of the following:
   i) A data-memory location or a register (depending on which is specified in the multiply instruction).
   ii) An instruction opcode. Some DSP multiply instructions allow including a constant as an operand.

After the T register value has been multiplied by the second value, the 32-bit result is stored in one of two places, depending on the particular multiply instruction: the 32-bit product register (P) or the 32-bit accumulator (ACC).

The shifter holds 32 bits and accepts either a 16-bit or 32-bit input value. When the input value has 16 bits, the value is loaded into the 16 least significant bits (LSBs) of the shifter. Depending on the instruction that uses the shifter, the output of the shifter may be all of its 32 bits or just its 16 LSBs. When a value is shifted right by an amount N, the N LSBs of the value are lost and the bits to the left of the value are filled with all 0s or all 1s. If sign extension is specified, the bits to the left are filled with copies of the sign bit. If sign extension is not specified, the bits to the left are filled with 0s, or zero filled.

When a value is shifted left by an amount N, the bits to the right of the shifted value are zero filled. If the value has 16 bits and sign extension is specified, the bits to the left are filled with copies of the sign bit. If the value has 16 bits and sign extension is not specified, the bits to the left are zero filled. If the value has 32 bits, the N most significant bits (MSBs) of the value are lost, and sign extension is irrelevant.

FIGS. 18A–18C list the instructions that use the shifter, provides an illustration of the corresponding shifter operation and uses the graphical symbols depicted in FIG. 17.

The following describes the available interrupts and how they are handled by the CPU. It also explains how to control those interrupts that can be controlled through software. Finally, it describes how a hardware reset affects the CPU.

Interrupts are hardware- or software-driven signals that cause the DSP to suspend its current program sequence and execute a subroutine. Typically, interrupts are generated by hardware devices that need to give data to or take data from the DSP (for example, A/D and D/A converters and other processors). Interrupts can also signal that a particular event has taken place (for example, a timer has finished counting).

On the DSP, interrupts can be triggered by software (the INTR, OR IFR, or TRAP instruction) or by hardware (a pin, a peripheral, or on-chip logic). If hardware interrupts are triggered at the same time, the DSP services them according to a set priority ranking. Each of the DSP interrupts, whether hardware or software, can be placed in one of the following two categories:

a) Maskable interrupts. These are interrupts that can be blocked (masked) or enabled (unmasked) through software.

b) Nonmaskable interrupts. These interrupts cannot be blocked. The DSP will immediately approve this type of interrupt and branch to the corresponding subroutine. All software-initiated interrupts are in this category.

The DSP handles interrupts in four main phases:

1) Receive the interrupt request. Suspension of the current program sequence must be requested by a software interrupt (from program code) or a hardware interrupt (from a pin or an on-chip device).

2) Approve the interrupt The DSP must approve the interrupt request. If the interrupt is maskable, certain conditions must be met in order for the DSP to approve it. For nonmaskable hardware interrupts and for software interrupts, approval is immediate.

3) Prepare for the interrupt service routine and save registers. The main tasks performed in this phase are:

Complete execution of the current instruction and flushes from the pipeline any instructions that have not reached the decoded 2 phase;

Automatically save most of the current program context by saving the following registers to the stack: ST0, T, AL, AH, PL, PH, AR0, AR1, DP, ST1, DBGSTAT, and IER; and Fetch the interrupt vector and load it into the PC.

4) Execute the interrupt service routine. The DSP branches to its corresponding subroutine called an interrupt service routine (ISR). The DSP branches to the address (vector) stored at a predetermined vector location and executes the ISR.

The DSP supports 32 interrupt vectors, including the reset vector. Each vector is a 22-bit address that is the start address for the corresponding interrupt service routine (ISR). Each vector is stored in 32 bits at two consecutive addresses. The lower address holds the 16 least significant bits (LSBs) of the vector. The higher address holds the 6 most significant bits (MSB) right-justified. When an interrupt is approved, the 22-bit vector is fetched, and the 10 MSBs at the higher address are ignored.

Table 21 lists the available interrupt vectors and their locations. The addresses are shown in hexadecimal form. The table also shows the priority of each of the hardware interrupts.

TABLE 21

Interrupt Vectors and Priorities

| Vector | Absolute Address (hexadecimal) VMPA = 0 | VMAP = 1 | Hardware Priority | Description |
| --- | --- | --- | --- | --- |
| RESET | 000000 | 3FFFC0 | 1 (highest) | Reset |
| INT1 | 000002 | 3FFFC2 | 5 | Maskable interrupt 1 |
| INT2 | 000004 | 3FFFC4 | 6 | Maskable interrupt 2 |
| INT3 | 000006 | 3FFFC6 | 7 | Maskable interrupt 3 |
| INT4 | 000008 | 3FFFC8 | 8 | Maskable interrupt 4 |
| INT5 | 00000A | 3FFFCA | 9 | Maskable interrupt 5 |
| INT6 | 00000C | 3FFFCC | 10 | Maskable interrupt 6 |
| INT7 | 00000E | 3FFFCE | 11 | Maskable interrupt 7 |
| INT8 | 000010 | 3FFFD0 | 12 | Maskable interrupt 8 |
| INT9 | 000012 | 3FFFD2 | 13 | Maskable interrupt 9 |
| INT10 | 000014 | 3FFFD4 | 14 | Maskable interrupt 10 |
| INT11 | 000016 | 3FFFD6 | 15 | Maskable interrupt 11 |
| INT12 | 000018 | 3FFFD8 | 16 | Maskable interrupt 12 |
| INT13 | 00001A | 3FFFDA | 17 | Maskable interrupt 13 |
| INT14 | 00001C | 3FFFDC | 18 | Maskable interrupt 14 |
| DLOGTNT† | 00001E | 3FFFDE | 19 (lowest) | Maskable data log interrupt |
| RTOSINT† | 000020 | 3FFFE0 | 4 | Maskable real-time operating system interrupt |
| Reserved | 000022 | 3FFFE2 | — | Reserved |
| NMI | 000024 | 3FFFE4 | 3 | Nonmaskable interrupt |
| ILLEGAL | 000026 | 3FFFE6 | — | illegal-instruction trap |
| USER1 | 000028 | 3FFFE8 | — | User-defined software interrupt |
| USER2 | 00002A | 3FFFEA | — | User-defined software interrupt |
| USER3 | 00002C | 3FFFEC | — | User-defined software interrupt |
| USER4 | 00002E | 3FFFEE | — | User-defined software interrupt |
| USER5 | 000030 | 3FFFF0 | — | User-defined software interrupt |
| USER6 | 000032 | 3FFFF2 | — | User-defined software interrupt |
| USER7 | 000034 | 3FFFF4 | — | User-defined software interrupt |
| USER8 | 000036 | 3FFFF6 | — | User-defined software interrupt |
| USER9 | 000038 | 3FFFF8 | — | User-defined software interrupt |
| USER10 | 00003A | 3FFFFA | — | User-defined software interrupt |
| USER11 | 00003C | 3FFFFC | — | User-defined software interrupt |
| USER12 | 00003E | 3FFFFE | — | User-defined software interrupt |

\Interrupts DLOGINT and RTOSINT are generated by the emulation hardware internal to the core.

The vector table can be mapped to the top or bottom of program space, depending on the value of the vector map bit (VMAP) in status register ST1. If the VMAP bit is 0, the vectors are mapped beginning at address $000000_{16}$. If the VMAP bit is 1, the vectors are mapped beginning at address $3FFFC0_{16}$. Table 21 lists both address offsets and absolute addresses. The VMAP bit can be set by the SETC VMAP instruction and cleared by the CLRC VMAP instruction. The input core signal VMAP, sampled only at reset, determines the reset value of the VMAP bit. The state of the VMAP bit is also reflected at the output core signal VMAPS.

$\overline{\text{INT1}}$–$\overline{\text{IN14}}$ are 14 general-purpose interrupts. DLOGINT (the data log interrupt) and RTOSINT (the real-time operating system interrupt) are available for emulation purposes. These interrupts are supported by three dedicated registers: the interrupt flag register (IFR), the interrupt enable register (IER), and the debug interrupt enable register (DBGIER).

The 16-bit interrupt flag register (IFR) contains flag bits that indicate which of the corresponding interrupts are pending (waiting approval from the CPU). The external input lines $\overline{\text{INT1}}$–$\overline{\text{IN4}}$ are sampled at every CPU clock cycle. If an active interrupt is recognized, the corresponding bit in the IFR is set and latched. For DLOGINT or RTOSINT, a signal sent by the core's on-chip analysis logic causes the corresponding flag bits to be set and latched. One or more of the IFR bits may be set at the same time by using the OR IFR instruction.

The interrupt enable register (IER) and the debug interrupt enable register (DBGIER) each contain bits for individually enabling or disabling $\overline{\text{INT1}}$–$\overline{\text{IN14}}$, DLOGINT, and RTOSINT. To enable one of the interrupts in the IER, set the corresponding bit in the IER; to enable the same interrupt in the DBGIER, set the corresponding bit in the DBGIER. The DBGIER indicates which interrupts may be serviced when the core is in the real-time emulation mode. The IER and the DBGIER are discussed later herein.

$\overline{\text{INT1}}$–$\overline{\text{IN14}}$, DLOGINT, and RTOSINT also share bit 0 in status register ST1. This bit, the interrupt global mask bit (INTM), is used to globally enable or globally disable these interrupts. When INTM=0, these interrupts are globally enabled. When INTM=1, these interrupts are globally disabled. Set and clear INTM with the SETC and CLRC instructions, respectively.

After a flag has been latched in the IFR, the corresponding interrupt will not be serviced until it is appropriately enabled by two of the following: the IER, the DBGIER, and the INTM bit. As shown in Table 22, the requirements for enabling $\overline{\text{INT1}}$–$\overline{\text{IN14}}$, DLOGINT, and RTOSINT depend on the interrupt-handling process used. In the standard process, which occurs in most circumstances, the DBGIER is ignored. When the DSP is in real-time emulation mode and the CPU is halted, a different process is used. In this special case, the DBGIER is used and the INTM bit is ignored. (If the DSP is in real-time mode and the CPU is running, the standard interrupt-handling process applies.) Once an interrupt has been requested and properly enabled, the CPU prepares for and then executes the corresponding interrupt service routine.

TABLE 22

Requirements for Enabling One of the Maskable Interrupts $\overline{\text{INT1}}$–$\overline{\text{IN}}$14, DLOGINT, and RTOSINT

| Interrupt-Handling Process | Interrupt Enabled If . . . |
|---|---|
| Standard | INTM = 0 and bit in IER is 1 |
| DSP in real-time mode and CPU halted | Bit in IER is 1 and bit in DBGIER is 1 |

As an example of varying interrupt-enable requirements, it is desired that interrupt INT5 be enabled. This corresponds to bit 4 in the IER and bit 4 in the DBGIER. Usually, INT5 is enabled if INTM=0 and IRE(4)=1. In real-time emulation mode with the CPU halted, INT5 is enabled if IRE(4)=1 and DBGIRE(4)=1.

FIG. 19 shows the Interrupt Flag Register (IFR). To identify pending interrupts, use the PUSH IFR instruction and then test the value on the stack. Use the OR IFR instruction to set IFR bits, and use the AND IFR instruction to clear pending interrupts. When the CPU approves a hardware interrupt request, the corresponding IFR bit is automatically cleared. An 25 INTR instruction also clears the corresponding IFR bit. All pending interrupts can be cleared by the AND IFR, #0 instruction or by a hardware reset.

When an interrupt is requested by the TRAP instruction, if the corresponding IFR bit is set, the CPU does not clear it automatically. If an application requires that the IFR bit be cleared, the bit must be cleared in the interrupt service routine.

In FIG. 19, R means a Read access and means a W=Write access; the value following dash (–) is value after reset.

Bits 15 and 14 of the IFR correspond to the interrupts RTOSINT and DLOGINT:

RTOSINT-Bit 15-Real-time operating system interrupt flag.
RTOSINT=0 RTOSINT is not pending.
RTOSINT=1 RTOSINT is pending.
    DLOGINT-Bit 14-Data log interrupt flag.
DLOGINT=0 DLOGINT is not pending.
DLOGINT=1 DLOGINT is pending.
For bits INT1–INT14, the following general description applies:
    INTx-Bit (x–1)-Interrupt x flag (x=1, 2, 3, . . . , or 14).
INTx=0 INTx is not pending.
INTx=1 INTx is pending.

FIG. 20 shows the Interrupt Enable Register (IER). To enable an interrupt, set its corresponding bit to 1. To disable an interrupt, clear its corresponding bit to 0. Two syntaxes of the MOV instruction allow reading from the IER and writing to the IER. In addition, the OR IER instruction enables setting IER bits, and the AND IER instruction enables clearing IER bits. When a hardware interrupt is serviced, or when an INTR instruction is executed, the corresponding IER bit is cleared. At reset, all the IER bits are cleared to 0, disabling all the corresponding interrupts. When an interrupt is requested by the TRAP instruction, if the corresponding IER bit is set, the CPU does not clear it automatically. If an application requires that the IER bit be cleared, the bit must be cleared in the interrupt service routine.

In FIG. 20, R means a Read access and W means a Write access; the value following dash (–) is value after reset. When using the AND IER and OR IER instructions, do not modify the state of bit 15 (RTOSINT) unless a real-time operating system is present.

Bits 15 and 14 of the IER enable or disable the interrupts RTOSINT and DLOGINT:

RTOSINT-Bit 15-Real-time operating system interrupt enable bit.
RTOSINT=0 RTOSINT is disabled.
RTOSINT=1 RTOSINT is enabled.
    DLOGINT-Bit 14 -Data log interrupt enable bit.
DLOGINT=0 DLOGINT is disabled.
DLOGINT=1 DLOGINT is enabled.
For bits INT1–INT14, the following general description applies:
INTx-Bit (x–1) -Interrupt x enable bit (x=1, 2, 3, . . . , or 14).
INTx=0 INTx is disabled.
INTx=1 INTx is enabled.

FIG. 21 shows the Debug Interrupt Enable Register (DBGIER), which is only used when the CPU is halted in real-time emulation mode. An interrupt enabled in the DBGIER is defined as a time-critical interrupt. When the CPU is halted in real-time mode, the only interrupts that are serviced are time-critical interrupts that are also enabled in the IER. If the CPU is running in real-time emulation mode, the standard interrupt handling process is used, and the DBGIER is ignored.

As with the IER, DBGIER may be read to identify enabled or disabled interrupts and write to the DBGIER to enable or disable interrupts. To enable an interrupt, set its corresponding bit to 1. To disable an interrupt, set its corresponding bit to 0. Use the PUSH DBGIER instruction to read from the DBGIER and the POP DBGIER instruction to write to the DBGIER. At reset, all the DBGIER bits are set to 0.

In FIG. 21, R means a Read access and W means a Write access; the value following dash (–) is value after reset. Bits 15 and 14 of the DBGIER enable or disable the interrupts RTOSINT and DLOGINT:

RTOSINT-Bit 15-Real-time operating system interrupt enable bit.
RTOSINT=0 RTOSINT is disabled.
RTOSINT=1 RTOSINT is enabled.

DLOGINT-Bit 14 -Data log interrupt enable bit.
DLOGINT=0 DLOGINT is disabled.
DLOGINT=1 DLOGINT is enabled.

For bits INT1–INT14, the following general description applies:
INTx-Bit (x–1) -Interrupt x enable bit (x=1, 2, 3, . . . , or 14).
INTx=0 $\overline{INTx}$ is disabled.
INTx=1 $\overline{INTx}$ is enabled.

Figure 22:
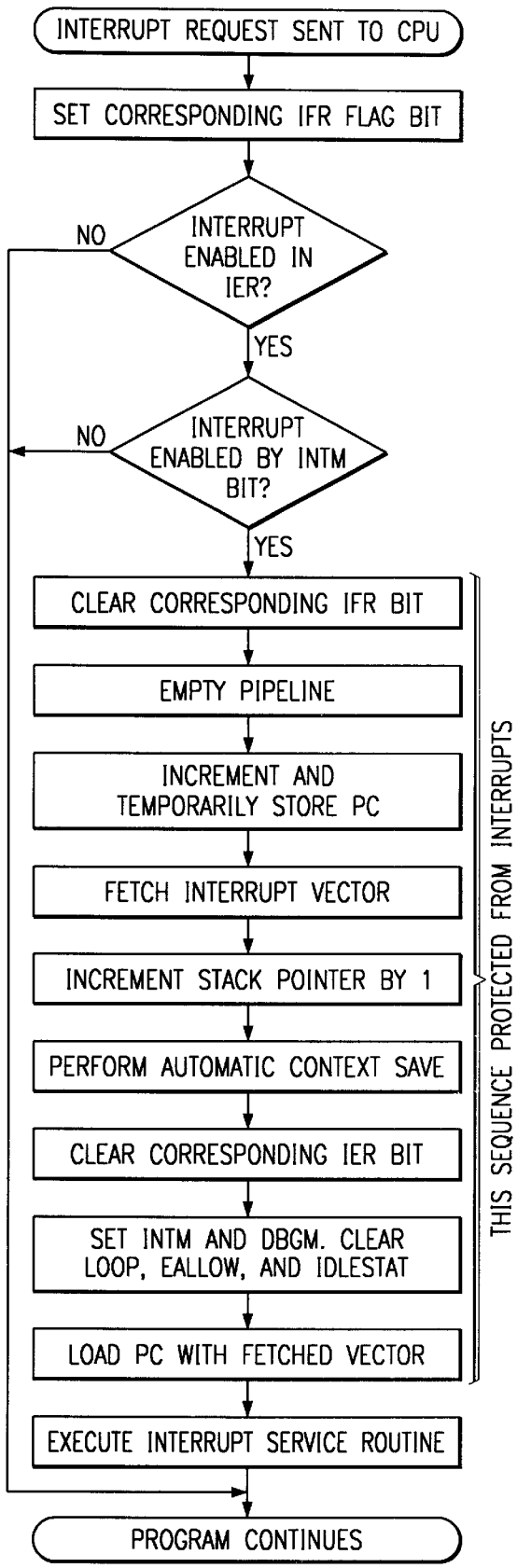
FIG. 22 illustrates a Process for Maskable Interrupts.

The flow chart in FIG. 22 shows the standard process for handling interrupts. When more than one interrupt is requested at the same time, the DSP services them one after another according to their set priority ranking. See the priorities in Table 3-1.

FIG. 22 is not a precise representation of how an interrupt is handled; it is a conceptual model of the important events useful for discussing interrupt handling.

What follows are explanations for the steps shown in FIG. 22:

1) Interrupt request sent to CPU. One of the following events occurs:
   a) One of the pins INT1–INT14 is driven low.
   b) The core emulation hardware sends to the CPU a signal for DLOGINT or RTOSINT.

One of the interrupts INT1–INT14, DLOGINT, and RTOSINT is initiated by way of the OR IFR instruction.

2) Set corresponding IFR flag bit. When the CPU detects a valid interrupt in step 1, it sets and latches the corresponding flag in the interrupt flag register (IFR). This flag stays latched even if the interrupt is not approved by the CPU in step 3.

3) Interrupt enabled in IER? Interrupt enabled by INTM bit? The CPU will only approve the interrupt if the following conditions are true:
   a) The corresponding bit in the IER is 1.
   b) The INTM bit in ST1 is 0.

Once an interrupt has been enabled and then approved by the CPU, no other interrupts can be serviced until the CPU has begun executing the interrupt service routine (step 13).

4) Clear corresponding IFR bit. Immediately after the interrupt is approved, its IFR bit is cleared. If the interrupt signal is kept low, the IFR register bit will be set again. However, the interrupt will not be immediately triggered again. The CPU blocks new hardware interrupts until the interrupt service routine begins (ISR). In addition, the IER bit is cleared (in step 10) before the ISR begins; therefore, an interrupt from the same source cannot disturb the ISR until the IER bit is set again by the ISR.

5) Empty the pipeline. The CPU completes any instructions that have reached or passed their decode 2 phase in the instruction pipeline. Any instructions that have not reached this phase are flushed from the pipeline.

6) Increment and temporarily store PC. The PC is incremented by 1 or 2, depending on the size of the current instruction. The result is the return address, which is temporarily saved in an internal hold register. During the automatic context save (step 9), the return address is pushed onto the stack.

7) Fetch interrupt vector. The PC is filled with the address of the appropriate interrupt vector, and the vector is fetched from that location.

8) Increment stack pointer by 1. The stack pointer (SP) is incremented by 1 in preparation for the automatic context save (step 9). During the automatic context save, the CPU performs 32-bit accesses, and the core expects 32-bit accesses to be aligned to even addresses by the memory wrapper. Incrementing SP by 1 ensures that the first 32-bit access will not overwrite the previous stack value.

9) Perform automatic context save. A number of register values are saved automatically to the stack. These registers are saved in pairs; each pair is saved in a single 32-bit operation. At the end of each 32-bit save operation, the SP is incremented by 2. Table 23 shows the register pairs and the order in which they are saved. The core expects all 32-bit saves to be even-word aligned by the memory wrapper. As shown in the table, the SP is not affected by this alignment.

TABLE 23

Register Pairs Saved and SP Positions for Context Saves

| Save Operation† | Register Pairs | Bit 0 of Storage Address | |
|---|---|---|---|
| | | SP Starts at Odd Address | SP Starts at Even Address |
| 1st | ST0 | 1 <- SP position before save | 1 |
| | | 0 | 0 <- SP position before save |
| 2nd | T | 1 | 1 |
| | AL | 0 | 0 |
| | AH | 1 | 1 |
| 3rd | PL‡ | 0 | 0 |
| | PH | 1 | 1 |
| 4th | AR0 | 0 | 0 |
| | AR1 | 1 | 1 |
| 5th | ST1 | 0 | 0 |
| | DP | 1 | 1 |
| 6th | IER | 0 | 0 |
| | DBGSTAT§ | 1 | 1 |
| 7th | Return Address (low half) | 0 | 0 |
| | Return Address (high half) | 1 | 1 |
| | | 0 <- SP position after save | 0 |
| | | 1 | 1 <- SP position aftersave |

†All registers are saved as pairs, as shown.
‡The P register is saved with 0 shift (CPU ignores current state of the product shift mode bits, PM, in status register 0).
§The DBGSTAT register contains special emulation information.

10) Clear corresponding IER bit. After the IER register is saved on the stack in step 9, the CPU clears the IER bit that corresponds to the interrupt being handled. This prevents re-entry into the same interrupt. To nest occurrences of the interrupt, have the ISR set that IER bit again.

11) Set INTM and DBGM. Clear LOOP, EALLOW, and IDLESTAT. All these bits are in status register ST1. By setting INTM to 1, the CPU prevents maskable interrupts from disturbing the ISR. To nest interrupts, have the ISR clear the INTM bit. By setting DBGM to 1, the CPU prevents debug events from disturbing time-critical code in the ISR. To not block debug events, have the ISR clear DBGM. The CPU clears LOOP, EALLOW, and IDLESTAT so that the ISR operates within a new context.

12) Load PC with fetched vector. The PC is loaded with the interrupt vector that was fetched in step 7. The vector forces program control to the ISR.

13) Execute interrupt service routine. Here is where the CPU executes the program code prepared to handle the interrupt. A typical ISR is shown in TABLE 24. Although a number of register values are saved automatically in step 10, others may need to be saved (such as auxiliary registers AR2–AR5, XAR6, and XAR7) at the beginning of the ISR. These register values must then be restored before the return from the ISR. If the ISR informs external hardware that the interrupt is being serviced, the IACK instruction may be used to send an interrupt acknowledge signal. The IACK instruction accepts a 16-bit constant as an operand and drives this 16-bit value on the 16 least significant lines of the data-write bus, DWDB(15:0).

14) Program continues. If the interrupt is not approved by the CPU, the interrupt will be ignored, and the program will continue uninterrupted. If the interrupt is approved, its interrupt service routine is executed, and then the program continues where it left off (at the return address).

TABLE 24

Typical ISR

| INTX: .long | INTXvector | ; Interrupt vector |
|---|---|---|
| INTXvector: | | ; Automatic context save already occurred. |
| IACK | #INTX | ; Send out interrupt acknowledge (optional). |
| AND | IER,#16BitMask | ; Disable lower priority interrupts. |
| CLRC | INTM | ; Enable interrupts. |
| PUSH | AR3:AR2 | ; Save registers not saved by during |
| PUSH | AR5:AR4 | ; automatic context save. |
| PUSH | XAR6 | ; |
| PUSH | XAR7 | ; |
| . | | ; |
| . | | ; |
| . | | ; |
| ; Interrupt-specific user code . . . | | |
| POP | XAR7 | ; |
| POP | XAR6 | ; |
| POP | AR5:AR4 | ; |
| POP | AR3:AR2 | ; |
| IRET | | ; Return and automatically restore register pairs |

Nonmaskable Interrupts

Nonmaskable interrupts cannot be blocked by any of the enable bits (the INTM bit, the DBGM bit, and enable bits in the IFR, IER, or DBGIER). The DSP will immediately approve this type of interrupt and branch to the corresponding interrupt service routine. There is one exception to this rule: When the CPU is halted in stop mode (an emulation mode), no interrupts are serviced.

The DSP nonmaskable interrupts include: software-initiated interrupts (the INTR and TRAP instructions), hardware interrupt NMI; illegal-instruction trap, and hardware reset interrupt. The instructions and NMI are described in this section.

The INTR instruction may be used to initiate one of the following interrupts by name: INT1–INT14, DLOGINT, RTOSINT and NMI. For example, the interrupt service routine for INT1 can be executed by using the following instruction:

INTR INT1

Once an interrupt is initiated by the INTR instruction, how it is handled depends on which interrupt it is:

a) $\overline{\text{INT1–INT14}}$, DLOGINT, and RTOSINT. These maskable interrupts have corresponding flag bits in the IFR. When a request for one of these interrupts is received at an external pin, the corresponding IFR bit is set and the interrupt must be enabled. In contrast, when one of these interrupts is initiated by the INTR instruction, the IFR flag is not set, and the interrupt is serviced regardless of the value of any enable bits. However, in other respects, the INTR instruction and the hardware request are the same. For example, both clear the IFR bit that corresponds to the requested interrupt.

2) NMI. Because this interrupt is nonmaskable, a hardware request at a pin and a software request with the INTR instruction lead to the same events. These events are identical to those that take place during a TRAP instruction.

TRAP Instruction

The TRAP instruction may be used to initiate any interrupt, including one of the user defined software interrupts (see Table 21). The TRAP instruction refers to one of the 32 interrupts by a number from 0 to 31. For example, the interrupt service routine for INT1 may be executed by using the following instruction:

TRAP #1

Figure 23:
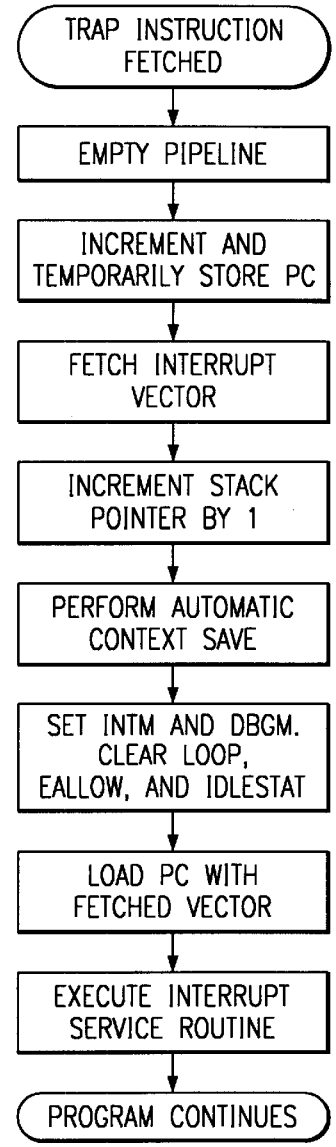
FIG. 23 illustrates a Functional Flow Chart for an Interrupt Initiated by a TRAP Instruction.

Regardless of whether the interrupt has bits in the IFR and IER, neither the IFR nor the IER is affected by this instruction. FIG. 23 shows a functional flow chart for an interrupt initiated by the TRAP instruction. The TRAP #0 instruction does not initiate a full reset. It only forces execution of the interrupt service routine that corresponds to the RESET interrupt vector.

The steps shown in FIG. 23 are explained below:

1) TRAP instruction fetched. The CPU fetches the TRAP instruction from program memory. The desired interrupt vector has been specified as an operand and is now encoded in the instruction word. At this stage, no other interrupts can be serviced until the CPU begins executing the interrupt service routine (step 9).

2) Empty the pipeline. The CPU will complete any instructions that have reached or passed the decode 2 phase of the pipeline. Any instructions that have not reached this phase will be flushed from the pipeline.

3) Increment and temporarily store PC. The PC will be incremented by 1. This value is the return address, which is temporarily saved in an internal hold register. During the automatic context save (step 6), the return address will be pushed onto the stack.

4) Fetch interrupt vector. The PC is set to the appropriate vector location (based on VMAP bit and the interrupt source), and the vector located at the PC address is loaded into the PC.

5) Increment stack pointer by 1. The stack pointer (SP) is incremented by 1 in preparation for the automatic context save (step 6). During the automatic context save, the CPU performs 32-bit accesses, which are aligned to even addresses. Incrementing SP by 1 ensures that the first 32-bit access will not overwrite the previous stack value.

6) Perform automatic context save. A number of register values are saved automatically to the stack. These registers are saved in pairs; each pair is saved in a single 32-bit operation. At the end of each 32-bit operation, the SP is incremented by 2. Table 25 shows the register pairs and the order in which they are saved. All 32-bit saves are even-word aligned. As shown in the table, the SP is not affected by this alignment.

TABLE 25

Register Pairs Saved and
SP Positions for Context Saves

| | | Bit 0 of Storage Address | |
|---|---|---|---|
| Save Operation† | Register Pairs | SP Starts at Odd Address | SP Starts at Even Address |
| | | 1 <- SP position before save | 1 |
| 1st | ST0 | 0 | 0 <- SP position before save |
| | T | 1 | 1 |
| 2nd | AL | 0 | 0 |
| | AH | 1 | 1 |
| 3rd | PL‡ | 0 | 0 |
| | PH | 1 | 1 |
| 4th | AR0 | 0 | 0 |
| | AR1 | 1 | 1 |
| 5th | ST1 | 0 | 0 |
| | DP | 1 | 1 |
| | IER | 0 | 0 |
| | DBGSTAT§ | 1 | 1 |
| 7th | Return Address (low half) | 0 | 0 |
| | Return Address (high half) | 1 | 1 |
| | | 0 <- SP position after save | 0 |
| | | 1 | 1 <- SP position after save |

†All registers are saved as pairs, as shown.
‡The P register is saved with 0 shift (CPU ignores current state of the product shift mode bits, PM, in status register 0).
§The DBGSTAT register contains special emulation information.

7) Set INTM and DBGM. Clear LOOP, EALLOW, and IDLESTAT. All these bits are in status register ST1. By setting INTM to 1, the CPU prevents maskable interrupts from disturbing the ISR. If you which to nest interrupts, have the ISR clear the INTM bit. By setting DBGM to 1, the CPU pre-vents debug events from disturbing time-critical code in the ISR. If you do not want debug events blocked, have the ISR clear DBGM. The CPU clears LOOP, EALLOW, and IDLESTAT so that the ISR operates within a new context.

8) Load PC with fetched vector. The PC is loaded with the interrupt vector that was fetched in step 4. The vector forces program control to the ISR.

9) Execute interrupt service routine. The CPU executes the program code prepared to handle the interrupt. It is possible to have the interrupt service routine (ISR) save register values in addition to those saved in step 6. A typical ISR is shown in TABLE 24. To have the ISR inform external hardware that the interrupt is being serviced, use the IACK instruction to send an interrupt acknowledge signal. The IACK instruction accepts a 16-bit constant as an operand and drives this 16-bit value on the 16 least significant lines of the data-write bus, DWDB(15:0).

10) Program continues. After the interrupt service routine is completed, the program continues where it left off (at the return address).

An interrupt can be requested by way of the NMI input pin, which must be driven low. The pin can generate NMI even when the DSP is in real-time emulation mode and the CPU is halted. Once a valid request is detected on the NMI pin, the CPU handles the interrupt in the same manner as shown for the TRAP instruction.

The illegal-instruction trap is primarily a debug tool to help catch stray or run-away code conditions. Any of the following three events can cause an illegal instruction trap:

a) An invalid instruction is decoded (this includes invalid addressing modes).

b) The opcode value $0000_{16}$ is decoded. This opcode corresponds to an ITRAP0 instruction.

c) The opcode value $FFFF_{16}$ is decoded. This opcode corresponds to an ITRAP1 instruction.

Once initiated, an illegal-instruction trap will operate the same as a TRAP #19 instruction. The handling of an interrupt initiated by the TRAP instruction was described earlier herein. As part of its operation, the illegal-instruction trap saves the return address on the stack. Thus, to detect the offending address, examine this saved value.

The reset input signal (RS) will place the core into a known state. As part of a hardware reset, all current operations are aborted, the pipeline is flushed, and the CPU registers are reset as shown in Table 26. Then the RESET interrupt vector is fetched and the corresponding interrupt service routine is executed.

TABLE 26

Registers After Reset

| Register | Bit(s) | Value After Reset | Comments |
|---|---|---|---|
| ACC | all | $0000\_0000_{16}$ | |
| AR0 | all | $0000_{16}$ | |
| AR1 | all | $0000_{16}$ | |
| AR2 | all | $0000_{16}$ | |
| AR3 | all | $0000_{16}$ | |
| AR4 | all | $0000_{16}$ | |
| AR5 | all | $0000_{16}$ | |
| XAR6 | all | $00\ 0000_{16}$ | |
| XAR7 | all | $00\ 0000_{16}$ | |

TABLE 26-continued

Registers After Reset

| Register | Bit(s) | Value After Reset | Comments |
|---|---|---|---|
| DP | all | $0000_{16}$ | DP points to data page 0. |
| IFR | 16 bits | $0000_{16}$ | There are no pending interrupts. All interrupts pending at the time of reset have been cleared. |
| IER | 16 bits | $0000_{16}$ | Interrupts $\overline{INT1}$–$\overline{INT14}$, DLOGINT, and RTOSINT are disabled in the IER. |
| DBGIER | all | $0000_{16}$ | Interrupts $\overline{INT1}$–$\overline{INT14}$, DLOGINT, and RTOSINT are disabled in the DBGIER. |
| P | all | $0000\ 0000_{16}$ | |
| PC | all | If VMAP bit = 0 $PC = [0000_{61}]$ If VMAP bit = 1 $PC = [3F\ FFC0_{16}]$ | PC is loaded with the reset interrupt vector at program-space address $00\ 0000_{16}$ or $3F\ FFC0_{16}$. |
| SP | all | $0000_{16}$ | SP points to address $0000_{16}$. |
| ST0 | 0: SXM | 0 | Sign-extension is suppressed. |
| | 1: OVM | 0 | Overflow mode is off. |
| | 2: TC | 0 | |
| | 3: C | 0 | |
| | 4: Z | 0 | |
| | 5: N | 0 | |
| | 6: V | 0 | |
| | 7–9: PM | $000_2$ | The product shift mode is set to left-shift-by-1. |
| | 10–15: OVO | $000000_2$ | |
| ST1‡ | 0: INTM | 1 | $\overline{INT1}$–$\overline{INT14}$, DLOGINT, and RTOSINT are globally disabled. They cannot be serviced unless the DSP is in real-time mode with the CPU halted. |
| | 1: DBGM | 1 | Emulation accesses and events are disabled. |
| | 2: PAGE0 | 0 | PAGE0 stack addressing mode is enabled. PAGE0 direct addressing mode is disabled. |
| | 3: VMAP | If the VMAP signal was low at reset, the VMAP bit is 0. If the VMAP signal was high at reset, the VMAP bit is 1. | If the VMAP bit is 0, the interrupt vectors are mapped to program-memory addresses $00\ 0000_{16}$ - $00\ 003F_{16}$. If the VMAP bit is 1, the interrupt vectors are mapped to program-memory addresses $3F\ FFC0_{16}$ - $3F\ FFFF_{16}$. |
| | 4: SPA | 0 | |
| | 5: LOOP | 0 | |
| | 6: EALLOW | 0 | Access to emulation registers is disabled. |
| | 7: IDLESTAT | 0 | |
| | 8–12: Reserved | Undefined | |
| | 13–15: ARP | $000_2$ | ARP points to AR0. |
| T | all | $0000_{16}$ | |

This portion describes the operation of the DSP instruction pipeline. The pipeline is protected; that is, pipeline hardware prevents reads and writes at the same location from happening out of order. However, the efficiency of programs may be increased by taking into account the operation of the pipeline. In addition, several operations are not protected by the pipeline.

When executing a program, the DSP CPU performs these basic operations: fetches instructions from program memory, decodes instructions, reads data values from memory or from CPU registers, executes instructions, and writes results to memory or to CPU registers.

For efficiency, the DSP performs these operations in eight independent phases. Reads from memory are designed to be pipelined in two stages, which correspond to the two pipeline phases used by the CPU for each memory-read operation. At any time, there can be up to eight instructions being carried out, each in a different phase of completion. What follows are descriptions of the eight phases in the order in which they occur:

Fetch 1—(F1)—In the fetch 1 (F1) phase of an instruction, the CPU drives a program-memory address on the 22-bit program address bus, PAB(21:0).

Fetch 2—(F2)—In the fetch 2 (F2) phase, the CPU reads from program memory by way of the program-read data bus, PRDB (31:0), and loads them into an instruction-fetch queue.

Decode 1—(D1)—The DSP supports both 32-bit and 16-bit instructions and an instruction can be aligned to an even or odd address. The decode 1 (D1) hardware identifies instruction boundaries in the instruction-fetch queue and determines the size of the next instruction to be executed. It also determines whether the instruction is a legal instruction.

Decode 2—(D2)—The decode 2 (D2) hardware requests an instruction from the instruction-fetch queue. The requested instruction is loaded into the instruction register, where decoding is completed. Once an instruction reaches the D2 phase, it runs to completion. In this pipeline phase, the following tasks are performed: if data is to be read from memory, the CPU generates the source address or addresses; if data is to be written to memory, the CPU generates the destination address; the address register arithmetic unit (ARAU) performs any required modifications to the stack pointer (SP) or to an auxiliary register and/or the auxiliary register pointer (ARP); and if a program-flow discontinuity (such as a branch or an illegal-instruction trap) is required, it is taken.

Read 1—(R1)—If data is to be read from memory, the read 1 (R1) hardware drives the address(es) on the appropriate address bus(es).

Read 2—(R2)—If data was addressed in the R1 phase, the read 2 (R2) hardware fetches that data by way of the appropriate data bus(es).

Execute—(E)—In the execute (E) phase, the CPU performs all multiplier, shifter, and ALU operations. This includes all the prime arithmetic and logic operations involving the accumulator and product register. Operations that involve reading a value, modifying it, and writing it back to the original location perform the modification (typically an arithmetic or a logic operation) in the E phase. Any CPU register values used by the multiplier, shifter, and ALU are read from the registers at the beginning of the E phase. A result that is to be written to a CPU register is written to the register at the end of the E phase.

Write—(W)—If a transferred value or result is to be written to memory, the write occurs in the write (W) phase. The CPU drives the destination address, the appropriate write strobes, and the data to be written. The actual storing, which takes at least one more clock cycle, is handled by memory wrappers or peripheral interface logic and is not visible as a part of the CPU pipeline.

Although every instruction passes through the eight phases, not every phase is active for a given instruction. Some instructions complete their operations in the decode 2 phase, others in the execute phase, and still others in the write phase. For example, instructions that do not read from memory perform no operations in the read phases, and instructions that do not write to memory perform no operation in the write phase.

Because different instructions perform modifications to memory and registers during different phases of their completion, an unprotected pipeline could lead to reads and writes at the same location happening out of the intended order. The CPU automatically adds inactive cycles to ensure that these reads and writes happen as intended.

The fetch 1 through decode 1 (F1–D1) hardware acts independently of the decode 2 through write (D2-W) hardware. This allows the CPU to continue fetching instructions when the D2-W phases are halted. It also allows fetched instructions to continue through their D2-W phases when fetching of new instructions is delayed. Events that cause portions of the pipeline to halt are described later herein. Instructions in their fetch 1, fetch 2, and decode 1 phases are discarded if an interrupt or other program-flow discontinuity occurs. An instruction that reaches its decode 2 phase always runs to completion before any program-flow discontinuity is taken.

The instruction-fetch mechanism is the hardware for the F1 and F2 pipeline phases. During the F1 phase, the mechanism drives an address on the program address bus (PAB). During the F2 phase, it reads from the program-read data bus (PRDB). While an instruction is read from program memory in the F2 phase, the address for the next fetch is placed on the program address bus (during the next F1 phase). The instruction-fetch mechanism contains an instruction-fetch queue of four 32-bit registers. During the F2 phase, the fetched instruction is added to the queue, which behaves like a first-in, first-out (FIFO) buffer. The first instruction in the queue is the first to be executed. The instruction-fetch mechanism performs 32-bit fetches until the queue is full. When a program-flow discontinuity (such as a branch or an interrupt) occurs, the queue is emptied. When the instruction at the bottom of the queue reaches its D2 phase, that instruction is passed to the instruction register for further decoding.

Three program-address counters are involved in the fetching and execution of instructions:

Fetch counter (FC). The fetch counter contains the address that is driven on the program address bus (PAB) in the F1 pipeline phase. The CPU continually increments the FC until the queue is full or the queue is emptied by a program-flow discontinuity. Generally, the FC outputs an even address and is incremented by 2. The only exception to this is when the code after a discontinuity begins at an odd address; in this case, the FC will reflect the odd address.

Instruction counter (IC). After the D1 hardware determines the instruction size (16-bit or 32-bit), it fills the instruction counter (IC) with the address of the next instruction to undergo D2 decoding. On an interrupt or call operation, the IC value represents the return address, which is saved to the stack or to auxiliary register XAR7.

Program counter (PC). When a new address is loaded into the IC, the previous IC value is loaded into the PC. The program counter (PC) always contains the address of the instruction that has reached its D2 phase.

Figure 24A:
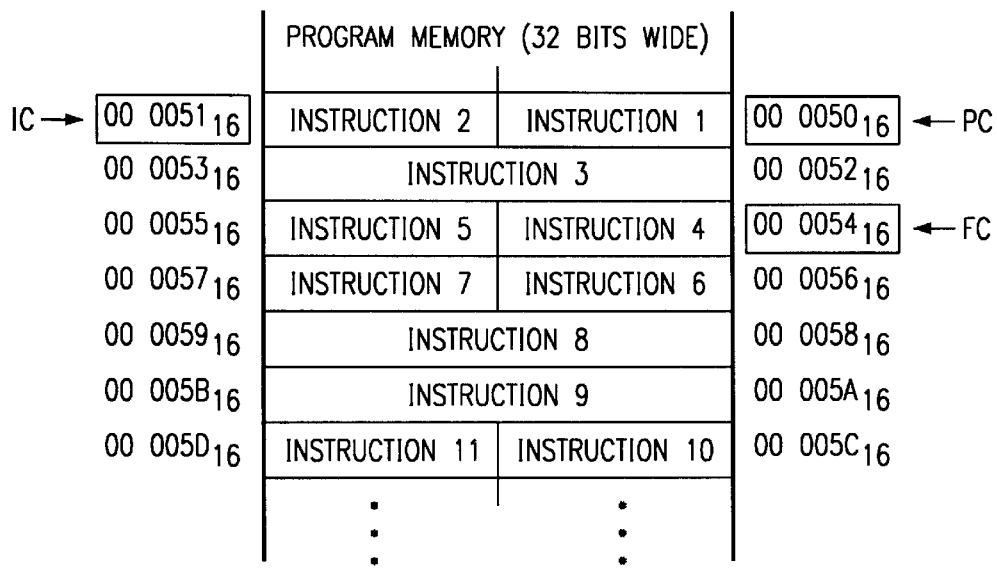
FIGS. 24A and 24B illustrate pipeline phases and relationships between Address Counters FC, IC and PC.
Figure 24B:
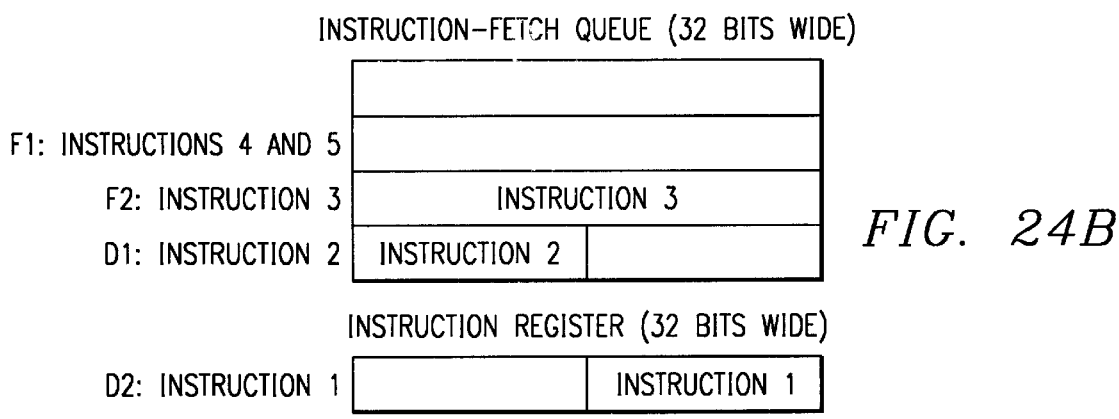

FIGS. 24A and 24B show the relationship between the pipeline and the address counters. Instruction 1 has reached its D2 phase (it has been passed to the instruction register). The PC points to the address from which instruction 1 was taken (00 0050$_{16}$). Instruction 2 has reached its D1 phase and will be executed next (assuming no program-flow discontinuity flushes the instruction-fetch queue). The IC points to the address from which instruction 2 was taken (00 0051$_{16}$). Instruction 3 is in its F2 phase. It has been transferred to the instruction-fetch queue but has not been decoded. Instructions 4 and 5 are in their F1 phase. The FC address (00 0054 16) is being driven on the PAB. During the next 32-bit fetch, Instructions 4 and 5 will be transferred from addresses 00 0054$_{16}$ and 00 0055$_{16}$ to the queue.

The remainder of this section refers almost exclusively to the PC. The FC and the IC are visible in only limited ways. For example, when a call is executed or an interrupt is initiated, the IC value is saved to the stack or to auxiliary register XAR7.

Referring to Table 28, which lists five instructions, I1–I5, and Table 29, which shows a diagram of the pipeline activity for those instructions. In Table 29, the F1 column shows addresses and the F2 column shows the instruction opcodes read at those addresses. During an instruction fetch, 32 bits are read from the specified address and the following address. The D1 column shows instructions being isolated in the instruction-fetch queue, and the D2 column indicates address generation and modification of address registers. The Instruction column shows the instructions that have reached the D2 phase. The R1 column shows addresses, and the R2 column shows the data values being read from those addresses. In the E column, the diagram shows results being written to the low half of the accumulator (AL). In the W column, address and a data values are driven simultaneously on the appropriate memory buses. For example, in the last active W phase of Table 29, the address 00 0205 $_{16}$ is driven on the data-write address bus (DWAB), and the data value 1234 $_{16}$ is driven on the data-write data bus (DWDB).

The highlighted blocks in Tables 28 and 29 indicate the path taken by the instruction ADD AL,*AR0++. That path can be summarized as follows in Table 27:

TABLE 27

Phase Activity Shown

| Phase | Activity Shown |
|---|---|
| F1 | Drive address 00_0042$_{16}$ on the program address bus (PAB). |
| F2 | Read the opcodes F347 and F348 from addresses 00 0042$_{16}$ and 00 0043$_{16}$, respectively. |
| D1 | Isolate F348 in the instruction-fetch queue. |

TABLE 27-continued

Phase Activity Shown

| Phase | Activity Shown |
|---|---|
| D2 | Use AR0 = 666616 to generate source address 00 6666$_{16}$ and then increment AR0 to 6667$_{16}$. |
| R1 | Drive address 00 6666$_{16}$ on the data-read data bus (DRDB). |
| R2 | Read the data value 1 from address 006666$_{16}$. |
| E | Add 1 to content of AL (1230$_{16}$) and store result (1231$_{16}$) to AL. |
| W | No activity |

TABLE 28

Diagramming Pipeline Activity

| Address | Opcode | Instruction | | | Initial Values |
|---|---|---|---|---|---|
| 00 0040 | F345 | I1: MOV | ;DP,#VarA | ; DP = page that has VarA. | VarA address = 00 0203 |
| 00 0041 | F346 | I2: MOV | AL,@VarA | ; Move content of VarA to AL. | VarA = 1230 |
| 00 0042 | F347 | I3: MOVB | AR0,#VarB | ; AR0 points to VarB. | VarB address = 00 0066 |
| 00 0043 | F348 | I4: ADD | AL,*AR0++ | ; Add content of VarB to | VarB = 0001 |
| | | | | ; AL, and add 1 to AR0. | (VarB + 1) = 0003 |
| 00 0044 | F349 | I5: MOV | @VarC,AL | ; Replace content of VarC | (VarB + 2) = 0005 |
| | | | | ; with content of AL. | VarC address = 00 0204 |
| 00 0045 | F34A | I6: ADD | AL,*AR0++ | ; Add content of (VarB +1) | VarD address = 00 0205 |
| | | | | ; to AL, and add 1 to AR0. | |
| 00 0046 | F34B | I7: MOV | @VarD,AL | ; Replace content of VarD | |
| | | | | ; with content of AL. | |
| 00 0047 | F34C | I8: ADD | AL,*AR0; | ; Add content of(VarB +2) | |
| | | | | ; to AL. | |

TABLE 29

Diagramming Pipeline Activity

| F1 | F2 | D1 | Instruction | D2 | R1 | R2 | E | W |
|---|---|---|---|---|---|---|---|---|
| 00 0040 | | | | | | | | |
| | F346:F345 | | | | | | | |
| 00 0042 | | F345 | | | | | | |
| | F348:F347 | F346 | I1: MOV DP #VarA | DP = 8 | | | | |
| 00 0044 | | F347 | I2: MOV AL, @VarA | Generate VarA address | — | | | |
| | F34A:F349 | F348 | I3: MOVB AR0, #VarB | AR0 = 66 | 00 0203 | — | | |
| 00 0046 | | F349 | I4: ADD AL, *AR0++ | AR0 = 67 | — | 1230 | — | |
| | F34C:F34B | F34A | I5: MOV @VarC, AL | Generate VarC address | 00 0066 | — | AL = 1230 | — |
| | | F34B | I6: ADD AL, *AR0++ | AR0 = 68 | — | 0001 | — | — |
| | | F34C | I7: MOV @VarD, AL | Generate VarD address | 00 0067 | — | AL = 1231 | — |
| | | | I8: ADD AL, *AR0 | AR0 = 68 | — | 0003 | — | — |
| | | | | | 00 0068 | — | AL = 1234 | 00 0204 1231 |
| | | | | | | 0005 | — | — |
| | | | | | | | AL = 1239 | 00 0205 1234 |
| | | | | | | | | — |

Note:
The opcodes shown in the F2 and D1 columns are not the actual opcodes of the instructions shown.

The pipeline activity in Tables 28 and 29 can also be represented by the simplified diagram in Table 30. This type of diagram is useful to focus on the path of each instruction rather than on specific pipeline events. Notice that in cycle 8, the pipeline is full: there is an instruction in every pipeline phase. Notice also that the effective execution time for each of these instructions is 1 cycle. Some instructions finish their activity at the D2 phase, some at the E phase, and some at the W phase. However, using one phase as a reference, each instruction is in that phase for 1 cycle.

Example 30

Simplified Diagram of Pipeline Activity

| F1 | F2 | D1 | D2 | R1 | R2 | E  | W  | Cycle |
|----|----|----|----|----|----|----|----|-------|
| I1 |    |    |    |    |    |    |    | 1     |
| I2 | I1 |    |    |    |    |    |    | 2     |
| I3 | I2 | I1 |    |    |    |    |    | 3     |
| I4 | I3 | I2 | I1 |    |    |    |    | 4     |
| I5 | I4 | I3 | I2 | I1 |    |    |    | 5     |
| I6 | I5 | I4 | I3 | I2 | I1 |    |    | 6     |
| I7 | I6 | I5 | I4 | I3 | I2 | I1 |    | 7     |
| I8 | I7 | I6 | I5 | I4 | I3 | I2 | I1 | 8     |
|    | I8 | I7 | I6 | I5 | I4 | I3 | I2 | 9     |
|    |    | I8 | I7 | I6 | I5 | I4 | I3 | 10    |
|    |    |    | I8 | I7 | I6 | I5 | I4 | 11    |
|    |    |    |    | I8 | I7 | I6 | I5 | 12    |
|    |    |    |    |    | I8 | I7 | I6 | 13    |
|    |    |    |    |    |    | I8 | I7 | 14    |
|    |    |    |    |    |    |    | I8 | 15    |

This section describes two causes for freezes in pipeline activity: wait states, and an instruction-not-available condition.

When the core requests a read from or write to a memory device or peripheral device, that device may take more time to finish the data transfer than the core allots by default. Each device must use one of the core's ready signals to insert wait states into the data transfer when it needs more time. The core has three independent sets of ready signals: one set for reads from and writes to program space, a second set for reads from data space, and a third set for writes to data space. Wait-state requests freeze a portion of the 20 pipeline if they are received during the F1, R1, or W phase of an instruction:

1) Wait states in the F1 phase. The instruction-fetch mechanism halts until the wait states are completed. This halt effectively freezes activity for instructions in their F1, F2, and D1 phases. However, because the F1–D1 hardware and the D2-W hardware are decoupled, instructions that are in their D2-W phases continue to execute.

2) Wait states in the R1 phase. All D2-W activities of the pipeline freeze. This is necessary because subsequent instructions can depend on the data-read taking place. Instruction fetching continues until the instruction-fetch queue is full or a wait-state request is received during an F1 phase.

3) Wait states in the W phase. All D2-W activity in the pipeline freezes. This is necessary because subsequent instructions may depend on the write operation happening first. Instruction fetching continues until the instruction-fetch queue is full or a wait-state request is received during an F1 phase.

The D2 hardware requests an instruction from the instruction-fetch queue. If a new instruction has been fetched and has completed its D1 phase, the instruction is loaded into the instruction register for more decoding. However, if a new instruction is not waiting in the queue, an instruction-not-available condition exists. Activity in the F1 –D1 hardware continues. However, the activity in the D2-W hardware ceases until a new instruction is available.

Instructions are being executed in parallel in the pipeline, and different instructions perform modifications to memory and registers during different phases of completion. In an unprotected pipeline, this could lead to pipeline conflicts— reads and writes at the same location happening out of the intended order. However, the DSP pipeline has a mechanism that automatically protects against pipeline conflicts. There are two types of pipeline conflicts on the DSP: conflicts during reads and writes to the same data-space location, and register conflicts.

The pipeline prevents these conflicts by adding inactive cycles between instructions that would cause the conflicts. This section explains the circumstances under which these pipeline-protection cycles are added, so that the number of inactive cycles in a program may be reduced.

Consider two instructions, A and B. Instruction A writes a value to a memory location during its W phase. Instruction B must read that value from the same location during its R1 and R2 phases. Because the instructions are being executed in parallel, it is possible that the R1 phase of instruction B could occur before the W phase of instruction A. Without pipeline protection, instruction B could read too early and fetch the wrong value. The DSP pipeline prevents that read by holding instruction B in its D2 phase until instruction A is finished writing.

Table 31 shows a conflict between two instructions that are accessing the same data-memory location. The pipeline activity shown is for an unprotected pipeline. For convenience, the F1–D1 phases are not shown. I1 writes to VarA during cycle 5. Data memory completes the store in cycle 6. I2 should not read the data-memory location any sooner than cycle 7. However, 12 performs the read during cycle 4 (3 cycles too early). To prevent this kind of conflict, the pipe-line-protection mechanism would hold I2 in the D2 phase for 3 cycles. During these pipeline-protection cycles, no new operations occur.

TABLE 31

Conflict During Read From and Write To Same Memory Location

| D2 | R1 | R2 | E  | W  | Cycle | Comments |
|----|----|----|----|----|-------|----------|
| I1 |    |    |    |    | 1     |          |
| I2 | I1 |    |    |    | 2     |          |
|    | I2 | I1 |    |    | 3     | I2 issues read request |
|    |    | I2 | I1 |    | 4     | I2 reads in R2 phase |
|    |    |    | I2 | I1 | 5     | I1 writes in W phase |
|    |    |    |    | I2 | 6     | I2 should issue read request here |
|    |    |    |    |    | 7     |          |
|    |    |    |    |    | 8     |          |

I1: MOV@VarA,AL ;Write AL to data-memory location
I2: MOVAH.@VarA ;Read same location, store value in AH To reduce or eliminate these types of pipeline-protection cycles, insert other instructions between the instructions that conflict. For example, the code in Table 31 could be improved by inserting a CLRC instruction from elsewhere in the program:

| | | |
|---|---|---|
| I1: MOV | @VarA,AL | ; Write AL to data-memory location |
| CLRC | SXM | ; Clear sign-extension mode |
| I2: MOV | AH,@VarA | ; Read same location, store value in AH |

Inserting the CLRC instruction between $I^1$ and $I^2$ would reduce the number of pipeline-protection cycles to two. Inserting two more instructions would remove the need for pipeline protection. (Of course, the inserted instructions must not cause conflicts of their own.) As a general rule, if a read operation occurs within three instructions from a write operation to the same memory location, the pipeline protection mechanism adds at least one inactive cycle.

All reads from and writes to CPU registers occur in either the D2 phase or the E phase of an instruction. A register conflict arises when an instruction attempts to read and/or modify the content of a register (in the D2 phase) before a previous instruction has written to that register (in the E phase).

Table 32 shows a register conflict involving auxiliary register AR0. The pipeline activity shown is for an unprotected pipeline, and for convenience, the F1–D1 phases are not shown. $I^1$ writes to AR0 at the end of cycle 4. $I^2$ should not attempt to read AR0 until cycle 5. However, $I^2$ reads AR0 (to generate an address) during cycle 2. To prevent this conflict, the pipeline-protection mechanism would hold $I^2$ in the D2 phase for three cycles. During these cycles, no new operations occur.

| | | |
|---|---|---|
| I1: | MOV AR0,@7 | ; Load AR0 with the value addressed by the operand @7. |
| | NOP | ; Delay by 1 cycle. |
| | SETCSXM | ; Enable sign-extension mode (SXM = 1) |
| I2: | MOV AH, *AR0 | ; Load All with the value pointed to by ; AR0. |

Inserting the NOP and SETC instructions would reduce the number of pipe-line-protection cycles to one. Inserting one more instruction would remove the need for pipeline protection. As a general rule, if a read operation occurs within three instructions from a write operation to the same register, the pipeline-protection mechanism adds at least one inactive cycle.

The pipeline-protection mechanism resolves register conflicts by holding the later instruction in its D2 phase for as many cycles as needed (one to three). Do not consider register conflicts except to achieve maximum pipeline efficiency. To reduce the number of pipeline-protection cycles, identify the pipeline phases in which registers are accessed and move conflicting instructions away from each other.

Generally, a register conflict involves one of the address registers: 16-bit auxiliary registers AR0–AR7, 22-bit auxiliary registers XAR6 and XAR7, 16-bit data page pointer (DP), or 16-bit stack pointer (SP).

Figure 25:
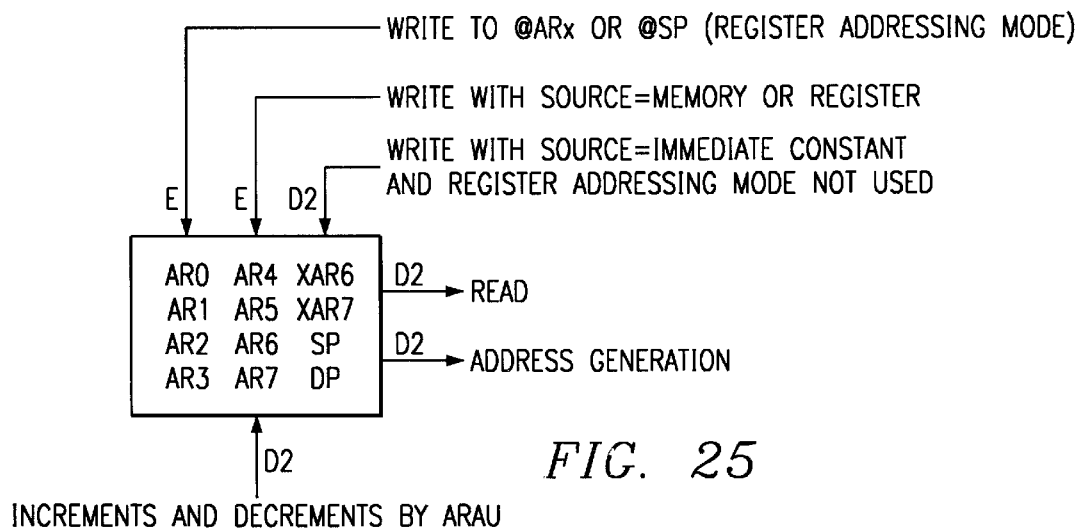

For a given access to an address register, FIG. 25 indicates whether the access occurs in the D2 phase or the E phase. The examples in the following table illustrate how the Figure helps.

TABLE 33

Phases Instruction

| Instruction | | Comments |
|---|---|---|
| ADD | @AR2,#4 | Add 4 to AR2. AR2 is referenced by register addressing mode. Therefore, the instruction writes to AR2 in the E phase. |
| MOVB | AR2,#6 | Load AR2 with 6. AR2 is loaded with an immediate constant, and register addressing mode is not used. AR2 is modified in the D2 phase. |
| MOV | T,@AR2 | Load T with content of AR2. AR2 is read in the D2 phase. |
| SUB | AH,*SP++ | Subtract addressed value from AH. In the D2 phase, the instruction uses SP to generate an address and then increments SP. |
| POP | DP | Restore DP from the stack. Because the source is memory, DP is loaded in the E phase. |

TABLE 32

Register Conflict

| D2 | R1 | R2 | E | W | Cycle | Comments |
|---|---|---|---|---|---|---|
| I1 | | | | | 1 | |
| I2 | I1 | | | | 2 | I2 reads in D2 phase |
| | I2 | I1 | | | 3 | |
| | | I2 | I1 | | 4 | I1 writes mE phase |
| | | | I2 | I1 | 5 | I2 should read here |
| | | | | I2 | 6 | |

I1: MOV AR0,@7 ;Load AR0 with the value addressed by ;the operand @7.
I2: MOV AH,*AR0 ;Load AH with the value pointed to by ;AR0.

To reduce or eliminate pipeline-protection cycles due to a register conflict, insert other instructions between the instructions that cause the conflict. For example, the code in Table 32 could be improved by moving two other instructions from elsewhere in the program:

There are three operations that the pipeline-protection mechanism does not protect against. Generally, these conflicts are avoidable, and this section offers suggestions for avoiding them.

A discontinuity is a break in sequential program flow caused by a branch, a call, a return, or an interrupt. If the first instruction after the discontinuity is a 32-bit instruction and that instruction begins at an odd address, a pipeline delay occurs. To avoid the delay where possible, begin each block of code with one or two (preferably two) 16-bit instructions:

| | |
|---|---|
| FunctionA: | |
| 16-bit instruction | ;First instruction |
| 16-bit instruction | ;Second instruction |
| 32-bit instruction | ;32-bit instructions can start here |
| . | |
| . | |
| . | |

To use a 32-bit instruction as the first instruction of a function or subroutine, and prevent a pipeline delay, make sure the instruction begins at an even address.

The pipeline protects only register and data-space reads and writes. It does not protect the program-space reads done by the PREAD and MAC instructions or the program-space write done by the PWRITE instruction. Be careful with these instructions when using them to access a memory block that is shared by data space and program space.

As an example, suppose a memory location can be accessed at address 00 0D50$_{16}$ in program space and address 00 0D50$_{16}$ in data space. Consider the following lines of code:

```
;XAR7 = 000D50 in program space
;Data1 = 000D50 in data space
ADD      @Data1,AH    ; Store AH to data-memory location
                      ; Data1.
PREAD    @AR1,*XAR7   ; Load AR1 from program-memory
                      ; location given by XAR7.
```

The operands @Data1 and *XAR7 are referencing the same location, but the pipeline cannot interpret this fact. The PREAD instruction reads from the memory location (in the R2 phase) before the ADD writes to the memory location (in the W phase).

However, the PREAD is not necessary in this program. Because the location can be accessed by an instruction that reads from data space, use another instruction, such as a MOV instruction:

```
ADD @ Data1, AH   ; Store AH to memory location Data1.
MOV AR1,*XAR7     ; Load AR1 from memory location
                  ; given by XAR7.
```

If an access to one location affects another location, correct for a pipeline conflict. Consider the following example:

```
       MOV   @DataA,#4    ; This write to DataA causes a
                          ; peripheral to clear bit 15 of DataB.
$10:   TBIT  @DataB,#15   ; Test bit 15 of DataB.
       SB    $10,NTC      ; Loop until bit 15 is set.
```

This program causes a misread. The TBIT instruction reads bit 15 (in the R2 phase) before the MOV instruction writes to bit 15 (in the W phase). If the TBIT instruction reads a 1, the code prematurely ends the loop. Because DataA and DataB reference different data-memory locations, the pipeline does not identify this conflict.

However, correct this type of error by inserting two NOP (no operation) instructions between the conflicting instructions. For example, fix the previous code as follows:

```
       MOV     @DataA,#4    ; This write to DataA causes a
                            ; peripheral to clear bit 15 of DataB.
       NOP                  ; Delay by 1 cycle.
       NOP                  ; Delay by 1 cycle.
$10:   TBIT@DataB,#15       ; Test bit 15 of DataB.
       SB      $10,NTC      ; Loop until bit 15 is set.
```

With these inserted cycles, the MOV instruction finishes writing before the TBIT instruction reads from DataB.

This portion describes the modes by which the DSP instruction set accepts constants and addresses memory locations. There are four main modes: immediate addressing, register addressing, direct addressing, or indirect addressing (this includes circular addressing).

To enter a constant as an operand, use immediate-constant addressing. To access data memory, use direct addressing, indirect addressing, or immediate-pointer addressing. Point to a program-memory address using XAR7 indirect addressing or immediate-pointer addressing. When direct or indirect addressing mode is used, the address is generated by the address register arithmetic unit (ARAU).

The DSP supports two immediate addressing modes: immediate-constant addressing, or immediate-pointer addressing.

As shown in the following examples, instructions that support immediate-constant addressing take a constant as an operand. The constant must be preceded by the symbol #.

```
ADD    ACC,   #8     ; Add 8 to accumulator.
SUBB   SP,    #10    ; Subtract 10 from stack pointer.
MOV    DP,    #200   ; Load data page pointer with 200.
```

The syntax determines the range of numbers that can be supplied in the operand. For example, this is the syntax for the MOV instruction shown above:

MOV DP, # 10 bit

The variable 10 bit represents a 10-bit unsigned constant (a value in the range 0 to 1023). The size of an immediate constant determines how it is encoded in the instruction. If the constant is fewer than 16 bits wide, the instruction requires one 16-bit word, and the constant is embedded in that word. If the constant is 16 bits wide, the instruction requires two words, and the constant is sent to the CPU as the second word.

As shown in FIG. 26, immediate-pointer addressing mode allows reference to a 22-bit data-memory or program-memory address by supplying the 16 least significant bits of the address as a constant. The six most significant bits of the address are filled with zeros. Because these six bits are always zeros, the address reach of this mode is limited to the address range 00 0000$_{16}$–00 FFFF$_{16}$.

This mode is only used by the following syntaxes of the MOV and MAC instructions:

1) MOV loc, *(0: 16 bit)—The 22-bit immediate address is the value 0: 16 bit. The value supplied for 16 bits is concatenated with six leading zeros to form the 22-bit address. This form of the MOV instruction loads the value at data-memory address (0: 16 bit) to the data-memory or register referenced by loc. The instruction takes two 16-bit words, where the second word is the 16-bit constant.

2) MOV *(0: 16 bit), loc-Again, the immediate address is the value 0: 16 bit. This form of the MOV instruction loads the data-memory or register value referenced by loc to data-memory address 0: 16 bit. The instruction takes two 16-bit words, where the second word is the 16-bit constant.

3) MAC P, loc, 0: 16 bit—Unlike the immediate address in the MOV instructions, this address is neither preceded by an asterisk (*) nor contained within parentheses. In addition, this pointer is to program memory, not data memory. As part of its operation, this MAC instruction multiplies the value at program-memory address 0: 16 bit by the value referenced by loc. The instruction takes two 16-bit words, where the second word is the 16-bit constant.

Register addressing mode allows access of certain registers by name instead of by address. In addition, this mode allows transfer of data from one register to another without having to store the data to memory first. Table 34 explains the available operands for this mode. The operand @XARn is only supported by one of these instructions: ADDL, CMPL, MOVL, or SUBL. In addition, none of the other register-addressing operands can be used with ADDL, CMPL, MOVL, or SUBL. Here are two examples that use register addressing:

```
PUSH   @AL          ; Save low accumulator to stack.
MOV    AR2,  @SP    ; Store stack pointer to auxiliary
                    ; register 2.
```

In this MOV instruction, @SP is a register-operand, but AR2 is not. AR2 is simply a part of the particular syntax of the instruction.

TABLE 34

Operands for Register Addressing Mode

| Operand | Description | Example |
|---------|-------------|---------|
| @AH | High word of accumulator | MOV @AH, #0 loads the high word of the accumulator with 0. |
| @AL | Low word of accumulator | MOV AH, @AL loads the low word of the accumulator into the high word of the accumulator. |
| @PH | High word of product register | MOV AR4, @PH loads AR4 with the high word of the P register. |
| @PL | Low word of product register | MOV T, @PL loads the low word of the P register into the T register. |
| @T | Multiplicand register | ADD @T, #5 adds 5 to the T register value. |
| @SP | Stack pointer | ADD @SP, AL adds the content of AL to SP. |
| @ARx | Auxiliary register x  x = 0, 1, 2, 3, 4, 5, 6, or 7 | ADD ACC, @AR0 adds the content of AR0 to ACC. |
| @XARn | Extended auxiliary register n  n = 6 or 7 | SUBL ACC, @XAR6 subtracts the content of XAR6 from the accumulator. |

In the direct addressing modes, data memory is seen as blocks of 64 words called data pages. As shown in FIG. 27, the entire 4M words of data memory consists of 65 536 data pages labeled 0 through 65 535.

The data page is reflected in the 16 most significant bits (MSBs) of an address. For example, if the 16 MSBs are 0s, the address is in data page 0; if the 16 MSBs are all 1, the address is in data page 65 535. The 6 least significant bits of an address are known as the offset. For example, an offset of 0 (00 0000$_2$) indicates the first word on a page; an offset of 63 (11 1111$_{16}$) indicates the last word on a page. There are two direct addressing modes: DP direct addressing mode, or PAGE0 direct addressing mode.

When DP direct addressing is used, the data page is determined by the value in the 16-bit data page pointer (DP), an independent CPU register. For example, if the DP value is 0000$_{16}$, the data page is 0. If the DP value is 0002$_{16}$, the data page is 2. To indicate which word on a page is accessed, supply a 6-bit offset preceded by the symbol @. In the following example, the operand @1 indicates an offset of 1.

ADD ACC, @1

To form a complete 22-bit address, the address register arithmetic unit (ARAU) concatenates the DP value and the 6-bit offset. Suppose DP is 1 (00 00 0000 0000 0001$_2$) and the offset is 63 (11 1111$_2$). When concatenated, they form the address of the last word on data page 1 (00 0000 0000 0000 0111 1111$_2$).

Before using the DP direct addressing mode, make sure the DP contains the desired page number (from 0 to 65 535). For example:

```
MOVW   DP,   #32    ; Set data page to 32
ADD    ACC,  @1     ; Add second word on page 32 to ACC.
```

There is no need to set the data page prior to every instruction that uses direct addressing. If all the instructions in a block of code access the same data page, simply load the DP at the front of the block.

Instructions that use PAGE0 direct addressing mode always access data page 0 (addresses 00 0000$_{16}$–00 003F$_{16}$), regardless of the DP value. Indicate a particular word by supplying an operand of the form @0; 6 bit, where 6 bit is the 6-bit offset. The following example shows an offset of 1. To form a complete 22-bit address, the processor concatenates 16 leading zeros and the six bits of the offset.

ADD ACC, @0:1

PAGE0 direct addressing mode is only available when the PAGE0 bit in status register ST1 is 1. Before using this mode, make sure PAGE0=1. For example:

```
SETC   PAGE0              ; Turn PAGE0 direct addressing on.
ADD    ACC, @0:1          ; Add second word on page 0 to ACC.
```

There are two mutually-exclusive PAGE0 addressing modes: PAGE0 direct addressing, or PAGE0 stack addressing.

When PAGE0=1, PAGE0 stack addressing cannot be used. Likewise, when PAGE0=0, PAGE0 direct addressing cannot be used. Switch freely between the modes using the SETC and CLRC instructions. The output core signal PAGE0S indicates which PAGE0 mode is currently active.

The stack pointer (SP) always points to the next empty location in the software stack in data memory. Two indirect addressing modes use the stack pointer when referencing data memory: stack-pointer indirect addressing mode, or PAGE stack addressing mode.

Stack-pointer indirect addressing mode is used to access the data-memory location that is pointed to by the SP.

PAGE0 stack addressing is used to access a data-memory location relative to the position of the SP. Because the stack pointer has only 16 bits, the reach of these modes is limited to the first 64K of data memory (addresses 00 0000$_{16}$–00 FFFF$_{16}$).

Figures 28, 29, 30:
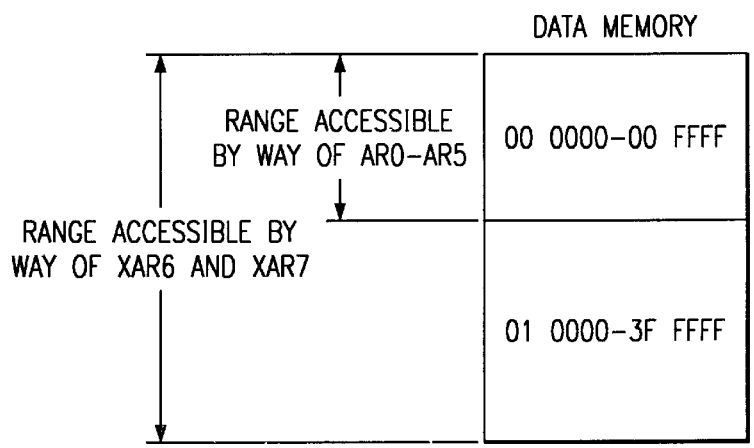
FIG. 28 illustrates Accessing Data Memory in Stack-Pointer Indirect Addressing Mode.
FIG. 29 illustrates Accessing Data Memory in PAGE0 Stack Addressing Mode.
FIG. 30 illustrates Accessing Data Memory with the Auxiliary Registers.

In stack-pointer indirect addressing mode, the stack pointer is used to point to the data-memory address where a read or write is to occur. As shown in FIG. 28, the 22-bit address is the concatenation of six leading zeros and the 16 bits of the SP. Because the six most significant bits are always 0s in this mode, its reach is limited to the address range 00 0000$_{16}$–00 FFFF$_{16}$.

Table 35 explains the two operands available for stack-pointer indirect addressing mode. The increment or decrement of SP is performed by the address register arithmetic unit (ARAU) in the decode 2 phase of the pipeline.

TABLE 35

Operands for Stack-Pointer Indirect Addressing Mode

| Operand | Description | Example |
|---|---|---|
| *SP++ | Increment SP after the data-memory access. If (16-bit operation) SP = SP +1 If (32-bit operation) SP = SP +2 | MOV *SP++, AH loads the high word of the accumulator to the 16-bit location pointed to by SP and increments the content of SP. Because the load is a 16-bit operation, SP is incremented by 1. |
| *--SP | Decrement SP before the data-memory access. If (16-bit operation) SP = SP − 1 If (32-bit operation) SP = SP − 2 | MOVL ACC, *--SP decrements the content of SP and loads ACC with the 32-bit value referenced by SP. Because the load is a 32-bit operation, SP is decremented by 2. |

As shown in FIG. 29, PAGE0 stack addressing allows an instruction to access a data-memory location relative to the position of the SP. In the instruction, specify a positive 6-bit offset (from 0 to 63), and the address register arithmetic unit (ARAU) subtracts the offset from the SP. The result, (SP-offset), is concatenated with six leading zeros to form the full 22-bit address. Because the six most significant bits are always 0s in this mode, the reach of the mode is limited to the address range 000000$_{16}$–00FFFF$_{16}$.

PAGE0 stack addressing mode is only available when the PAGE0 bit in status register ST1 is 0. The general form for an operand in this mode is *—SP [6 bit], where 6 bit is the 6-bit offset. Here is an example of using this mode:

| CLRC | PAGE0 | ; Select PAGE0 stack addressing mode. |
|---|---|---|
| SUB | ACC, *--SP[4] | ; Subtract data-memory value from ACC. ; Value is 4 locations above the ; address in SP. |

There are two mutually-exclusive PAGE0 addressing modes: PAGE0 direct addressing, or PAGE0 stack addressing. When PAGE0=1, PAGE0 stack addressing cannot be used. Likewise, when PAGE0=0, PAGE0 direct addressing cannot be used. Switch freely between the modes using the SETC and CLRC instructions. The output core signal PAGE0S indicates which PAGE0 mode is currently active.

For indirect addressing modes other than stack-pointer indirect addressing, the CPU provides eight auxiliary registers as pointers to memory. There are six 16-bit auxiliary registers (AR0, AR1, AR2, AR3, AR4, and AR5) and two 22-bit extended auxiliary registers (XAR6 and XAR7). FIG. 30 shows the ranges of data memory accessible to the auxiliary registers. XAR7 can also be used by some instructions to point to any value in program memory.

There are four indirect addressing modes that use auxiliary registers: auxiliary-register indirect addressing mode, ARP indirect addressing mode, XAR7 indirect addressing mode, or circular addressing mode.

Auxiliary-register indirect addressing mode enables pointing to addresses 00 0000$_{16}$–00 FFFF$_{16}$ using AR0–AR5 and pointing to addresses 00 0000$_{16}$–3F FFFF$_{16}$ using XAR6 and XAR7. Add an offset to an auxiliary register to access a location relative to the current position of that auxiliary register. Specify one of three sources for the offset:

1) Auxiliary register AR0. Load AR0 with a value from 0 to 65 535 (0000$_{16}$ to FFFF16), and specify AR0 as the offset in the instruction. For example:

| ADD AL,*+AR3[AR0] | ; Concatenate sum (AR3 + AR0) with ; siz zeros to form address ; 0:(AR3 + AR0). Add content of that ; address to the low accumulator. |
|---|---|

2) Auxiliary register AR1. Load AR1 with a value from 0 to 65 535, and specify AR1 as the offset in the instruction. For example:

| ADD AL,*+XAR6[AR1] | ; Calculate address (XAR6 + AR1). ; Add content of that ; address to the low accumulator. |
|---|---|

3) A constant. In an operand, specify a value from 0 to 7. For

| example: ADD AL,*+AR2[4] | ; Concatenate sum (AR2 + 4) with ; six zeros to form address ; 0:(AR2 + 4). Add content of that ; address to the low accumulator. |
|---|---|

When an operand specifies an offset, the auxiliary register is not modified. The offset is only used to generate the address. Some syntaxes of the MOVB instruction use the offset to indicate relative byte positions rather than relative word positions.

Table 36 lists and explains the operands that are available for auxiliary-register indirect addressing mode. The increments and decrements are performed by the address register arithmetic unit (ARAU) in the decode 2 phase of the pipeline. The auxiliary register pointer (ARP) in status register ST1 is updated by all these operands. This update also happens in the decode 2 phase of the pipeline.

TABLE 36

Operands for Auxiliary-Register Indirect Addressing Mode

| Operand | Description | Example |
|---|---|---|
| *ARx++ or *XARn++ | Increment the specified auxiliary register after the data-memory access. Also, set ARP to x or n. If (16-bit operation) ARx/XARn = ARx/XARn + 1 If (32-bit operation) ARx/XARn = ARx/XARn + 2 | MOV *AR2++, AH loads the high word of the accumulator to the address 0:AR2, increments the content of AR2, and sets ARP = 2. |
| *--ARx or *--XARn | Decrement the specified auxiliary register before the data-memory access. Also, set ARP to x or n. If (16-bit operation) ARx/XARn = ARx/XARn - 1 If (32-bit operation) ARx/XARn = ARx/XARn - 2 | MOV *--XAR6, AH decrements the content of XAR6, loads the high word of the accumulator to the address pointed to by XAR6, and sets ARP = 6. |
| *+ARx[AR0] or *+XARn[AR0] | Use the address 0:(ARx + AR0) or 0:(XARn + AR0) for the data-memory access. Also, set ARP to x or n. Do not modify ARx or XARn. | MOV *+AR4[AR0], AH loads the high word of the accumulator to the 22-bit address 0:(AR4 + AR0) and sets ARP = 4. |
| *+ARx[AR1] or *+XARn[AR1] | Use the address (ARx + AR1) or (XARn + AR1) for the data-memory access. Also, set ARP to x or n. Do not modify ARx or XARn. | MOV *+XAR7[AR1], AH loads the high word of the accumulator to the 22-bit address (XAR7 + AR1) and sets ARP = 7. XAR7 is not modified. |
| *+ARx[3bit] or *+XARn[3bit] | Use the address (ARx+3bit) or (XARn+3bit) for the data-memory access. Also, set ARP to x or n. Do not modify ARx or XARn. | MOV *+AR5[6], AH loads the high word of the accumulator to the 16-bit location pointed to by 0; (AR5+6) and sets ARP=5. AR5 is not modified |
| *ARx or *XARn | Equivalent to *+ARx[0] or *+XARn[0]. Use the address in ARx or XARn for the data-memory access. Also, set ARP to x or n. Do not modify ARx or XARn. | MOV *AR5, AH loads the high word of the accumulator to the 16-bit location pointed to by AR5 and sets ARP=5. AR5 is not modified. |

Notes:
1) ARx = AR0, AR1, AR2, AR3, AR4, or AR5
2) XARn = XAR6 or XAR7
3) 3bit is a 3-bit constant (a value from 0 to 7).
4) The notation 0:ARx or 0:(ARx + n) indicates that when a 16-bit auxiliary register is used, the 6 MSBs of the data-memory address are zeros.

In ARP indirect addressing, the name of the auxiliary register is not specified in the instruction; rather, the instruction uses the auxiliary register pointed to by the 3-bit auxiliary register pointer (ARP) of status register ST1. Before using ARP indirect addressing mode, make sure ARP holds the appropriate value from 0 to 7 (0 is for AR0, 1 is for AR1, 2 is for AR2, and so on). The register pointed to by the ARP is referred to as the current auxiliary register.

Add an offset to access a location relative to the position of an auxiliary register. The source for the offset is AR0. After loading AR0 with a value from 0 to 65 535 ($0000_{16}$ to $FFFF_{16}$), use one of two operands: *0++ or *0--. The operand *0++ adds AR0 to the current auxiliary register; *0-- subtracts AR0 from the current auxiliary register. Here is an example:

```
ADD    AL,*0++    ; Add content of current auxiliary
                  ; register to low half of
                  ; accumulator. Then add content of
                  ; AR0 to current auxiliary register.
```

Table 37 lists and explains the operands that are available for ARP indirect addressing mode. The increments and decrements are performed by the address register arithmetic unit (ARAU) in the decode 2 phase of the pipeline.

TABLE 37

Operands for ARP Indirect Addressing Mode

| Operand | Description | | | | Example |
|---|---|---|---|---|---|
| *ARPx | Set ARP to x | | | | MOV *ARP2, AH loads the high word of the accumulator to the 16-bit location pointed to by the current auxiliary register and then sets ARP to 2. |
| | x | Selects | x | Selects | |
| | 0 | AR0 | 4 | AR4 | |
| | 1 | AR1 | 5 | AR5 | |
| | 2 | AR2 | 6 | XAR6 | |
| | 3 | AR3 | 7 | XAR7 | |
| * | No increment or decrement of current auxiliary register. | | | | MOV *, AH loads the high word of the accumulator to the 16-bit location pointed to by the current auxiliary register and does nothing to the content of the current AR. |

TABLE 37-continued

Operands for ARP Indirect Addressing Mode

| Operand | Description | Example |
| --- | --- | --- |
| *++ | Increment current auxiliary register after the data-memory access. If (16-bit operation) ARx/XARn = ARx/XARn + 1 If (32-bit operation) ARx/XARn = ARx/XARn + 2 | MOV *++, AH loads the high word of the accumulator to the 16-bit location pointed to by the current auxiliary register and increments the content of the current AR by 1. |
| *-- | Decrement current auxiliary register after the data-memory access, If (16-bit operation) ARx/XARn = ARx/XARn − 1 If (32-bit operation) ARx/XARn = ARx/XARn − 2 | MOV *--, AH loads the high word of the accumulator to the 16-bit location pointed to by the current auxiliary register and decrements the content of the current AR by 1. |
| *0++ | Increment current auxiliary register by index amount after the data-memory access. The index amount is the value in AR0. | MOV *0++, AH loads the high word of the accumulator to the 16-bit location pointed to by the current auxiliary register and adds the content of AR0 to the content of the current auxiliary register. |
| *0-- | Decrement current auxiliary register by index amount after the data-memory access. The index amount is the value in AR0. | MOV *0--, AH loads the high word of the accumulator to the 16-bit location pointed to by the current auxiliary register and subtracts the content of AR0 from the content of the current auxiliary register. |

XAR7 indirect addressing mode allows use of the extended auxiliary register XAR7 to point to an address in program memory. This mode has a single operand, *XAR7, and is only used for the following instructions. This operand does not affect the auxiliary register pointer (ARP).

PREAD operand1, *XAR7—where operand1 represents a data-memory address. This instruction moves a 16-bit value from the program-memory location referenced by XAR7 to the data-memory location referenced by operand1.

PWRITE *XAR7, operand2 where operand2 represents a data-memory address. This instruction moves a 16-bit value from the data-memory location referenced by operand2 to the program-memory location referenced by XAR7.

LB *XAR7—This instruction forces a branch to the program-memory location referenced by XAR7.

CALL *XAR7—This instruction calls a subroutine at the program-memory location referenced by XAR7.

Figure 31:
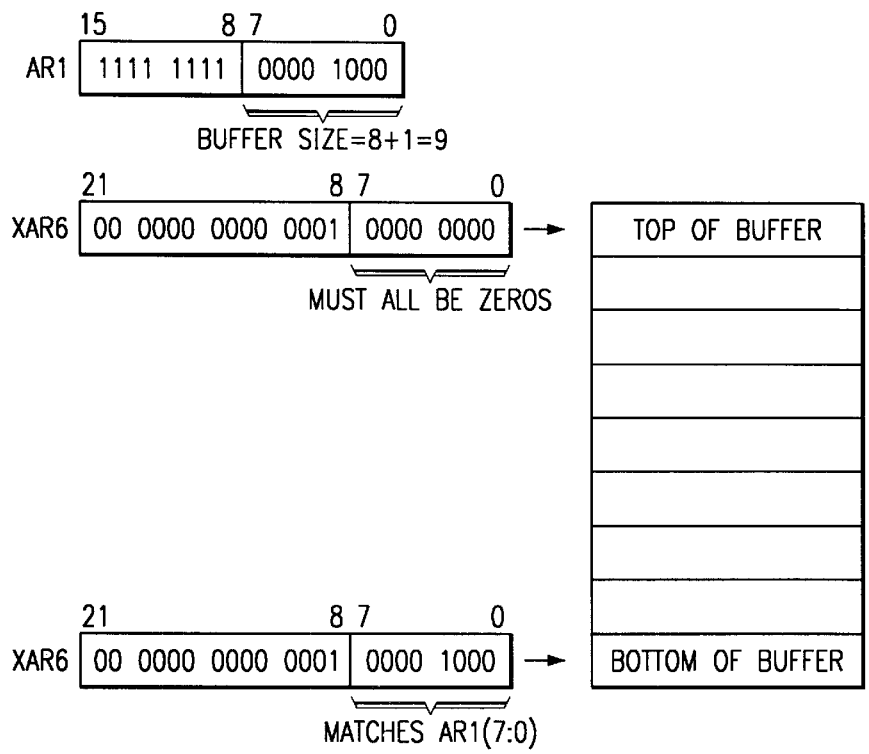
FIG. 31 shows a Circular Addressing Mode.

Circular addressing is used to access a user-defined buffer in data memory. FIG. 31 illustrates these characteristics of the buffer:

The buffer size is determined by the 8 least significant bits (LSBs) of auxiliary register AR1, or AR1(7:0). Specifically, the buffer size is AR1(7:0) plus 1. When AR1(7:0) is 255, the buffer is at its maximum size of 256.

Auxiliary register XAR6 points to the current address The top of the buffer must be at an address whose 8 LSBs are zeros. When the 8 LSBs of XAR6 match the 8 LSBs of AR1, XAR6 is pointing to the bottom of the buffer.

During a series of circular-addressing operations, the value in the 16 LSBs of XAR6 (AR6) is incremented until the 8 LSBs of AR6 match the 8 LSBs of AR1. When the values match, the 8 LSBs of AR6 are cleared, so that XAR6 points to the top of the buffer. The value in the upper 6 bits of XAR6 is not modified during any of the above operations.

Circular addressing mode has a single operand, *AR6%++. The operation performed when this operand is used:

1) Set the auxiliary register pointer (ARP) to 6, and perform the read from or write to data memory. The address in XAR6 identifies the data-memory location where the access takes place.
2) If the 8 LSBs of AR6 match the 8 LSBs of AR1 (the bottom of the buffer has been reached), clear AR6(7:0).

If the 8-bit values do not match, increment AR6 as follows: if the instruction accessed one 16-bit location, increment AR6 by 1; or if the instruction accessed two 16-bit locations, increment AR6 by 2.

The increment of AR6 is performed by the address register arithmetic unit (ARAU) in the decode 2 phase of the pipeline. The 6 MSBs of XAR6 are not affected. Here is an example of using circular addressing mode:

```
; AR6(7:0) is not equal to
AR1(7:0)
MOV      *AR6%++,AH    ; Load high word of the accumulator to
                       ; the address referenced by XAR6,
                       ; increment AR6 by 1, and set ARP = 6.
```

Because this MOV instruction writes to only one 16-bit data-memory location, AR6 is incremented by 1. In the following example, the ADDL instruction performs a 32-bit operation; that is, it accesses two data-memory locations. As a result, AR6 is incremented by 2.

```
; AR6(7:0) is not equal to
AR1(7:0)
ADDL   ACC,
       *AR6%++         ; Read the 32-bit value at the addresses
                       ; referenced by XAR6. Add the 32-bit
                       ; value to ACC. Increment AR6 by 2.
                       ; Set ARP to 6.
```

If at least one of the instructions accessing a circular buffer performs a 32-bit operation, make sure XAR6 and AR1 are both even before the buffer is accessed. This ensures that AR6(7:0) and AR1(7:0) will match at the bottom of the buffer every time XAR6 cycles through the buffer. As an example of the problems that could arise if XAR6 and AR1 are not both even, consider the following:

1) XAR6 is loaded with the even address 01 FF00$_{16}$ and AR1 is loaded with the odd value 00 0007$_{16}$. The value in AR1 indicates that the bottom of the buffer is at address 01 FF07$_{16}$.

2) The next six instructions perform 16-bit operations, and each causes AR6 to increment by 1. At this point, XAR6 points to 01 FF06$_{16}$.
3) Then a seventh instruction performs a 32-bit operation and increments AR6 by 2. Now XAR6 points to 01 FF08$_{16}$, which is past the bottom of the buffer. Because AR6(7:0) and AR1(7:0) never match, XAR6 never gets returned to the top of the buffer.

Table 38 summarizes the operands for all indirect addressing modes except XAR7 indirect addressing mode. XAR7 indirect addressing mode is only used in four instructions.

TABLE 38

Indirect-Addressing Operands

| Operand | Description | Example |
|---|---|---|
| *SP++ | Increment SP after the data-memory access.<br>If (16-bit operation) SP = SP + 1<br>If (32-bit operation) SP = SP + 2 | MOV *SP++, AH leads the high word of the accumulator to the 16-bit location pointed to by SP and increments the content of SP. Because the load is a 16-bit operation, SP is incremented by 1. |
| *−−SP | Decrement SP before the data-memory access.<br>If (16-bit operation) SP = SP − 1<br>If (32-bit operation) SP = SP − 2 | MOVL ACC, *−−SP decrements the content of SP and loads ACC with the 32-bit value referance by SP. Because the load is a 32-bit operation, SP is decremented by 2. |
| *SP[6bit] | Decrement SP by amount 6bit before the data-memory access. This operand is only available when the PAGE0 bit of ST1 is 0. | SUB ACC, *−SP[4] decrements the content of SP by 4 and subtracts the value referenced by SP from ACC. |
| *ARx++ or<br>*XARn++ | Increment the specified auxiliary register after the data-memory access. Also, set ARP to x or n.<br>If (16-bit operation)<br>ARx/XARn = ARx/XARn + 1<br>If (32-bit operation)<br>ARx/XARn = ARx/XARn + 2 | MOV *AR2++, AH loads the high word of the accumulator to the address 0:AR2, increments the content of AR2, and sets AP = 2. |
| *−−ARx or<br>*−−XARn | Decrement the specified auxiliary register before the data-memory access. Also, set ARP to x or n.<br>If (16-bit operation)<br>ARx/XARn = AXx/XARn − 1<br>If (32-bit operation)<br>ARx/XARn = ARx/XARn − 2 | MOV *−−XAR6, AH decrements the content of XAR6, loads the high word of the accumulator to the address pointed to by XAR6, and sets ARP = 6. |
| *+ARx[AR0] or<br>*+XARRn[AR0] | Use the address 0:(ARx + AR0) or 0:(XARn + AR0) for the data-memory access. Also, set ARP to x or n. | MOV *+AR4[AR0], AH loads the high word of the accumulator to the 22-bit address 0:(AR4 + AR0) and sets ARP = 4. |
| *+ARx[AR1] or<br>*+XARn[AR1] | Use the address (ARx + AR1) or (XARn + AR1) for the data-memory access. Also, set ARP to x or n. | MOV *+XAR7[AR1], AH loads the high word of the accumulator to the 22-bit address (XAR7 + AR1) and sets ARP = 7. |
| *+ARx[3bit] or<br>*+XARn[3bit] | Use the address (ARx + 3bit) or (XARn + 3bit) for the data-memory access. Also, set ARP to x or n. | MOV *+AR5[6], AH loads the high word of the accumulator to the 16-bit location pointed to by 0:(AR5 + 6) and sets ARP = 5. |
| *APx or *XARn | Equivalent to *+ARx[0] or *+XARn[0]. Use the address in ARx or XARn for the data-memory access. Also, set ARP to x or n. | MOV *AR5, AH loads the high word of the accumulator to the 16-bit location pointed to by AR5 and sets ARP = 5. |
| *ARPx | Set ARP to x<br><br>x Selects x Selects<br><br>0 AR0 4 AR4<br>1 AR1 5 AR5<br>2 AR2 6 XAR6<br>3 AR3 7 XAR7 | MOV *ARP2, AH loads the high word of the accumulator to the 16-bit location pointed to by the current auxiliary register and then sets ARP to 2. |
| * | No increment or decrement of current auxiliary register. | MOV *, AH loads the high word of the accumulator to the 16-bit location pointed to by the current auxiliary register and does nothing to the content of the current AR. |
| *++ | Increment current auxiliary register after the data-memory access,<br>If (16-bit operation)<br>ARx/XARn = ARx/XARn + 1<br>If (32-bit operation)<br>ARx/XARn = ARx/XARn + 2 | MOV *++, AH loads the high word of the accumulator to the 16-bit location pointed to by the current auxiliary register and increments the content of the current AR by 1. |
| *−− | Decrement current auxiliary register after the data-memory access.<br>If (16-bit operation)<br>ARx/XARn=ARx/XARn − 1<br>If (32-bit operation)<br>ARx/XARn = ARx/XARn − 2 | MOV *−−, AH loads the high word of the accumulator to the 16-bit location pointed to by the current auxiliary register and decrements the content of the current AR by 1. |
| *0++ | Increment current auxiliary register by index amount after the data-memory access. The index amount is the value in AR0. | MOV *0++, AH loads the high word of the accumulator to the 16-bit location pointed to by the current auxiliary register and adds the content of AR0 to the content of the current auxiliary register. |

TABLE 38-continued

Indirect-Addressing Operands

| Operand | Description | Example |
|---|---|---|
| *0-- | Decrement current auxiliary register by index amount after the data-memory access. The index amount is the value in AR0. | MOV *0--, AH loads the high word of the accumulator to the 16-bit location pointed to by the current auxiliary register and subtracts the content of AR0 from the content of the current auxiliary register. |
| *AR6%++ | After the data-memory access, if AR6(7:0) equals AR1(7:0), clear AR6(7:0). Otherwise increment AR6. If (16-bit operation) AR6 = AR6 + 1 If (32-bit operation) AR6 = AR6 +2 | ADDL ACC, *AR6%++ reads the 32-bit value at the addresses referenced by XAR6, adds that value to ACC, and sets ARP to 6. If AR6(7:0) equals AR1(7:0), AR6(7:0) is cleared. Otherwise, AR6 is incremented by 2. |

Notes:
1) ARx = AR0, AR1, AR2, AR3, AR4, or AR5
2) XARn = XAR6 or XAR7
3) 3bit is a 3-bit constant (a value from 0 to 7).
4) The notation 0:ARx or 0:(ARx + n) indicates that when a 16-bit auxiliary register is used, the 6 MSBs of the data-memory address are zeros.

This portion explains how each of the addressing modes is encoded in the instruction opcodes of instructions. One of the ADD instructions is depicted in FIG. 32.

Figure 32:
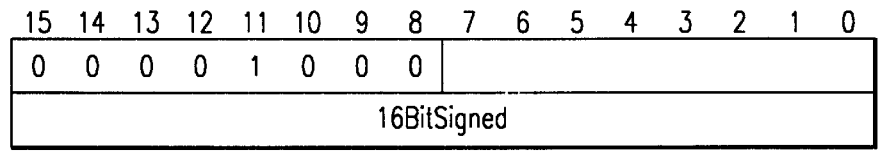
FIG. 32 illustrates Opcode Addressing Mode Information.

As shown in FIG. 32, the second word (16 BitSigned) is an embedded constant from an immediate addressing mode. Bits 7 through 0 of the first word encode information about a register-, direct-, or indirect-addressing operand. When a 2-word opcode is stored in program memory, the least significant word must be stored first.

Figure 33:
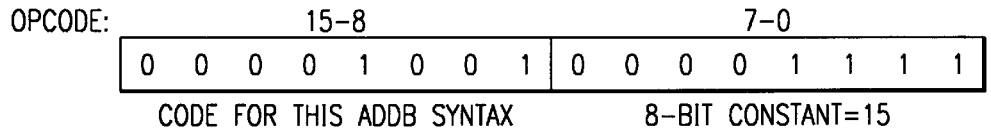
FIG. 33 shows an Opcode Format for Immediate Addressing With an 8-Bit Constant.
Figure 34:
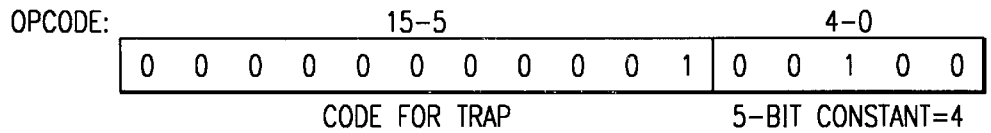
FIG. 34 shows an Opcode Format for Immediate Addressing With a 5-Bit Constant.

When an immediate addressing mode is used, the constant entered is embedded directly in the instruction opcode. If the instruction requires a constant of fewer than 16 bits, only one word is needed for the opcode, and the constant is embedded in the lower portion of the opcode. Consider FIG. 33 and FIG. 34, which both use immediate-constant addressing mode. In FIG. 33, an 8-bit constant is embedded in bits 7 through 0 of the opcode. Bits 15 through 8 contain the code for the chosen syntax of the ADDB instruction. In FIG. 34, a 5-bit constant is embedded in bits 4 through 0, and bits 15 through 5 contain the code for the single syntax of the TRAP instruction.

When an instruction uses a constant of 16 or more bits, the instruction requires two 16-bit words for its opcode. This is shown in FIG. 35 and FIG. 36. In FIG. 35, the first word of the opcode contains the opcode for the MOVW instruction, and the second word contains the 16-bit constant. FIG. 36 uses a 22-bit constant. The 6 most significant bits of the constant are embedded in bits 5 through 0 of the first word of the opcode. The 16 least significant bits of the constant form the second word.

Many instructions use register addressing mode or one of the direct or indirect addressing modes to access data memory. For these instructions, the addressing-mode information is encoded in bits 7 through 0 of the first or only word of the opcode. Table 39 summarizes how these eight bits are filled for each of the modes.

TABLE 39

Encoding of Register-, Direct-, and Indirect-Addressing Operands

| Addressing Mode | Bits 7–0 of Opcode | Operand | Comments |
|---|---|---|---|
| DP direct | 0 0 CCC CCC | @6bit | The 6-bit constant given in the operand is placed in the op-code where the six Cs are shown. |
| PAGE0 direct | 0 1 CCC CCC | @0:6bit | The 6-bit constant given in the operand is placed in the op-code where the six Cs are shown. PAGE0 direct addressing mode and PAGE0 stack ad-dressing mode are encoded the same way because only one can be active at a time (selected by the PAGE0 bit). |
| PAGE0 stack | 0 1 CCC CCC | *Sp[6bit] | The 6-bit offset given in the operand is placed in the opcode where the six Cs are shown. PAGE0 direct addressing mode and PAGE0 stack addressing mode are encoded the same way because only one can be active at a time (selected by the PAGE0 bit). |
| Auxiliary-Register Indirect | 1 0 000 AAA | *ARx++ or *XARn++ | In the operands, x is a number from 0 to 5, n is 6 or 7, and 3bit is a 3-bit constant. In the opcode, three As indicate where the 3-bit auxiliary register number (from 0 to 7) is embedded. Three Cs indicate where the 3-bit constant is embedded. |
| | 1 0 001 AAA | *--ARx or *--XARn | |
| | 1 0 010 AAA | *+ARx[AR0] or *+XARn[AR0] | |
| | 1 0 011 AAA | *+ARx[AR1] or *+XARn[AR1] | |
| | 1 1 CCC AAA | *+AR x[3bit] or *+XARn[3bit] | |

TABLE 39-continued

Encoding of Register-, Direct-, and Indirect-Addressing Operands

| Addressing Mode | Bits 7–0 of Opcode | Operand | Comments |
|---|---|---|---|
| Register | 1 0 100 AAA | @ARx or @XARn++ | In the operands, x is a number from 0 to |
|  | 1 0 101 000 | @AH | 7, and n is 6 or 7. The three As in the |
|  | 1 0 101 001 | @AL | first register-addressing code indicate |
|  | 1 0 101 010 | @PH | where the 3-bit auxiliary register number |
|  | 1 0 101 011 | @PL | (from 0 to 7) is em-bedded. |
|  | 1 0 101 100 | @T |  |
|  | 1 0 101 101 | @SP |  |
| ARP indirect | 1 0 110 AAA | *ARP z | The variable z is a 3-bit number from 0 to |
|  | 1 0 111 000 | * | 7, indicating which auxiliary register is |
|  | 1 0 111 001 | *++ | selected. This 3-bit number is embedded |
|  | 1 0 111 010 | *-- | in the opcode where the three As are |
|  | 1 0 111 011 | *0++ | shown. |
|  | 1 0 111 100 | *0-- |  |
| Stack-pointer indirect | 1 0 111 101 | *SP++ |  |
|  | 1 0 111 110 | *--SP |  |
| Circular | 1 0 111 111 | *AR6%++ |  |

FIGS. 37 through 40 show how bits 7 through 0 of opcodes are filled for particular cases of register, direct, and indirect addressing modes. The instruction in FIG. 37 uses register addressing to access the T register. This is indicated by the code in bits 7–0 of the opcode.

In FIG. 38, bits 7 and 6 of the opcode are both 0, indicating DP direct addressing mode. Bits 5 through 0 contain the offset of 5.

FIG. 39 uses auxiliary-register indirect addressing to access data-memory. This is indicated by bits 7 through 0 of the first word of the opcode. Because XAR6 is used, bits 2 through 0 contain 6 ($110_2$). The example also uses immediate-pointer addressing to access program memory. The constant given in the third operand (5) indicates the 16 LSBs of address 00 $0005_{16}$. This 16-bit constant forms the second word of the opcode.

The instruction in FIG. 40 uses stack-pointer indirect addressing to point to a location in data memory. In addition, it uses immediate-constant addressing to indicate a 16-bit signed constant. This constant forms the second word of the opcode.

This portion presents a summary of the instructions, explains how some instructions are affected by alignment of 32-bit accesses to even addresses, defines special symbols and notations used and describes each instruction in detail in alphabetical order.

Table 40 lists the instruction set in alphabetical order by mnemonic, a brief description of the instruction, and comments about the instruction.

TABLE 40

Instruction Set Summary in Alphabetical Order

| Mnemonic | Description | Comments |
|---|---|---|
| ABORTI | Abort interrupt | Used when an interrupt will not be returned from in the normal manner |
| ABS | Absolute value of accumulator | Finds the absolute value of the full 32-bit accumulator |
| ADD | Add value to specified location | Adds a 16-bit value to a data-memory location or a register. This value can be from data-memory or a register, or can be a constant. |
| ADDB | Add short value to specified register | Adds a 7-bit constant to an auxiliary register or the stack pointer, or adds an 8-bit constant to AH, AL, or ACC |
| ADDCU | Add unsigned value plus carry bit to accumulator | Unsigned value is a 16-bit data-memory or register value |
| ADDL | Add long value to accumulator | Adds a 32-bit data-memory value or a 22-bit auxiliary register value to ACC |
| ADDU | Add unsigned value to accumulator | Unsigned value is a 16-bit data-memory or register value |
| ADRK | Add to current auxiliary register | Adds an 8-bit constant to an auxiliary register |
| AND | Bitwise AND | Performs an AND operation on two 16-bit values Can be used to clear values in the interrupt enable register (IER) and the interrupt flag register (IFR). |
| ANDB | Bitwise AND with short value | Performs an AND operation on an 8-bit value and an accumulator half (AH or AL) |
| ASP | Align stack pointer | If the stack pointer (SP) points to an odd address, ASP increments SP by 1. This aligns SP to an even address. |
| ASR | Arithmetic shift right | Shifts AH or AL right by the amount you specify. During the shift, the value is sign extended. |
| B | Branch | Uses a 16-bit offset to perform a relative branch |

TABLE 40-continued

Instruction Set Summary in Alphabetical Order

| Mnemonic | Description | Comments |
|---|---|---|
| BANZ | Branch if auxiliary register not equal to zero | Uses a 16-bit offset to perform a relative branch |
| CALL | Call | Stores the return address to the stack and then performs an absolute branch to a specified 22-bit address |
| CLRC | Clear Status Bits | Clears one or more of certain bits in status registers ST0 and ST1 |
| CMP | Compare | Uses a subtraction to compare two values. The result is not stored, but is reflected by flag bits. |
| CMPB | Compare with short value | Uses a subtraction to compare AH or AL with an 8-bit constant. The result is not stored, but is reflected by flag bits. |
| CMPL | Compare with long value | Uses a subtraction to compare ACC with a 32-bit data-memory value or a 22-bit auxiliary register value. The result is not stored, but is reflected by flag bits. |
| DEC | Decrement specified value by 1 | Acts on a 16-bit data-memory location or register |
| EALLOW | Allow access to emulation registers | Enables access to the memory-mapped emulation registers |
| EDIS | Disallow access to emulation registers | Disables access to the memory-mapped emulation registers |
| ESTOP0 | Emulator software breakpoint | Used to create a software breakpoint |
| ESTOP1 | Embedded software breakpoint | Used to create an embedded software breakpoint |
| FFC | Fast function call | Stores the return address to auxiliary register XAR7 and then performs an absolute branch to a specified 22-bit address |
| IACK | Interrupt acknowledge | Drives a specified 16-bit value on the low 16 bits of the data write data bus, DWDB(15:0). Can be used in an interrupt service routine to inform external hardware that a certain interrupt is being serviced by the CPU. |
| IDLE | Idle until interrupt | Places CPU in a dormant state until it is awakened by an enabled or nonmaskable hardware interrupt |
| INC | Increment specified value by 1 | Acts on a 16-bit data-memory location or register |
| INTR | Software interrupt | Can be used to initiate the following interrupts: INT1–INT14, DLOGINT, RTOSINT, EMUINT, and NMI. For those interrupts with bits in the interrupt enable register (IER) and the interrupt flag register (IER), the bits are cleared. |
| IRET | Return from interrupt and restore register pairs | Restores the program counter (PC) value and other register values that were saved to the stack by an interrupt operation |
| ITRAP0 | Instruction trap 0 | Causes an illegal instruction trap, as with a TRAP #19 instruction |
| ITRAP1 | Instruction trap 1 | Causes an illegal instruction trap, as with a TRAP #19 instruction |
| LB | Long branch | Performs an absolute branch to a specified 22-hit address |
| LOOPNZ | Loop while not zero | Repeats until a specified test results in zero |
| LOOPZ | Loop while zero | Repeats until a specified test results in a nonzero value |
| LSL | Logical shift left | Shifts AR, AL, or ACC left by the amount you specify |
| LSR | Logical shift right | Shifts AR or AL right by the amount you specify. During the shift, the value is not sign extended. |
| MAC | Multiply and accumulate with preload to T register | Adds the P register value to ACC, loads T register and then multiplies T register value by value from program memory |
| MOV | Move value | Copies a value from one location to another, or loads a location with a specified value |
| MOVA | Load T register and add previous product to accumulator | Loads the T register and adds the P register value to ACC |
| MOVB | Move short value | Loads a register with an 8-bit constant or moves a specified byte from one location to another |
| MOVH | Store high word | Stores the high word of the P register or ACC to data-memory or to a register |
| MOVL | Move long value | Enables loads and stores that use ACC and 32-bit data-memory locations |
| MOVP | Load T register and load previous product to accumulator | Loads the T register and stores the P register value to ACC |
| MOVS | Load T register and subtract previous product from accumulator | Loads the T register and subtracts the P register value from ACC |
| MOVU | Load accumulator with unsigned word | Loads AL with an unsigned 16-bit value and clears AH |
| MOVW | Load entire data page pointer | Loads the entire data page pointer (DP) with a 16-bit constant. One syntax of the MOV instruction enables you to load only the 10 LSBs of the DP. |
| MPY | Multiply | Multiplies a 16-bit value by another 16-bit value |
| MPYA | Multiply and accumulate previous product | Adds the P register value to ACC and then multiplies two 16-bit values |

TABLE 40-continued

Instruction Set Summary in Alphabetical Order

| Mnemonic | Description | Comments |
|---|---|---|
| MPYB | Multiply signed value by unsigned short value | Multiplies a signed 16-bit value by an unsigned 8-bit value |
| MPYS | Multiply and subtract previous product | Subtracts the P register value from ACC and then multiplies a 16-bit value by another 16-bit value |
| MPYU | Unsigned multiply | Multiplies an unsigned 16-bit value by another unsigned 16-bit value |
| MPYXU | Multiply signed value by unsigned value | Multiplies a signed 16-bit value by an unsigned 16-hit value |
| NASP | Unalign stack pointer | Undoes a previous alignment of SP performed by the ASP instruction. |
| NEG | Negative of accumulator value | Finds the negative of the value in AH, AL, or ACC |
| NOP | No operation | Can be used to purposely create inactive cycles. Can also be used to increment an auxiliary register or the stack pointer without performing any other task. |
| NORM | Normalize accumulator | Can be used to remove extra sign bits from a value in ACC |
| NOT | Complement of accumulator value | Finds complement of AH, AL, or ACC 6–179 |
| OR | Bitwise OR | Performs an OR operation on two 16-bit values Can be used to set values in the interrupt enable register (IER) and the interrupt flag register (IFR). If the AND instruction sets an IFR and the interrupt is enabled, the interrupt will be serviced. |
| ORB | Bitwise OR with short value | Performs an OR operation on an 8-bit value and an accumulator half (AH or AL) |
| POP | Restore from stack | Copies a 16-bit value or a 32-bit register pair from the stack to a data-memory location or a register |
| PREAD | Read from program memory | Loads a 16-bit data-memory location or register with a value from program memory |
| PUSH | Save value on stack | Copies a 16-bit value or a 32-bit register pair to the stack |
| PWRITE | Write to program memory | Loads a program-memory location with a value from a 16-bit data-memory location or register |
| RET | Return | Loads the program counter (PC) from the stack |
| RETE | Return with interrupts enabled | Loads the program counter (PC) from the stack and clears the interrupt global mask bit (INTM). By clearing INTM, it enables interrupts INT1–1NT14, DLOGINT, and RTOSINT. |
| ROL | Rotate accumulator left | Can be seen as the left rotation of a 33-bit value that is the concatenation of the carry bit (C) and ACC. |
| ROR | Rotate accumulator right | Can be seen as the right rotation of a 33-bit value that is the concatenation of the carry bit (C) and ACC. |
| RPT | Repeat next instruction | Causes the following instruction to repeat a specified number of times |
| SAT | Saturate accumulator | Fills ACC with a saturation value that reflects the net overflow represented in the overflow counter (OVC) |
| SB | Short branch | Uses an 8-bit offset to perform a relative branch |
| SBBU | Subtract unsigned value plus inverse borrow from accumulator | Unsigned value is a 16-bit data-memory or register value |
| SBRK | Subtract from specified auxiliary register | Subtracts an 8-bit constant from an auxiliary register |
| SETC | Set status bits | Sets one or more of specified bits in status registers ST0 and ST1 |
| SFR | Shift accumulator right | Shifts ACC right by the amount you specify. During the shift, the value is sign extended if the sign-extension mode bit (SXM) is 1 or is not sign extended if SXM is 0. |
| SPM | Set product shift mode | Sets the product shift mode bits (PM), which determine how certain instructions shift the P register value |
| SUB | Subtract value from specified location | Subtracts a 16-bit value from a data-memory location or a register. This value can be from data-memory or a register, or can be a constant. |
| SUBB | Subtract short value from specified register | Subtracts a 7-bit constant from an auxiliary register or the stack pointer, or subtracts an 8-bit constant from ACC |
| SUBCU | Conditional subtraction | Used for 16-bit division |
| SUBL | Subtract long value from accumulator | Subtracts a 32-bit data-memory value or a 22-bit auxiliary register value from ACC |
| SUBU | Subtract unsigned value from accumulator | Unsigned value is a 16-bit data-memory or register value |
| SXTB | Sign extend least significant byte of accumulator half | Sign extends the least significant byte of AH or AL |
| TBIT | Test specified bit | Tests a specified bit of a 16-bit data-memory location or register. The value of the bit is reflected by the test/control flag bit (TC). |
| TEST | Test for accumulator equal to zero | Uses a subtraction to compare ACC with 0. The result is not stored, but is reflected by flag bits. |

TABLE 40-continued

Instruction Set Summary in Alphabetical Order

| Mnemonic | Description | Comments |
|---|---|---|
| TRAP | Software trap | Can be used to initiate any interrupt. Unlike the INTR instruction, the TRAP instruction never affects bits in the IER and IFR. |
| XOR | Bitwise exclusive OR | Performs an exclusive OR operation on two 16-bit values |
| XORB | Bitwise exclusive OR with short value | Performs an exclusive OR operation on an 8-bit value and an accumulator half (AH or AL) |

Tables 41 through 53 provide a summary of the instruction syntaxes according to the following functional groups:

1) Address Register Operations (AR0–AR7, XAR6, XAR7, DP, SP) (see Table 42)
2) Push and Pop Stack Operations (see Table 43)
3) AX (AH, AL) Operations (see Table 44)
4) AX (AH, AL) Byte Operations (see Table 45)
5) ACC Operations (see Table 46)
6) ACC 32-Bit Operations (see Table 47)
7) Operations on Memory or Register (see Table 48)
8) Data Move Operations (see Table 49)
9) Program Flow Operations (see Table 50)
10) Math Operations (see Table 51)
11) Control Operations (see Table 52)
12) Emulation Operations (see Table 53)

The DSP uses the following syntax formats. When a destination is specified, it is always the left most operand.

TABLE 41

Summary by Operation Type

| Format | | Example |
|---|---|---|
| Mnemonic destination, source 1, source 2 | AND AH,@7,#16 | ;Read 2 source values. ;Write logical AND of ;those values to destination. |
| Mnemonic destination, source1 | MOV ACC,@7 | ;Read from source. Write ;value to destination. |
| Mnemonic source1, source2 | CMPL ACC,@7 | ;Compare two source values. |
| Mnemonic source | PUSH ST0 | ;Read from source. Stack is ;destination. |
| Mnemonic destination | POP ST1 | ;Source is stack. Write to ;destination. |

TABLE 42

Address Register Operations
(AR0–AR7, XAR6, XAR7, DP, SP)

| | | | | Status Bits | |
|---|---|---|---|---|---|
| Instruction | Syntax | Words | Cycles | Affected By | Affects |
| ADDB | aux, #7bit | 1 | 1 | — | — |
| ADDB | SP, #7bit | 1 | 1 | — | — |
| ADRK | #8bit | 1 | 1 | ARP | — |
| MOV | AR x, loc | 1 | 1 | — | — |
| MOV | XAR n, locLong | 1 | 1 | — | — |
| MOV | XAR n, #22bit | 2 | 1 | — | — |
| MOV | DP, # 10bit | 1 | 1 | — | — |
| MOV | loc, ARx | 1 | 1 | — | N,Z |
| MOV | locLong, XARn | 1 | 1 | — | — |
| MOVB | ARx, #8bit | 1 | 1 | — | — |
| MOVW | DP, #16bit | 2 | 1 | — | — |
| SBRK | #8bit | 1 | 1 | ARP | — |
| SUBB | aux, #7bit | 1 | 1 | — | — |
| SUBB | SP, #7bit | 1 | 1 | — | — |

TABLE 43

Push and Pop Stack Operations

| Instruction | Syntax | Words | Cycles | Status Bits Affected By | Affects |
|---|---|---|---|---|---|
| ADDB | aux, #7bit | 1 | 1 | — | — |
| ADDB | SP, #7bit | 1 | 1 | — | — |
| ADRK | #8bit | 1 | 1 | ARP | — |
| MOV | AR x,loc | 1 | 1 | — | — |
| MOV | XAR n,locLong | 1 | 1 | — | — |
| MOV | XAR n, #22bit | 2 | 1 | — | — |
| MOV | DP, #10bit | 1 | 1 | — | — |
| MOV | loc, ARx | 1 | 1 | — | N, Z |
| MOV | locLong, XARn | 1 | 1 | — | — |
| MOVB | ARx, #8bit | 1 | 1 | — | — |
| MOVW | DP, #16bit | 2 | 1 | — | — |
| SBRK | # 8bit | 1 | 1 | ARP | — |
| SUBB | aux, #7bit | 1 | 1 | — | — |
| SUBB | SP, #7bit | 1 | 1 | — | — |
| POP | loc | 1 | 2 | — | N, Z |
| POP | DBGIER | 1 | 5 | — | — |
| POP | DP | 1 | 1 | — | — |
| POP | ST0 | 1 | 1 | — | C, N, OVM, OVC, PM, SXM, TC, V, Z |
| POP | ST1 | 1 | 5 | — | ARP, DBGM, EALLOW, INTM, PAGE0, SPA, VMAP |
| POP | T:ST0 | 1 | 1 | — | C, N, OVM, OVC, PM, SXM, TC, V, Z |
| POP | DP:ST1 | 1 | 5 | — | ARP, DBGM, EALLOW, INTM, PAGE0, SPA, VMAP |
| POP | PH:PL | 1 | 1 | — | — |
| POP | AR1:AR0 | 1 | 1 | — | — |
| POP | AR3:AR2 | 1 | 1 | — | — |
| POP | AR5:AR4 | 1 | 1 | — | — |
| PUSH | loc | 1 | 2 | — | — |
| PUSH | DBGIER | 1 | 1 | — | — |
| PUSH | DP | 1 | 1 | — | — |
| PUSH | IFR | 1 | 1 | — | — |
| PUSH | ST0 | 1 | 1 | — | — |
| PUSH | ST1 | 1 | 1 | — | — |
| PUSH | T:ST0 | 1 | 1 | — | — |
| PUSH | DP:ST1 | 1 | 1 | — | — |
| PUSH | PH:PL | 1 | 1 | — | — |
| PUSH | AR1:AR0 | 1 | 1 | — | — |
| PUSH | AR3:AR2 | 1 | 1 | — | — |
| PUSH | AR5:AR4 | 1 | 1 | — | — |

TABLE 44

AX (Ah, AL) Operations

| Instruction | Syntax | Words | Cycles | Status Bits Affected By | Affects |
|---|---|---|---|---|---|
| ADD | AX,loc | 1 | 1 | — | C, N, V, Z |
| ADDB | AX, #8BitSigned | 1 | 1 | — | C, N, V, Z |
| AND | AX, loc | 1 | 1 | — | N, Z |
| AND | AX, loc, #16BitMask | 2 | 1 | — | N, Z |
| ANDB | AX, #8BitMask | 1 | 1 | — | N, Z |
| ASR | AX, shift | 1 | 1 | — | C, N, Z |
| ASR | AX,T | 1 | 1 | — | C, N, Z |
| CMP | AX, loc | 1 | 1 | — | C, N, Z |
| CMPB | AX, #8bit | 1 | 1 | — | C, N, Z |
| LSL | AX, shift | 1 | 1 | — | C, N, Z |
| LSL | AX,T | 1 | 1 | — | C, N, Z |
| LSR | AX, shift | 1 | 1 | — | C, N, Z |
| LSR | AX, T | 1 | 1 | — | C, N, Z |
| MOV | AX, loc | 1 | 1 | — | N, Z |
| MOV | Loc, AX | 1 | 1 | — | N, Z |
| MOVB | AX, #8bit | 1 | 1 | — | N, Z |
| NEG | AX | 1 | 1 | — | C, N, V, Z |
| NOT | AX | 1 | 1 | — | N, Z |
| OR | AX, loc | 1 | 1 | — | N, Z |
| ORB | AX, #8BitMask | 1 | 1 | — | N, Z |
| SUB | AX, loc | 1 | 1 | — | C, N, V, Z |
| XOR | AX, loc | 1 | 1 | — | N, Z |
| XORB | AX, #8BitMask | 1 | 1 | — | N, Z |

TABLE 45

AX (AH, AL) Byte Operations

| Instruction | Syntax | Words | Cycles | Status Bits Affected By | Affects |
|---|---|---|---|---|---|
| MOVB | AX.LSB, loc | 1 | 1 | — | N, Z |
| MOVB | loc, AX.LSB | 1 | 1 | — | N, Z |
| MOVB | AX.MSB, loc | 1 | 1 | — | N, Z |
| MOVB | loc, AX.MSB | 1 | 1 | — | N, Z |
| SXTB | AX | 1 | 1 | — | N, Z |

TABLE 46

ACC Operations

| Instruction | Syntax | Words | Cycles | Status Bits Affected By | Affects |
|---|---|---|---|---|---|
| ABS | ACC | 1 | 1 | OVM | C, N, V, Z |
| ADD | ACC, loc, << shift | 1 | 1 | OVM, SXM | C, N, V, Z |
| ADD | ACC, #16BitSU<< shift | 2 | 1 | OVM, SXM | C, N, V, Z |
| ADD | ACC, P | 1 | 1 | OVM, PM | C, N, V, Z |
| ADDB | ACC, #8bit | 1 | 1 | OVM | C, N, V, Z |
| ADDCU | ACC, loc | 1 | 1 | OVM | C, N, V, Z |
| ADDU | ACC, loc | 1 | 1 | OVM | C, N, V, Z |
| LSL | ACC, shift | 1 | 1 | — | C, N, Z |
| LSL | ACC, T | 1 | 1 | — | C, N, Z |
| MOV | ACC, loc << shift | 1 | 1 | SXM | N, Z |
| MOV | ACC, #16BitSU<<shift | 2 | 1 | SXM | N, Z |
| MOV | ACC, P | 1 | 1 | PM, SXM | N, Z |
| MOV | loc, ACC << shift | 1 | 1 | — | N, Z |
| MOVB | ACC, #8bit | 1 | 1 | — | N, Z |
| MOVH | loc, ACC << shift | 1 | 1 | — | N, Z |
| MOVU | ACC, loc | 1 | 1 | — | N, Z |
| NEG | ACC | 1 | 1 | OVM | C, N, V, Z |
| NORM | ACC, aux++ | 1 | 4† | — | N, TC, Z |
| NORM | ACC, aux-- | 1 | 4† | — | N, TC, Z |
| NOT | ACC | 1 | 1 | — | N, Z |
| ROL | ACC | 1 | 1† | — | C, N, Z |
| ROR | ACC | 1 | 1† | — | C, N, Z |
| SAT | ACC | 1 | 1 | OVC | C, N, OVC, V, Z |
| SBBU | ACC, loc | 1 | 1 | OVM | C, N, V, Z |
| SFR | ACC, shift | 1 | 1 | SXM | C, N, Z |
| SFR | ACC, T | 1 | 1 | SXM | C, N, Z |
| SUB | ACC, loc<< shift | 1 | 1 | OVM, SXM | C, N, V, Z |
| SUB | ACC, #16BitSU<< shift | 2 | 1 | OVM, SXM | C, N, V, Z |
| SUB | ACC, P | 1 | 1 | OVM, PM | C, N, V, Z |
| SUBB | ACC, #8bit | 1 | 1 | OVM | C, N, V, Z |
| SUBCU | ACC, loc | 1 | 1† | — | C, N, OVC, V, Z |
| SUBU | ACC, loc | 1 | 1 | OVM | C, N, V, Z |
| TEST | ACC | 1 | 1 | — | N, Z |

†This instruction is repeatable. The number of cycles given is for execution of a single instruction.

TABLE 47

ACC 32-Bit Operations

| Instruction | Syntax | Words | Cycles | Status Bits Affected By | Affects |
|---|---|---|---|---|---|
| ADDL | ACC, locLong | 1 | 1 | OVM | C, N, V, Z |
| CMPL | ACC, locLong | 1 | 1 | — | C, N, Z |
| MOVL | ACC, locLong | 1 | 1 | — | N, Z |
| MOVL | locLong, ACC | 1 | 1 | — | — |
| SUBL | ACC, locLong | 1 | 1 | OVM | C, N, V, Z |

TABLE 48

Operations on Memory or Register

| Instruction | Syntax | Words | Cycles | Status Bits Affected By | Affects |
|---|---|---|---|---|---|
| ADD | loc, AX | 1 | 1 | — | C, N, V, Z |
| ADD | loc, #16BitSigned | 2 | 1 | — | C, N, V, Z |
| AND | loc, AX | 1 | 1 | — | N, Z |
| AND | loc, | 2 | 1 | — | N, Z |

TABLE 48-continued

Operations on Memory or Register

| Instruction | Syntax | Words | Cycles | Status Bits Affected By | Affects |
|---|---|---|---|---|---|
| CMP | loc, #16BitMask #16BitSigned | 2 | 1 | — | C, N, Z |
| DEC | Loc | 1 | 1 | — | C, N, V, Z |
| INC | Loc | 1 | 1 | — | C, N, V, Z |
| LOOPNZ | loc, #16BitMask | 2 | 5 | — | LOOP, N, Z |

TABLE 48-continued

Operations on Memory or Register

| Instruction | Syntax | Words | Cycles | Status Bits Affected By | Affects |
|---|---|---|---|---|---|
| LOOPZ | loc, #16BitMask | 2 | 5 | — | LOOP, N, Z |
| OR | loc, AX | 1 | 1 | — | N, Z |
| OR | loc, #16BitMask | 2 | 1 | — | N, Z |
| SUB | loc, AX | 1 | 1 | — | C, N, V, Z |
| TBIT | loc, #BitNumber | 1 | 1 | — | TC |
| XOR | loc, AX | 1 | 1 | — | N, Z |
| XOR | loc, #16BitMask | 2 | 1 | — | N, Z |

TABLE 49

Data Move Operations

| Instruction | Syntax | Words | Cycles | Status Bits Affected By | Affects |
|---|---|---|---|---|---|
| MOV | *(0: 16bit), loc | 2 | 2† | — | — |
| MOV | loc, #0 | 1 | 1† | — | N, Z |
| MOV | loc, #16bit | 2 | 1† | — | N, Z |
| MOV | loc, *();16bit) | 2 | 2† | — | N, Z |
| PREAD | loc, *XAR7 | 1 | 2† | — | N, Z |
| PWRITE | *XAR7, loc | 1 | 5† | — | — |

†This instruction is repeatable. The number of cycles given is for execution of a single instruction.

TABLE 50

Program Flow Operations

| Instruction | Syntax | Words | Cycles | Status Bits Affected By | Affects |
|---|---|---|---|---|---|
| B | 16BitOffset, cond | 2 | 4/7† | — | V (if tested) |
| BANZ | 16BitOffset, ARx-- | 2 | 2/4† | — | — |
| CALL | 22BitAddress | 2 | 4 | — | — |
| CALL | *XAR7 | 1 | 4 | — | — |
| FFC | XAR7, 22BitAddress | 2 | 4 | — | — |
| IRET | | 1 | 8 | — | ARP, C, DBGM, INTM, N, OVC, OVM, PAGE0, PM, SPA, SXM, TC, V, VMAP, Z |
| LB | 22BitAddress | 2 | 4 | — | — |
| LB | *XAR7 | 1 | 4 | — | — |
| RET | | 1 | 8 | — | — |
| RETE | | 1 | 8 | — | INTM |
| SB | 8BitOffset, cond | 1 | 4/7† | — | V (if tested) |

†X/Y: X cycles are required if the branch is not taken. Y cycles are required if the branch is taken.

TABLE 51

Math Operations

| Instruction | Syntax | Words | Cycles | Status Bits Affected By | Affects |
|---|---|---|---|---|---|
| CMP | ACC, P | 1 | 1 | PM | C, N, Z |
| MAC | P, loc, 0: | 2 | 1† | OVM, PM | C, N, V, Z |

TABLE 51-continued

Math Operations

| Instruction | Syntax | Words | Cycles | Status Bits Affected By | Affects |
|---|---|---|---|---|---|
| | pmem | | | | |
| MOV | PH, loc | 1 | 1 | — | — |
| MOV | PL, loc | 1 | 1 | — | — |
| MOV | P, ACC | 1 | 1 | — | — |
| MOV | T, loc | 1 | 1 | — | — |
| MOV | loc, P | 1 | 1 | PM | N, Z |
| MOV | loc, T | 1 | 1 | — | N, Z |
| MOVA | T, loc | 1 | 1 | OVM, PM | C, N, V, Z |
| MOVH | loc, P | 1 | 1 | PM | N, Z |
| MOVP | T, loc | 1 | 1 | PM | N, Z |
| MOVS | T, loc | 1 | 1 | OVM, PM | C, N, V, Z |
| MPY | ACC, loc, #16BitSigned | 2 | 1 | — | N, Z |
| MPY | ACC, T, loc | 1 | 1 | — | N, Z |
| MPY | P, T, loc | 1 | 1 | — | — |
| MPYA | P, loc, #16BitSigned | 2 | 1 | OVM, PM | C, N, V, Z |
| MPYA | P, T, loc | 1 | 1 | OVM, PM | C, N, V, Z |
| MPYB | ACC, T, #8bit | 1 | 1 | — | N, Z |
| MPYB | P, T, #8bit | 1 | 1 | — | — |
| MPYS | P, T, loc | 1 | 1 | OVM, PM | C, N, V, Z |
| MPYU | ACC, T, loc | 1 | 1 | — | N, Z |
| MPYU | P, T, loc | 1 | 1 | — | — |
| MPYXU | ACC, T, loc | 1 | 1 | — | N, Z |
| MPYXU | P, T, loc | 1 | 1 | — | — |

†This instruction is repeatable. The number of cycles given is for execution of a single instruction.

TABLE 52

Control Operations

| Instruction | Syntax | Words | Cycles | Status Bits Affected By | Status Bits Affects |
|---|---|---|---|---|---|
| AND | IER, #16BitMask | 2 | 2 | — | — |
| AND | IFR, #16BitMask | 2 | 2 | — | — |
| ASP | | 1 | 1 | SPA | SPA |
| CLRC | BitName1 {, BitName2‡} | 1 | 1 or 2‡ | — | Specified status bit(s): C, DBGM, INTM, OVM, PAGE0, SXM, TC, VMAP |
| CLRC | 8BitMask | 1 | 1 or 2{ | — | Specified status bit(s): C, DBGM, INTM, OVM, PAGE0, SXM, TC, VMAP |
| IACK | # VectorValue | 2 | 1 | — | — |
| IDLE | | 1 | 5 | — | IDLESTAT |
| INTR | INTi | 1 | 8 | — | DBGM, EALLOW, IDLESTAT, INTM, LOOP |
| INTR | DLOGINT | 1 | 8 | — | DBGM, EALLOW, IDLESTAT, INTM, LOOP |
| INTR | RTOSINT | 1 | 8 | — | DBGM, EALLOW, IDLESTAT, INTM, LOOP |
| INTR | NMI | 1 | 8 | — | DBGM, EALLOW, IDLESTAT, INTM, LOOP |
| MOV | IER, loc | 1 | 5 | — | — |
| MOV | loc, IER | 1 | 1 | — | — |
| NASP | | 1 | 1 | SPA | SPA |
| NOP | | 1 | 1† | — | — |
| NOP | *ind | 1 | 1† | — | — |
| OR | IER, #16BitMask | 2 | 2 | — | — |
| OR | IFR, #16BitMask | 2 | 2 | — | — |
| RPT | loc | 1 | 4 | — | — |
| RPT | #8bit | 1 | 1 | — | — |
| SETC | BitName1 {, BitName2} | 1 | 1 or 2‡ | — | Specified status bit(s): C, DBGM, INTM, OVM, PAGE0, SXM, TC, VMAP |
| SETC | 8BitMask | 1 | 1 or 2‡ | — | Specified status bit(s): C, DBGM, INTM, OVM, PAGE0, SXM, TC, VMAP |
| SPM | ShiftMode | 1 | 1 | — | PM |
| TRAP | # VectorNumber | 1 | 8 | — | DBGM, EALLOW, IDLESTAT, INTM, LOOP |

†This instruction is repeatable. The number of cycles given is for execution of a single instruction.
‡If CLRC or SETC is to affect the INTM bit and/or the DBGM bit, the instruction requires 2 cycles; otherwise the instruction requires 1 cycle.

TABLE 53

Emulation Operations

| Instruction | Syntax | Words | Cycles | Status Bits Affected-By | Status Bits Affects |
|---|---|---|---|---|---|
| ABORTI | | 1 | 2 | — | DBGM, HPI, IDS |
| EALLOW | | 1 | 4 | — | EALLOW |
| EDIS | | 1 | 4 | — | EALLOW |
| ESTOP0 | | 1 | 1 | — | ESTOP0 |
| ESTOP1 | | 1 | 1 | — | ESTOP1 |
| ITRAP0 | | 1 | 8 | — | DBGM, EALLOW, IDLESTAT, INTM, LOOP |
| ITRAP1 | | 1 | 8 | — | DBGM, EALLOW, IDLESTAT, INTM, LOOP |

The DSP core expects memory wrappers and peripheral-interface logic to align any 32-bit data read or write to an even address. If the address-generation logic generates an odd address, the memory wrapper or peripheral-inter-face must begin reading or writing at the previous even address. This alignment does not affect the address values generated by the address-generation logic.

Figure 41:
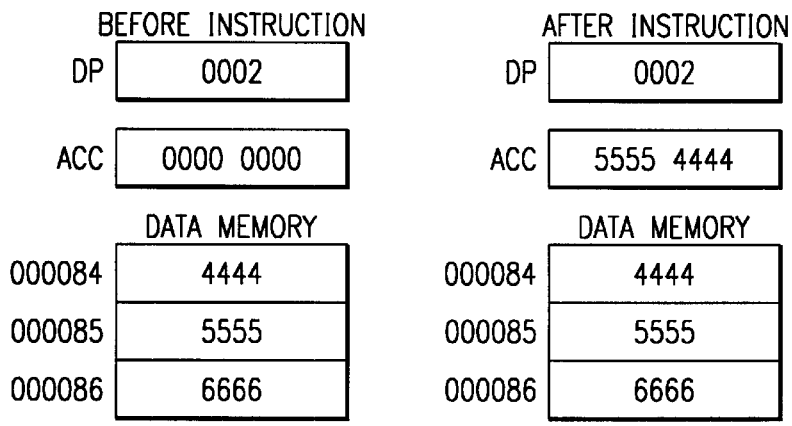
FIG. 41 illustrates a 32-Bit Read From Data Memory.

Consider FIG. 41, which shows a 32-bit read from data memory. In this example, DP direct addressing mode is used. The data page pointer and the offset point to an odd address, 00 0085$_{16}$. However, the CPU must receive the first word from an even address. It reads from addresses 00 0084$_{16}$ and 00 0085$_{16}$. Then it loads the word at 00 0084$_{16}$ to the low half of ACC and the word at 00 0085$_{16}$ to the high half of ACC.

Figure 42:
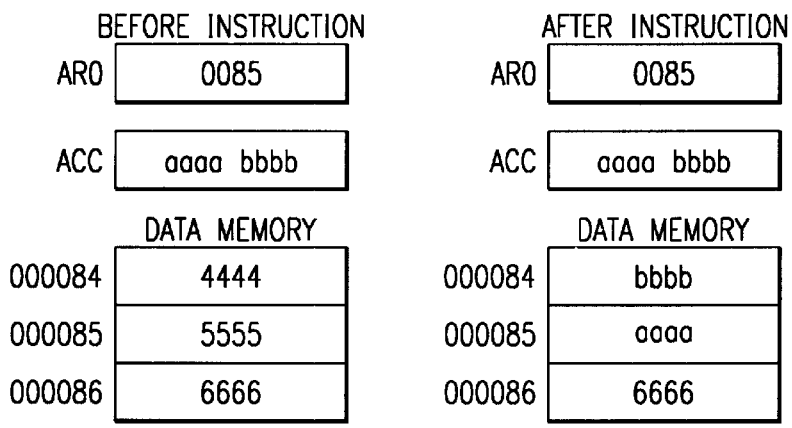
FIG. 42 illustrates a 32-Bit Write to Data Memory.

FIG. 42 shows a 32-bit write. AR0 points to the odd address 00 0085$_{16}$. Due to alignment, the low half of ACC is saved at address 00 0084$_{16}$ and the high half of ACC is saved at address 00 0085$_{16}$. AR0 is not modified; it still holds 85 after the operation.

Table 54 describes the mechanisms on the DSP that generate 32-bit-wide data accesses.

TABLE 54

Mechanisms That Generate 32-Bit-Wide Data Accesses

| Mechanism | 32-Bit Operation(s) |
|---|---|
| Interrupt initiated by hardware or software (OR, INTR, or TRAP instruction). | Multiple register pairs are automatically saved on the stack. Each pair is saved in a single 32-bit store operation. |
| IRET instruction | Multiple register pairs are automatically restored from the stack. Each pair is re-stored in a single 32-bit load operation. |
| Any of the following syntaxes of the PUSH instruction:<br>PUSH T:ST0   PUSH AR1:AR0<br>PUSH DP:ST1 PUSH AR3:AR2<br>PUSH PH:PL   PUSH AR5:AR4 | A register pair is saved on the stack in a single 32-bit store operation. |
| Any of the following syntaxes of the POP instruction:<br>POP T:ST0    POP AR1:AR0<br>POP DP:ST1 POP AR3:AR2<br>POP PH:PL    POP AR5:AR4 | A register pair is restored from the stack in a single 32-bit load operation. |
| Either of the following syntaxes of the MOV instruction:<br>MOV locLong, XAR n<br>MOV XAR n, locLong | When XAR6 or XAR7 is the source, this 22-bit value is stored in a single 32-bit store operation. The 6 MSBs of the value are stored as 0s. When XAR6 or XAR7 is loaded, 32 bits are read from data memory. The 22 LSBs are loaded to the auxiliary register. |
| MOVL instruction | ACC is loaded or stored using a single 32-bit operation. |
| ADDL, CMPL, or SUBL instruction | A 32-bit value is read from data memory before being added or subtracted from ACC. |

Each instruction begins with a list of the available assembler syntax expressions. For example, the description for the ADD instruction begins with:

| 1: | ADD | $A_{X, loc}$ |
|---|---|---|
| 2: | ADD | loc,$^AX$ |
| 3: | ADD | ACC,$_{,loc}$ << shift3} |
| 4: | ADD | ACC, #16BitSU << shift2} |
| 5: | ADD | ACC, P |
| 6: | ADD | loc, #16BitSigned |

Each syntax is preceded by a reference number that is used throughout the rest of the instruction description. These are the notations used in the syntax expressions:
Italic symbols
and
boldface characters
Italic symbols in an instruction syntax represent variables. Boldface characters in an instruction syntax must be typed as shown.
Example: $^{ADD\ A}$ X, loc
The X indicates that AH or AL may be used for the first operand. A variety of values for loc may be used. $^{ADD}$, the following $^A$, and the comma are boldface to indicate that they are always present when using this syntax. Samples with this syntax follow:
ADD AH, @T
ADD AL, *AR2++
{x} Operand x is optional.
Example: $^{ADD\ ACC}$, loc<<shift3}
Supply ACC and loc, as in this instruction:
ADD ACC, @2

The option of adding a shift3 value is as in this instruction:
ADD ACC, @2<<4
The symbol # is a prefix for constants used in immediate-constant addressing mode.
Example: $^{ADD}$ loc, #16 BitSigned
The variable 16 BitSigned is preceded by the symbol # to indicate that a constant must be entered. Similarly, because loc is not preceded by the symbol #, it cannot be a constant. It must be a reference to a memory location or a register.
Finally, consider this code example:

| StoreResult | MOV | *, | AL | ;Store low word of accumulator<br>;to location referenced by the<br>;current auxiliary resister. |
|---|---|---|---|---|

An optional label, $^{StoreResult}$, is used as a reference in front of the instruction mnemonic. Place labels either before the instruction mnemonic on the same line or on the preceding line in the first column. (Be sure there are no spaces in the labels.) An optional comment field can conclude the syntax expression. At least one space is required between fields (label, mnemonic, operand, and comment).

Operands can be constants, or assembly-time expressions referring to memory, registers, shift counts, and a variety of other values. The operands category for each instruction description defines the variables and register names used for and/or within operands in the syntax expressions. For example, for the ADD instruction, the syntax category gives these syntax expressions:
ADD A X, loc
ADD loc, A X
ADD ACC, loc<<shift3}
ADD ACC, #16 BitSU<<shift2}
ADD ACC, P
ADD loc, #16 BitSigned
The operands category defines 16 BitSigned, 16 BitSU, ACC, A X, loc, shift3, and shift2.

Figure 43:
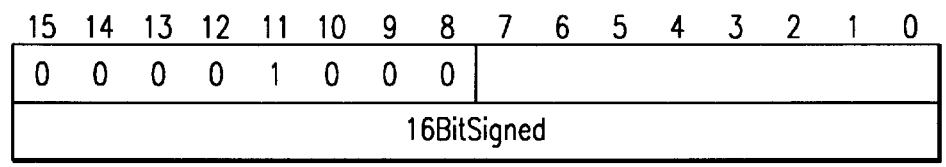
FIG. 43 illustrates an example Opcode taken from the Assembly Language Instructions.

The opcode category breaks down the various bit fields that make up each instruction word. When one of the fields contains a constant value derived directly from an operand, it will have the same name as that operand. For example, FIG. 43 shows one of the opcodes given for the ADD instruction.

The field 16 BitSigned relates directly to an operand defined in the operands category. Bits 7 through 0 of the first word depend on the addressing mode used.

The description category explains what happens during instruction execution and its effect on the rest of the processor or on memory contents. It also discusses any constraints on the operands imposed by the processor or the assembler. This description parallels and supplements the information given in the execution category.

The execution category presents an instruction operation sequence that describes the processing that takes place when the instruction is executed. Here are notations used in the execution category:
[r] The content of register or location r.
   Example: [ACC] represents the value in the accumulator.
[x]→ y The content of x is assigned to register or location y.
   Example: [addressed location] "ACC
   The content of the specified data-memory location or register is put into the accumulator.
[x]<< z The content of x is shifted left by z bit positions.

Example: [ACC] <<16

The content of ACC is shifted left by 16.

[x] >>z The content of x is shifted right by z bit positions.

Example: [ACC] >>1

The content of ACC is shifted right by 1.

r(n) Bit n of register or location r.

Example: ACC(31) represents bit 31 of the accumulator.

r(n:m) Bits n through m of register or location r.

Example: ACC(15:0) represents bits 15 through 0 of the accumulator.

[r(n:m)] The content of bits n through m of register or location r.

Example: [ACC(31:16)] represents the content of bits 31 through 16 of the accumulator.

r1:r2 Registers r1 and r2 have been concatenated into one 32-bit data value. r2 is the low word; r1 is the high word.

Example: T:ST0 represents the concatenation of the T register and status register ST0. T forms the high word, and ST0 forms the low word.

The bits in status registers ST0 and ST1 affect the operation of certain instructions and are affected by certain instructions. The bits in the debug status register (DBGSTAT) are also affected by certain instructions. The status bits category of each instruction description states how certain bits (if any) affect the execution of the instruction and how certain bits (if any) are affected by the instruction.

Some of the instructions are repeatable. That is, if they are preceded by the RPT instruction, the CPU repeats them the number of times specified in the RPT instruction. The repeat category indicates whether the instruction is repeatable. If an instruction is repeatable, the repeat category provides tips for using this feature.

The words category specifies the number of words (one or two) required to store the instruction in program memory. When the number of words depends on the chosen syntax, the words category specifies which syntaxes require one word and which require two words. This category, when present, provides examples that show the effects of the instruction on memory and/or registers. Program code is shown in a special typeface. The sample code is then followed by a verbal or graphical description of the effect of that code.

Other Embodiments

Although the present invention and its advantages have been described in detail, it should be understood that various changes, substitutions and alterations can be made herein without departing from the spirit and scope of the invention as defined by the appended claims.

What is claimed is:

1. A pipelined digital signal processing unit, comprising:

program control unit for storing and then decoding instructions;

program address generation unit for generating addresses used to obtain instructions;

address register arithmetic unit for generating addresses for data;

arithmetic logic unit for performing operations on data;

shifter unit for shifting data in response to a predetermined instruction;

multiplier unit for performing multiplication of two input values; an emulation logic for monitoring, controlling, and testing the functionalities of the units, the emulation logic including a real-time emulation mode of operation; and a plurality of registers of which at least a portion are individually selectively associated with one or more of the units as a function of an instruction; the registers including:

an accumulator register associated with the arithmetic logic unit, the accumulator register having independently accessible portions;

a multiplicand register, the multiplicand register storing multiplicand values prior to a multiply operation;

a product register, the product register holding results of a multiplicand operation, the product register having independently accessible portions; and a debug interrupt enable register, the debug interrupt enable register indicating serviceable time-critical interrupts occurring during the real-time emulation mode.

2. The pipelined digital signal processing unit as recited in claim 1 further including an interrupt flag register, the interrupt flag register identifying maskable interrupts; and an interrupt enable register, the interrupt enable register identifying serviceable interrupts.

3. The pipelined digital signal processing unit as recited in claim 2 wherein the interrupts indicated by the debug interrupt enable register are serviced when the interrupts are enabled by the interrupt enable register.

4. The pipelined digital signal processing unit as recited in claim 2 further including a stack pointer register.

5. The pipelined digital signal processing unit as recited in claim 1 wherein the accumulator register can be accessed by a byte length, a word length and a double word length.

6. The pipelined digital signal processing unit as recited in claim 1 wherein the product register can be accessed in a word legth or in a double word length.

7. A method for improving the performance of a pipelined digital signal processing unit; the digital signal processing unit including a program control unit for storing and then decoding instructions; a program address generation unit for generating addresses used to obtain instructions, an address register arithmetic unit for generating addresses for data, arithmetic logic unit for performing operations on data, shifter unit for shifting data in response to a predetermined instruction, multiplier unit for performing multiplication of two input values, and a storage unit having a plurality of address locations; the method comprising: providing an emulation logic for monitoring, controlling, and testing the functionalities of the units, the emulation logic including a real-time emulation mode of operation; and providing a plurality of registers of which at least a portion are individually selectively associated with one or more of the units as a function of an instruction, the registers including:

an accumulator register associated with the arithmetic logic unit, the accumulator register having independently accessible portions;

a multiplicand register, the multiplicand register storing multiplicand values prior to a multiply operation;

a product register, the product register holding results of a multiplicand operation, the product register having independently accessible portions; and a debug interrupt enable register, the debug interrupt enable register indicating serviceable time-critical interrupts occurring during the real-time emulation mode.

8. The method as recited in claim 7 further including an interrupt flag register, the interrupt flag register identifying maskable interrupts; and an interrupt enable register, the interrupt enable register identifying serviceable interrupts.

9. The method as recited in claim 8 further servicing the interrupts indicated by the debug interrupt enable register when the interrupts are enabled by the interrupt enable register.

10. The method as recited in claim 8 further including providing a stack pointer register.

11. The method as recited in claim 7 further including accessing the accumulator register can be accessed by a byte length, by a word length and by a double word length.

12. The method as recited in claim 7 further including accessing the product register in a word length or in a double word length.

13. An improved pipelined digital signal processing unit; the digital signal processing unit including a program control unit for storing and then decoding instructions; a program address generation unit for generating addresses used to obtain instructions, an address register arithmetic unit for generating addresses for data, arithmetic logic unit for performing operations on data, shifter unit for shifting data in response to a predetermined instruction, multiplier unit for performing multiplication of two input values, and a storage unit having a plurality of address locations; wherein the improvement comprises: an emulation logic for monitoring, controlling, and testing the functionalities of the units, the emulation logic including a real-time emulation mode of operation; and a plurality of registers of which at least a portion are individually selectively associated with one or more of the units, the registers including:

an accumulator register associated with the arithmetic logic unit, the accumulator register having independently accessible portions;

a multiplicand register, the multiplicand register storing multiplicand values prior to a multiply operation;

a product register, the product register holding results of a multiplicand operation, the product register having independently accessible portions; and a debug interrupt able register, the debug interrupt enable register indicating serviceable time-critical interrupts occurring during the real-time emulation mode.

14. The improved pipelined digital signal processing unit as recited in claim 13 wherein the improvement further comprises:

an interrupt flag register, the interrupt flag register identifying maskable interrupts; and an interrupt enable register, the interrupt enable register identifying serviceable interrupts.

* * * * *